(12) United States Patent
Asano et al.

(10) Patent No.: US 8,112,811 B2
(45) Date of Patent: *Feb. 7, 2012

(54) INFORMATION PLAYING/REPRODUCING APPARATUS AND METHOD

(75) Inventors: Tomoyuki Asano, Kanagawa (JP); Yoshitomo Osawa, Kanagawa (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/613,255

(22) Filed: Nov. 5, 2009

(65) Prior Publication Data

US 2010/0054462 A1 Mar. 4, 2010

Related U.S. Application Data

(60) Division of application No. 11/626,288, filed on Jan. 23, 2007, now Pat. No. 7,882,564, which is a continuation of application No. 09/980,390, filed as application No. PCT/JP01/02928 on Apr. 4, 2001, now Pat. No. 7,181,624.

(30) Foreign Application Priority Data

Apr. 4, 2000 (JP) ................................. 2000-101862
Aug. 10, 2000 (JP) ................................. 2000-243207

(51) Int. Cl.
*H04L 9/00* (2006.01)
(52) U.S. Cl. ................. 726/26; 726/27; 705/50; 705/57; 380/37
(58) Field of Classification Search .......................... None
See application file for complete search history.

(56) References Cited

U.S. PATENT DOCUMENTS

| 5,559,875 | A  | 9/1996 | Bieselin et al.  |
| 5,761,302 | A  | 6/1998 | Park             |
| 6,289,102 | B1 | 9/2001 | Ueda et al.      |
| 6,343,281 | B1 | 1/2002 | Kato             |
| 6,519,411 | B1 | 2/2003 | Sugimura et al.  |

(Continued)

FOREIGN PATENT DOCUMENTS

EP  0 720 166  7/1996

(Continued)

OTHER PUBLICATIONS

Patent Abstracts of Japan, JP 2001 177794 A (Victor Co of Japan) Jun. 29, 2001.

(Continued)

*Primary Examiner* — Ponnoreay Pich
(74) *Attorney, Agent, or Firm* — Oblon, Spivak, McClelland, Maier & Neustadt, L.L.P.

(57) ABSTRACT

A block key to encrypt block data is generated using an ATS (arrival time stamp) appended to each of TS (transport stream) packets included in a transport stream correspondingly to the arrival time of the TS packet. The ATS is a random data depending upon an arrival time, and so a block-unique key can be generated, which enhances the protection against data cryptanalysis. A block key is generated from a combination of an ATS with a key unique to a device, recording medium or the like such as a master key, disc-unique key, title-unique key or the like. Since an ATS is used to generate a block key, any area for storage of an encryption key for each block may not be provided in a recording medium.

20 Claims, 34 Drawing Sheets

U.S. PATENT DOCUMENTS

| | | | |
|---|---|---|---|
| 6,529,602 B1 | 3/2003 | Walker et al. | |
| RE39,360 E * | 10/2006 | Aziz et al. | 713/150 |
| 7,181,624 B2 * | 2/2007 | Asano et al. | 713/178 |
| 2002/0156742 A1 | 10/2002 | Ogino et al. | |

FOREIGN PATENT DOCUMENTS

| | | |
|---|---|---|
| EP | 0 802 535 | 10/1997 |
| EP | 0 874 503 | 10/1998 |
| EP | 0 924 930 | 6/1999 |
| JP | 10-303945 | 11/1998 |
| JP | 11-176091 | 7/1999 |
| JP | 11-224456 | 8/1999 |
| JP | 11-224461 | 8/1999 |
| WO | WO 96/30905 | 10/1996 |
| WO | WO 99/34548 | 7/1999 |

OTHER PUBLICATIONS

Patent Abstracts of Japan, JP 2000 148193 A (Victor Co of Japan) May 26, 2000.

"Generic Coding of Moving Pictures and Associated Audio Systems" ISO/IEC JTC1/SC29/WG11 N0801, XP002200170, Nov. 13, 1994, pp. 1-161.

"5C Digital Transmission Content Protection" 5C Digital Transmission Content Protection White Paper, XP002304290, Jul. 14, 1998, pp. 1-15.

* cited by examiner

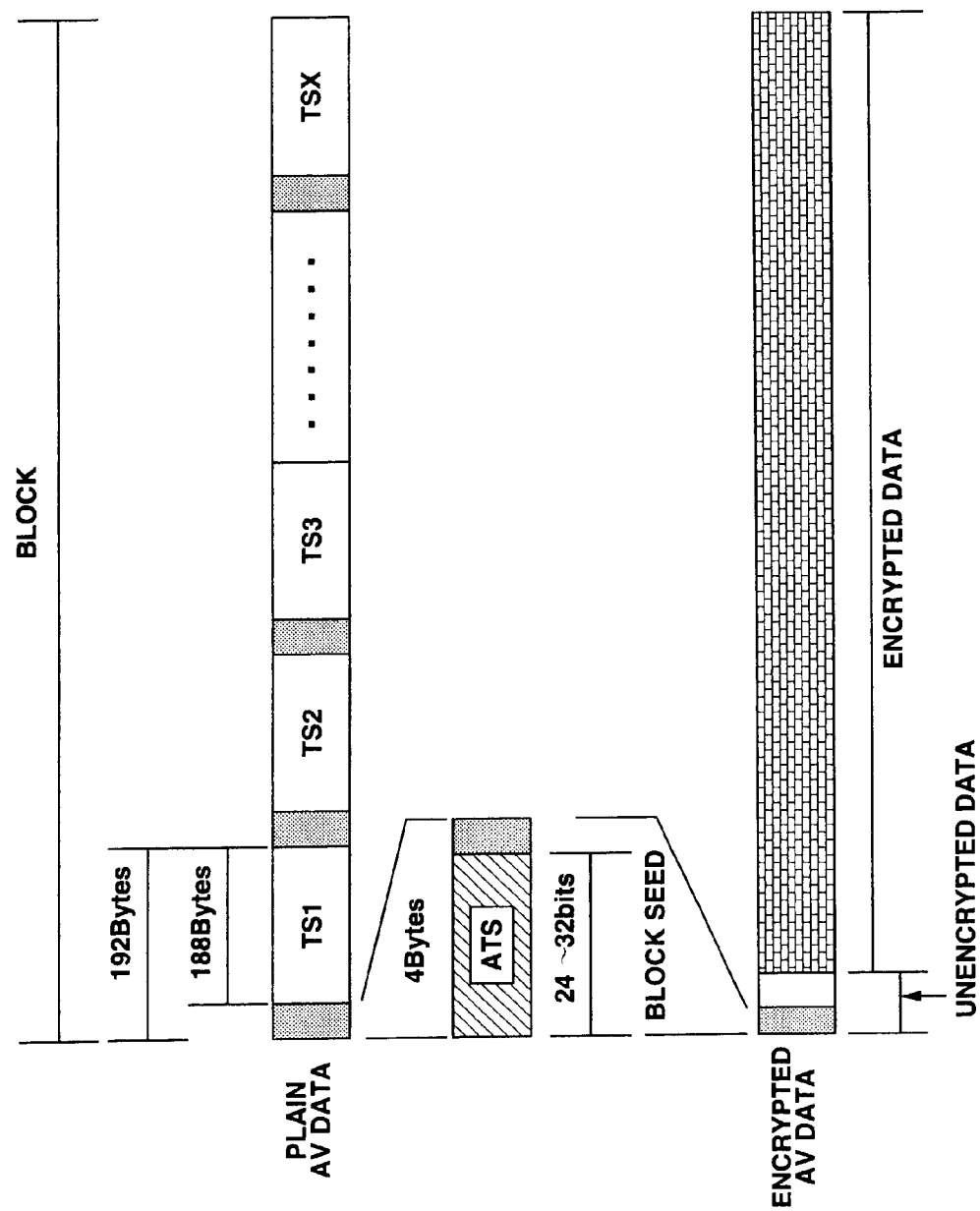

INPUT TRANSPORT STREAM

OUTPUT OF BLOCK SEED APPENDING CIRCUIT

AV DATA ON RECORDING MEDIUM

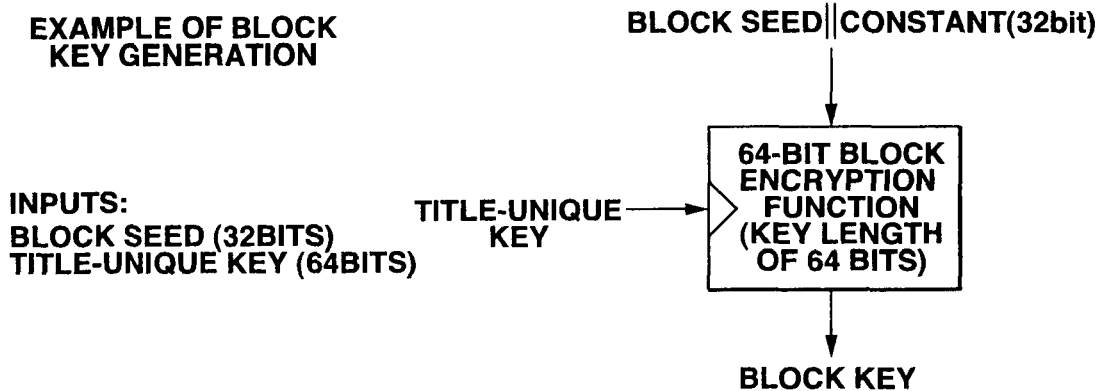
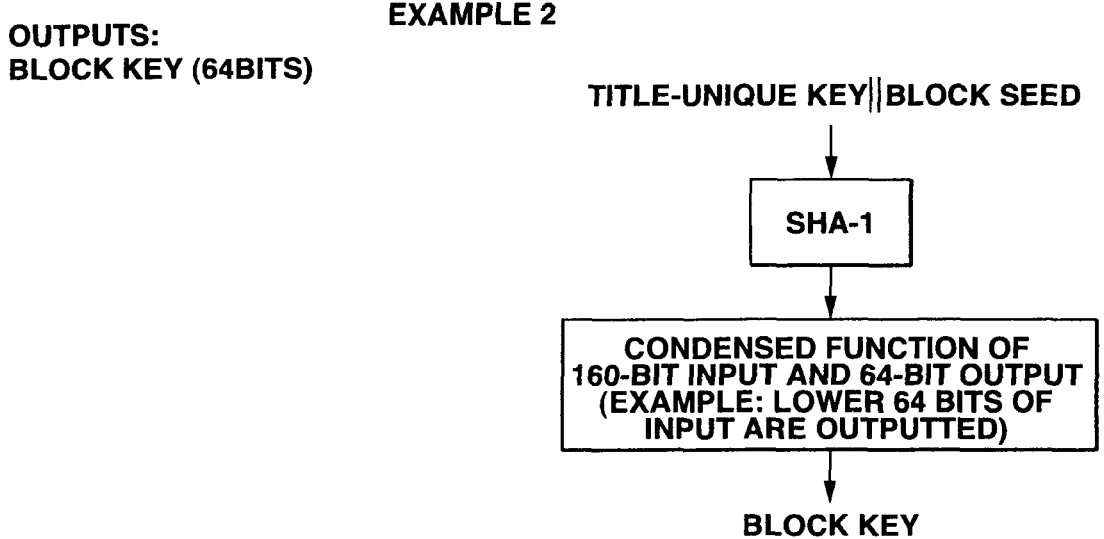
FIG.14

EXAMPLE 1
EXAMPLE OF DEVICE-UNIQUE KEY GENERATION
INPUTS:
MASTER KEY (64BITS)
DISC ID (64BITS)
OUTPUTS:
DISC-UNIQUE KEY (64BITS)
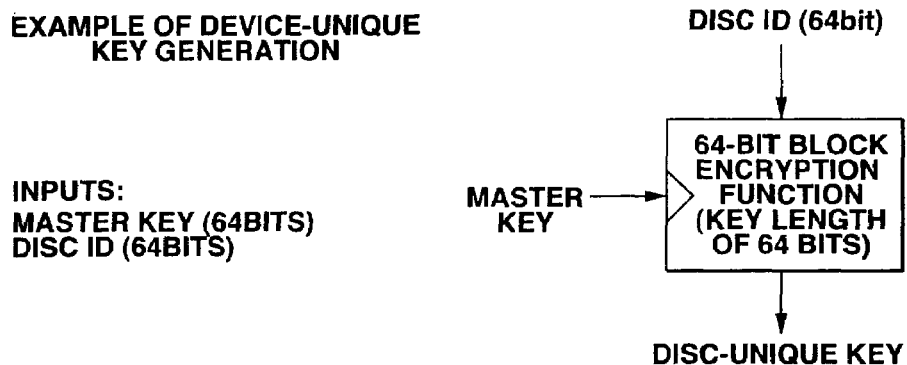
EXAMPLE 2
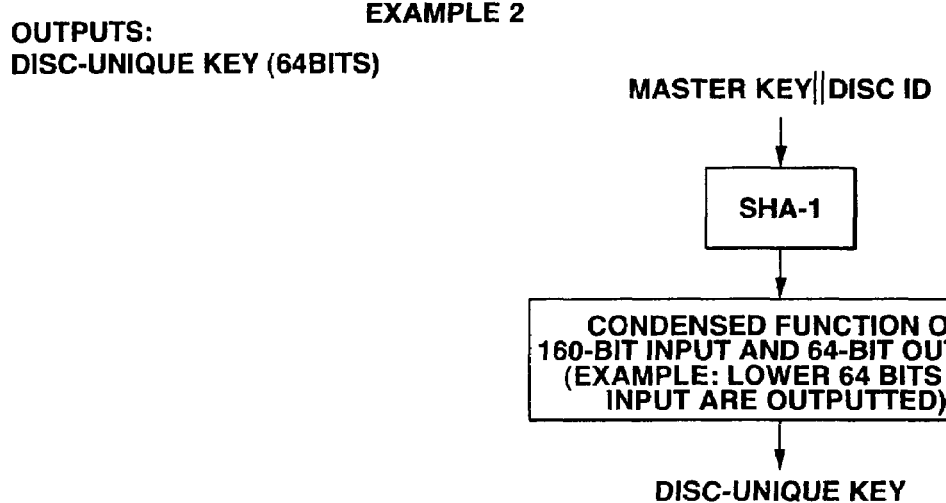
FIG.26

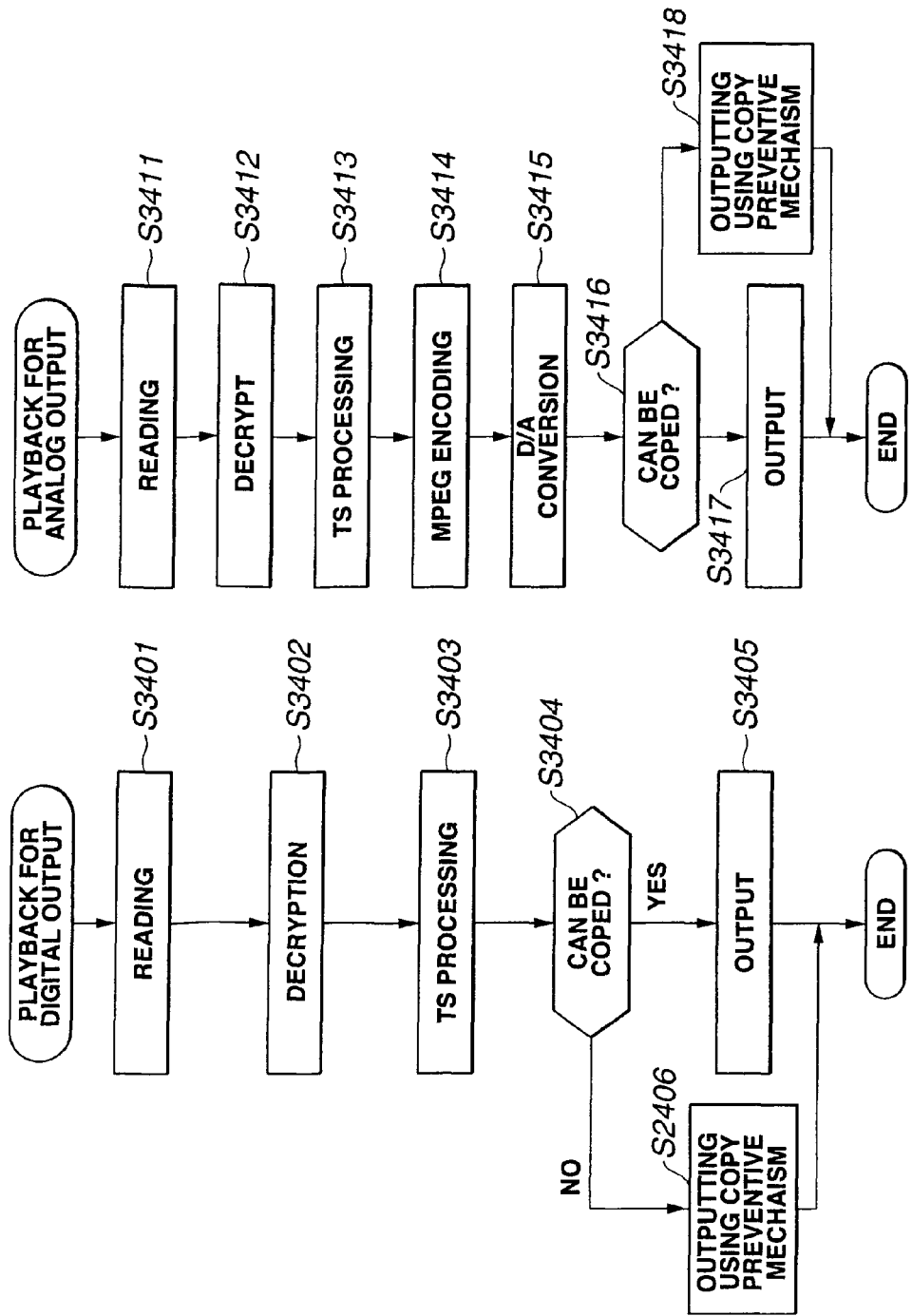

INFORMATION PLAYING/REPRODUCING APPARATUS AND METHOD

CROSS REFERENCE TO RELATED APPLICATIONS

This application is a divisional application of U.S. patent application Ser. No. 11/626,288, filed Jan. 23, 2007, which is a continuation application of U.S. application Ser. No. 09/980,390, filed on Mar. 13, 2002, now U.S. Pat. No. 7,181,624, which is a National Stage application of PCT/JP01/02928 filed Apr. 4, 2001 and claims priority to Japanese Patent Application No. 2000-101862 filed Apr. 4, 2000, and Japanese Patent Application No. 2000-243207 of Aug. 10, 2000. The entire contents of U.S. patent application Ser. No. 11/626,288 and U.S. application Ser. No. 09/980,390 are incorporated herein by reference.

TECHNICAL FIELD

The present invention relates generally to an information recorder, information player, information recording method, information playback method, information recording medium, and a program serving medium, and more particularly to an information recorder, information player, information recording method, information playback method, information recording medium, and a program serving medium, capable of preventing data from being illegally copied in data write to, and data read from, a recording medium to and from which data can be recorded and played back.

BACKGROUND ART

With the recent advancement and development of the digital signal processing technology, digital recorders and recording media have been prevailing. With such a digital recorder and recording medium, an image or sound, for example, can be repeatedly recorded and played back without any degradation thereof. Since digital data can be repeatedly copied many times with no degradation of the image and sound qualities, so recording media having digital data illegally recorded therein, if put on the market, will cause the copyrighters of various contents such as music, movie, etc. or legal distributors of the contents to be deprived of profits which would come to the latter if such illegal copying is not possible. To prevent such illegal copying of digital data, various illegal-copy preventing systems have recently been introduced in digital recorders and recording media.

As an example of the above illegal-copy preventing systems, SCMS (Serial Copy Management System) is adopted in the MD (mini disc) drive (MD is a trademark). The SCMS is such that at a data player side, audio data is outputted along with SCMS signal from a digital interface (DIF) while at a data recorder side, recording of the audio data from the data player side is controlled based on the SCMS signal from the data player side, thereby preventing the audio data from being illegally copied.

More particularly, the above SCMS signal indicates that an audio data is a "copy-free" data which is allowed to freely be copied many times, a "copy-once-allowed" data which is allowed to be copied only once or a "copy-prohibited" data which is prohibited from being copied. At the data recorder side, when receiving an audio data from the DIF, SCMS signal transmitted along with the audio data is detected. If the SCMS signal indicates that the audio data is a "copy-free" data, the audio data is recorded along with the SCMS signal to the mini disc. If the SCMS signal indicates that the audio data is a "copy-once-allowed" data, the audio data is converted to a "copy-prohibited" data and the SCMS signal is recorded along with the audio data to the mini disc. Further, if the SCMS signal indicates that the audio data is a copy-prohibited data, the audio data is not recorded to the mini disc. Under a control with the SCMS signal, a copyrighted audio data is prevented from being illegally copied in the mini disc drive unit.

However, the SCMS is valid only when the data recorder itself is constructed to control recording of audio data from the data player side based on the SCMS signal.

Therefore, it is difficult for the SCMS to support a mini disc drive not constructed to perform the SCMS control. To apply the SCMS, a DVD player for example adopts a content scrambling system to prevent a copyrighted data from being illegally copied.

The content scrambling system is such that encrypted video data, audio data and the like are recorded in a DVD-ROM (read-only memory) and a decryption key for use to decrypt the encrypted data is given to each licensed DVD player. The license is granted to a DVD player designed in conformity with a predetermined operation rule against illegal copying etc. Therefore, using the given decryption key, a licensed DVD player can decrypt encrypted data recorded in a DVD-ROM to thereby play back the video and audio data from the DVD-ROM.

On the other hand, an unlicensed DVD player cannot decrypt encrypted data recorded in a DVD-ROM because it has no decryption key for the encrypted data. In short, the content scrambling system prevents a DVD player not meeting the licensing requirements from playing a DVD-ROM having digital data recorded therein in order to prevent illegal copying.

However, the content scrambling system adopted in the DVD-ROM is directed to a recording medium to which the user cannot write data (will be referred to as "ROM medium" hereunder wherever appropriate), but not to any recording medium to which the user can write data (will be referred to as "RAM medium" hereunder wherever appropriate).

That is to say, copying all encrypted data recorded in a ROM medium as they are to a RAM medium will produce a so-called pirated edition of the data which can be played back by a licensed DVD player.

To solve the above problem, the Applicant of the present invention proposed, as disclosed in the Japanese Published Unexamined Application No. 224461 of 1999 (Japanese Patent Application No. 25310 of 1998), a method in which information to identify each recording medium (will be referred to as "medium ID information" hereunder) is recorded with other data in a recording medium to allow access to the medium ID information in the recording medium only when a player going to play the recording medium has been licensed for the medium II) information.

The above method encrypts data in the recording medium with a private key (master key) acquired through licensing of the medium ID information so that any unlicensed player cannot acquire any meaningful data even if it can read the encrypted data. Note that a player licensed for the medium ID information has the operation thereof limited against illegal copying.

No unlicensed player can access the medium ID information. The medium ID information is unique to each recording medium. Even if an unlicensed player could copy all encrypted data recorded in such a recording medium to a new recording medium, the data thus recorded in the new recording medium cannot correctly be decrypted by the unlicensed player as well as by a licensed player. Thus, it is substantially possible to prevent data from being illegally copied.

Now it should be reminded that the method disclosed in the above Japanese Published Unexamined Application No. 224461 of 1999 (Japanese Patent Application No. 25310 of 1998) uses a sector key unique to each sector of a disc to encrypt content data such as image, sound, program, etc. to be recorded to the disc.

The above method is destined to solve a problem that if a large amount of data is encrypted with a single encryption key, the encryption key is likely to be uncovered by a differential attack or linear attack with a combination of an encrypted text stored in the recording medium and plain or unencrypted data acquired by an attacker by some means. In the method in the above Japanese Published Unexamined Application of the Applicant of the present invention, a different encryption key is assigned to each of sectors of a predetermined size so that only a limited amount of data can be processed with one encryption key, thereby making it difficult to disclose the encryption key. Further, the method can minimize the amount of data that can be decrypted if the encryption key is uncovered.

In the example described in the above Japanese Published Unexamined Application, however, an encryption key (sector key) for each sector, used for encryption of a content, is further encrypted with a higher-order key and stored in a sector header of a recording medium. Thus, the recording medium has to provide an area wide enough to store the sector key in the sector header, and for recording or playing back the content, access has to be made to the sector header for writing (for recording) or reading (for playback) of the encrypted sector key.

DISCLOSURE OF THE INVENTION

Accordingly, the present invention has an object to overcome the above-mentioned drawbacks of the prior art by providing an information recorder, information player, information recording method, information playback method, information recording medium and a program serving medium, in which block data can be encrypted with different encryption keys, respectively, to enhance the protection against cryptanalysis of the data without having to additionally provide any storage area for the encryption keys in a recording medium or a disc, namely, without narrowing an available data area in the recording medium.

More particularly, the present invention has an object to provide an information recorder, information player, information recording method, information playback method, information recording medium and a program serving medium, in which an arrival time stamp (ATS) formed as random data corresponding to an arrival time of each packet included in a transport stream of a data is used to generate a block key intended to encrypt a block data, thereby enhancing the protection against cryptanalysis of the data, and in which the ATS is used to generate a block key for each block without having to provide, in a recording medium, an additional area for storage of an encryption key for each block, thereby enabling an effective use of a main data area in the recording medium.

According to the first aspect of the present invention, there can be provided an information recorder for recording information to a recording medium, the apparatus including: a transport stream processing means for appending an arrival time stamp (ATS) to each of discrete transport packets included in a transport stream; and a cryptography means for generating a block key for encrypting a block data including more than one transport packet each having the appended arrival time stamp (ATS) from a block seed which is additional information unique to the block data and including the arrival time stamp (ATS), and encrypting each block data with the block key thus generated; the data encrypted by the cryptography means being recorded to the recording medium.

In the above information recorder according to the present invention, the cryptography means generates the block key for encrypting the block data from a block seed which is additional information unique to the block data and including the arrival time stamp (ATS) appended to a leading one of the plurality of transport packets included in the block data.

Further in the above information recorder according to the present invention, the cryptography means generates a title-unique key from a master key stored in the information recorder, a disc ID being a recording medium identifier unique to a recording medium and a title key unique to data to be recorded to the recording medium, and generates the block key from the title-unique key and block seed.

Also in the above information recorder according to the present invention, the cryptography means generates a disc ID being a recording medium identifier unique to a recording medium and a title key unique to data to be recorded to the recording medium, and stores them into the recording medium.

Further in the above information recorder according to the present invention, the block seed includes copy control information in addition to the arrival time stamp (ATS).

Also in the above information recorder according to the present invention, in encryption of the block data, the cryptography means encrypts, with the block key, only data included in the block data and excluding data in a leading area including a block seed of the block data.

Further in the above information recorder according to the present invention, the cryptography means generates a title-unique key from a master key stored in the information recorder, a disc ID being a recording medium identifier unique to a recording medium and a title key unique to data to be recorded to the recording medium, takes the thus-generated title-unique key as a key for an encryption function, places the block seed into the encryption function, and outputs a result of the placement as a block key.

Also in the above information recorder according to the present invention, the cryptography means generates a title-unique key from a master key stored in the information recorder, a disc ID being a recording medium identifier unique to a recording medium and a title key unique to data to be recorded to the recording medium, places the title-unique key thus generated and block seed into a one-way function, and outputs a result of the placement as a block key.

Further in the above information recorder according to the present invention, the cryptography means generates a device-unique key from any of an LSI key stored in an LSI included in the cryptography means, a device key stored in the information recorder, a medium key stored in the recording medium and a drive key stored in a drive unit for the recording medium or a combination of these keys, and generates a block key for encrypting the block data from the device-unique key thus generated and block seed.

Also in the above information recorder according to the present invention, the cryptography means encrypts block data with the block key according to a DES algorithm.

Further the above information recorder includes an interface means for receiving information to be recorded to a recording medium, and identifying copy control information appended to each of packets included in the transport stream to judge, based on the copy control information, whether or not recording to the recording medium is allowed.

Furthermore, the above information recorder includes an interface means for receiving information to be recorded to a recording medium, and identifying 2-bit EMI (encryption mode indicator) as copy control information to judge, based on the EMI, whether or not recording to the recording medium is allowed.

According to the second aspect of the present invention, there can be provided an information player for playing back information from a recording medium, the apparatus including: a cryptography means for decrypting encrypted data recorded in the recording medium by generating a block key for decrypting encrypted data in a block data having an arrival time stamp (ATS) appended to each of a plurality of transport packets from a block seed which is additional information unique to the block data and including the arrival time stamp (ATS), and decrypting each block data with the block key thus generated; and a transport stream processing means for controlling data output on the basis of the arrival time stamp (ATS) appended to each of the plurality of transport packets included in the block data having been decrypted by the cryptography means.

In the above information player according to the present invention, the cryptography means generates the block key for decrypting the block data from a block seed which is additional information unique to the block data and including the arrival time stamp (ATS) appended to a leading one of the plurality of transport packets included in the block data.

Further in the above information player according to the present invention, the cryptography means generates a title-unique key from a master key stored in the information player, a disc ID being a recording medium identifier unique to a recording medium and a title key unique to data to be recorded to the recording medium, and generates the block key from the title-unique key and block seed.

Further in the above information player according to the present invention, the block seed includes copy control information in addition to the arrival time stamp (ATS).

Also in the above information player according to the present invention, in decryption of the block data, the cryptography means decrypts, with the block key, only data included in the block data and excluding data in a leading area including a block seed of the block data.

Further in the above information player according to the present invention, the cryptography means generates a title-unique key from a master key stored in the information player, a disc ID being a recording medium identifier unique to a recording medium and a title key unique to data to be recorded to the recording medium, takes the thus-generated title-unique key as a key for an encryption function, places the block seed into the encryption function, and outputs a result of the placement as a block key.

Also in the above information player according to the present invention, the cryptography means generates a title-unique key from a master key stored in the information player, a disc ID being a recording medium identifier unique to a recording medium and a title key unique to data to be recorded to the recording medium, places the title-unique key thus generated and block seed into a one-way function, and outputs a result of the placement as a block key.

Further in the above information player according to the present invention, the cryptography means generates a device-unique key from any of an LSI key stored in an LSI included in the cryptography means, a device key stored in the information player, a medium key stored in the recording medium and a drive key stored in a drive unit for the recording medium or a combination of these keys, and generates a block key for decrypting the block data from the device-unique key thus generated and block seed.

Also in the above information player according to the present invention, the cryptography means decrypts block data with the block key according to a DES algorithm.

Further the above information player includes an interface means for receiving information to be recorded to a recording medium, and identifying copy control information appended to each of packets included in the transport stream to judge, based on the copy control information, whether or not playback from the recording medium is allowed.

Furthermore, the above information player includes an interface means for receiving information to be played back from a recording medium, and identifying 2-bit EMI (encryption mode indicator) as copy control information to judge, based on the EMI, whether or not playback the recording medium is allowed.

According to the third another aspect of the present invention, there can be provided a method for recording information to a recording medium, the method including the steps of: appending an arrival time stamp (ATS) to each of discrete transport packets included in a transport stream; and generating a block key for encrypting a block data including more than one transport packet each having the appended arrival time stamp (ATS) from a block seed which is additional information unique to the block data and including the arrival time stamp (ATS), and encrypting each block data with the block key thus generated; the data encrypted in the cryptographic step being recorded to the recording medium.

In the above information recording method according to the present invention, in the cryptographic step, the block key for encrypting the block data is generated from a block seed which is additional information unique to the block data and including the arrival time stamp (ATS) appended to a leading one of the plurality of transport packets included in the block data.

Further in the above information recording method according to the present invention, in the cryptographic step, a title-unique key is generated from a master key stored in the information recorder, a disc ID being a recording medium identifier unique to a recording medium and a title key unique to data to be recorded to the recording medium, and the block key is generated from the title-unique key and block seed.

Also the above information recording method according to the present invention includes the step of generating a disc ID being a recording medium identifier unique to a recording medium and a title key unique to data to be recorded to the recording medium, and storing them into the recording medium.

Also in the above information recording method according to the present invention, in the cryptographic step, only data included in the block data and excluding data in a leading area including a block seed of the block data is encrypted with the block key.

Further in the above information recording method according to the present invention, in the cryptographic step, a title-unique key is generated from a master key stored in the information recorder, a disc ID being a recording medium identifier unique to a recording medium and a title key unique to data to be recorded to the recording medium, the title-unique key thus generated is taken as a key for an encryption function, the block seed is placed into the encryption function, and a result of the placement is outputted as a block key.

Also in the above information recording method according to the present invention, in the cryptographic step, a title-unique key is generated from a master key stored in the information recorder, a disc ID being a recording medium identifier unique to a recording medium and a title key unique to data to be recorded to the recording medium, the title-unique key thus generated and block seed are placed into a one-way function, and a result of the placement is outputted as a block key.

Further in the above information recording method according to the present invention, in the cryptographic step, a device-unique key is generated from any of an LSI key stored in an LSI included in the cryptography means, a device key stored in an information recorder, a medium key stored in the recording medium and a drive key stored in a drive unit for the recording medium or a combination of any of these keys, and a block key for encrypting the block data is generated from the device-unique key thus generated and block seed.

Also in the above information recording method according to the present invention, in the cryptographic step, the block key-based block data encryption is made according to a DES algorithm.

Further the above information recording method includes the step of identifying copy control information appended to each of packets included in the transport stream to judge, based on the copy control information, whether or not recording to the recording medium is allowed.

Furthermore, the above information recording method includes the step of identifying 2-bit EMI (encryption mode indicator) as copy control information to judge, based on the EMI, whether or not recording to the recording medium is allowed.

According to the fourth aspect of the present invention, there can be provided a method for playing back information from a recording medium, the method including the steps of: generating a block key for decrypting encrypted data in a block data having an arrival time stamp (ATS) appended to each of a plurality of transport packets from a block seed which is additional information unique to the block data and including the arrival time stamp (ATS), and decrypting each block data with the block key thus generated; and controlling data output on the basis of the arrival time stamp (ATS) appended to each of the plurality of transport packets included in the block data having been decrypted in the decrypting step.

In the above information playback method according to the present invention, in the decrypting step, the block key for decrypting the block data is generated from a block seed which is additional information unique to the block data and including the arrival time stamp (ATS) appended to a leading one of the plurality of transport packets included in the block data.

Further in the above information playback method according to the present invention, in the decrypting step, a title-unique key is generated from a master key stored in the information player, a disc ID being a recording medium identifier unique to a recording medium and a title key unique to data to be recorded to the recording medium, and the block key is generated from the title-unique key thus generated and block seed.

Also in the above information playback method according to the present invention, in decryption of the block data, only data included in the block data and excluding data in a leading area including a block seed of the block data is decrypted with the block key.

Further in the above information playback method according to the present invention, in the decrypting step, a title-unique key is generated from a master key stored in the information player, a disc ID being a recording medium identifier unique to a recording medium and a title key unique to data to be recorded to the recording medium, the title-unique key thus generated is taken as a key for an encryption function, the block seed is placed into the encryption function, and a result of the placement is outputted as a block key.

Also in the above information playback method according to the present invention, in the decrypting step, a title-unique key is generated from a master key stored in the information player, a disc ID being a recording medium identifier unique to a recording medium and a title key unique to data to be recorded to the recording medium, the title-unique key thus generated and block seed are placed into a one-way function, and a result of the placement is outputted as a block key.

Further in the above information playback method according to the present invention, in the decrypting step, a device-unique key is generated from any of an LSI key stored in an LSI included in the cryptography means, a device key stored in the information player, medium key stored in the recording medium and a drive key stored in a drive unit for the recording medium or a combination of any of these keys, and a block key for decrypting the block data is generated from the device-unique key thus generated and the block seed.

Also in the above information playback method according to the present invention, in the decrypting step, the block key-based block data decryption is made according to a DES algorithm.

Further the above information playback method includes the step of identifying copy control information appended to each of packets included in the transport stream to judge, based on the copy control information, whether or not playback from the recording medium is allowed.

Furthermore, the above information playback method includes the step of identifying 2-bit EMI (encryption mode indicator) as copy control information to judge, based on the EMI, whether or not playback from the recording medium is allowed.

According to the fifth aspect of the present invention, there can be provided a recording medium having recorded therein a block data including more than one packet included in a transport stream and having an arrival time stamp (ATS) appended to each of the packets, the block data including: an unencrypted data part having a block seed including the arrival time stamp (ATS) from which there is generated a block key for encrypting the block data; and an encrypted data part having been encrypted with the block key.

According to the sixth aspect of the present invention, there can be provided a program serving medium which serves a computer program under which recording of information to a recording medium is done in a computer system, the computer program including the steps of: appending an arrival time stamp (ATS) to each of discrete transport packets included in a transport stream; and generating a block key for encrypting a block data including more than one transport packet each having the appended arrival time stamp (ATS) from a block seed which is additional information unique to the block data and including the arrival time stamp (ATS), and encrypting each block data with the block key thus generated.

According to the seventh aspect of the present invention, there can be provided a program serving medium which serves a computer program under which playback of information from a recording medium is done in a computer system, the computer program including the steps of: generating a block key for decrypting encrypted data in a block data having an arrival time stamp (ATS) appended to each of a plurality of transport packets from a block seed which is block data unique additional information including the arrival time stamp (ATS), and decrypting each block data with the block key thus generated; and processing a transport stream to control data output on the basis of the arrival time stamp (ATS) appended to each of the plurality of transport packets included in the block data having been decrypted in the decrypting step.

According to the present invention, a content to be recorded to a recording medium is formed from of TS packets defined in the MPEG-2 and each packet is recorded to the recording medium along with an ATS being information on a time at which the packet has been received by a recorder. The "ATS" stands for arrival time stamp, and is a data of 24 to 32 bits. ATS is somewhat random.

A number X of TS packets each having ATS appended thereto will be recorded in one block (sector) of the recording medium, and ATS appended to the first TS packet is used to generate a block key for encrypting data in the block.

Thus, data in each block can be encrypted with a unique block key without having to provide any special area for storage of the key and access any data other than main data during recording or playback.

Further, in addition to ATS, copy control information (CCI) may be appended to a TS packet to be recorded and both the ATS and CCI be used to generate a block key.

Note that the program serving media according to the sixth and seventh aspects of the present invention are for example a medium which serves a computer program in a computer-readable form to a general-purpose computer system capable of executing various program codes. The medium is not limited to any special form but it may be any of recording media such as CD, FD, MO, etc. and transmission media such as a network.

The above program serving media define a structural or functional collaboration between a computer program and medium to perform functions of a predetermined computer program in a computer system.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 5 explains a data format processed in the information recorder/player according to the present invention.

FIG. 14 explains how a block key is generated in the information recorder/player according to the present invention.

FIG. 26 explains an example of disc-unique key generation in the information recorder/player according to the present invention.

FIGS. 34A and 34B show flows of operations effected for copy control in the data playback in the information recorder/player according to the present invention.

BEST MODE FOR CARRYING OUT THE INVENTION

[System Configuration]

Figure 1:
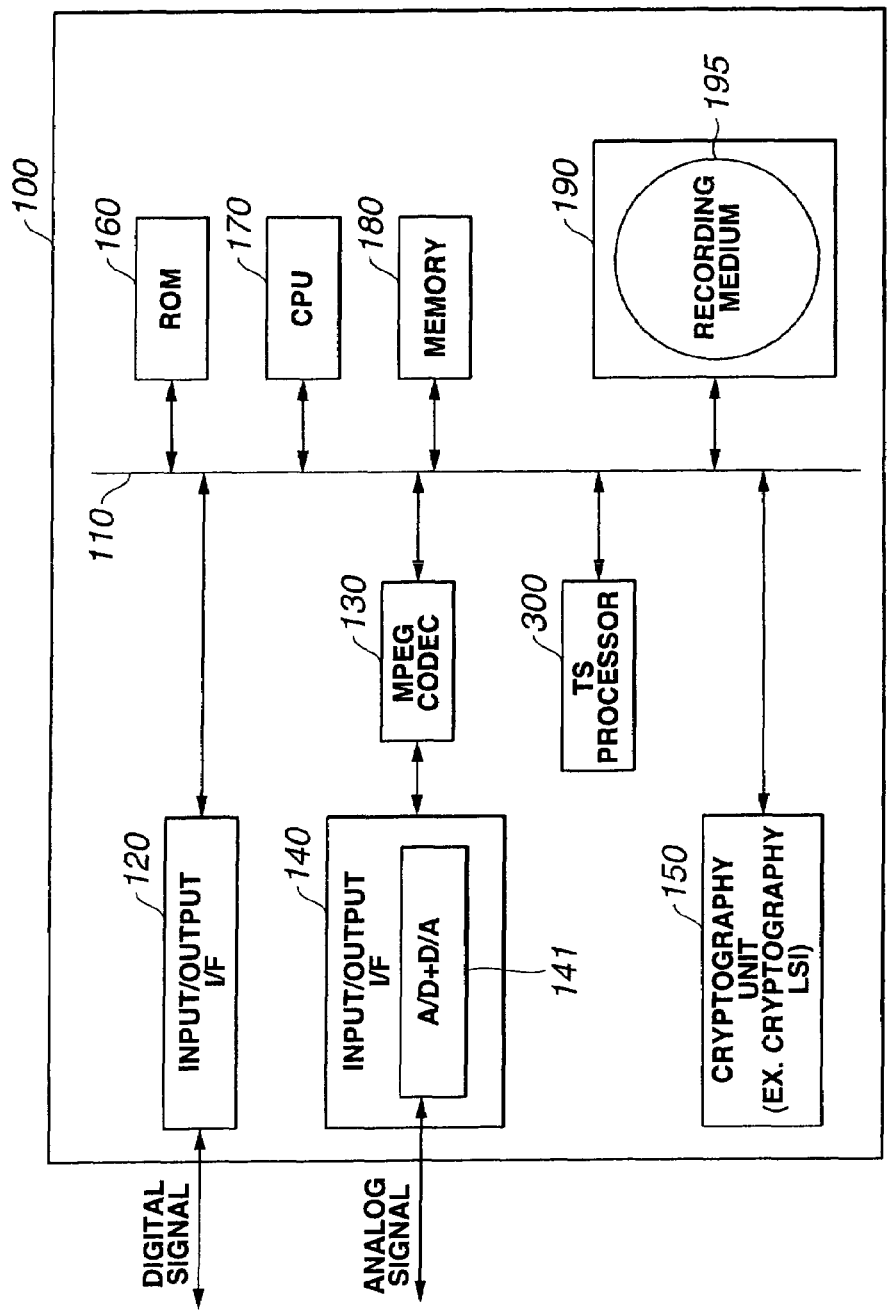
FIG. 1 is a block diagram showing a construction (1) of the information recorder/player according to the present invention.

Referring now to FIG. 1, there is schematically illustrated in the form of a block diagram an embodiment of the information recorder/player according to the present invention. The recorder/player is generally indicated with a reference 100. As shown, the recorder/player 100 includes an input/output interface (I/F) 120, MPEG (Moving Picture Experts Group) codec 130, input/output I/F 140 including an A/D converter and D/A converter combination 141, cryptography unit 150, ROM (read-only memory) 160, CPU (central processing unit) 170, memory 180, drive 190 for a recording medium 195, and a transport stream processing means (TS processor) 300. The components are connected to each other by a bus 110.

The in/output I/F 120 receives digital signals included in each of various contents such as image, sound, program or the like supplied from outside, and outputs them to the bus 110 and also to outside. The MPEG codec 130 makes MPEG decoding of MPEG-encoded data supplied via the bus 110, and outputs the MPEG-decoded data to the input/output I/F 140 while making MPEG encoding of digital signals supplied from the input/output I/F 140 and outputs the data to the bus 110. The input/output I/F 140 incorporates the A/D converter and D/A converter combination 141. The input/output I/F 140 receivers analog signals as a content from outside, makes A/D (analog-to-digital) conversion of the data and outputs digital signals thus obtained to the MPEG coder 130, while making D/A (digital-to-analog) conversion of digital signals from the MPEG codec 130 and outputs analog signals thus obtained to outside.

The cryptography unit 150 is a one-chip LSI (large scale integrated circuit) for example. It encrypts or decrypts digital signals in a content supplied via the bus 110, and outputs the data to the bus 110. Note that the cryptography unit 150 is not limited to the one-chip LSI but may be a combination of various types of software or hardware. A software-type cryptography unit will further be described later.

The ROM 160 has stored therein a device key unique to for example each recorder/player or a group of a plurality of recorders/players. The CPU 170 executes a program stored in the memory 180 to control the MPEG codec 130, cryptography unit 150, etc. The memory 180 is for example a nonvolatile memory to store for example a program to be executed by the CPU 170 and necessary data for operation of the CPU 170. The drive 190 drives the recording medium 195 capable of recording digital data to read digital data from the recording medium 195 and outputs the data to the bus 110 while supplying digital data supplied via the bus 110 to the recording medium 195 for recording to the latter. Note that the recorder/player 100 may be constructed so that the ROM 160 stores the program while the memory 180 stores the device keys.

The recording medium 195 is a medium capable of storing digital data, such as one of optical discs including a DVD, CD and the like, a magneto-optical disc, a magnetic disc, a magnetic tape or one of semiconductor memories including a RAM and the like. In this embodiment, the recording medium 195 is removably installable in the drive 190. Note however that the recording medium 195 may be incorporated in the recorder/player 100.

The transport stream processing means (TS processor) 300 extracts transport packets corresponding to a predetermined program (content) from, for example, a transport stream having a plurality of TV programs (contents) multiplexed therein, stores information on a time of appearance of the extracted transport stream appears along with each packet into the recording medium 195, and controls the time of appearance of a transport stream for reading from the recording means 195. The TS processor 300 will further be described later with FIG. 6 and subsequent drawings.

For a transport stream, there is set an ATS (arrival time stamp) as a time of appearance of each of transport packets in the transport stream. The time of appearance is determined during encoding not to cause a failure of a T-STD (transport stream system target decoder) being a virtual decoder defined in the MPEG-2 Systems, and during read of a transport stream, the time of appearance is controlled with an ATS appended to each of transport packets. The TS processor 300 performs the above kinds of control. For example, in recording of transport packets to the recording medium, the transport packets are recorded as source packets arranged with no space between successive packets and the time of appearance of each packet kept unchanged, which enables to control the output timing of each transport packet during read from the recording medium. The TS processor 300 appends ATS (arrival time stamp) indicative of a time at which each of transport packets has been received, when data is recorded to the recording medium 195 such as a DVD.

In the recorder/player 100 according to the present invention, a content including a transport stream in which the ATS is appended to each of transport packets is encrypted by the cryptography unit 150, and the content thus encrypted is stored into the recording medium 195. Further, the cryptography unit 150 decrypts an encrypted content stored in the recording medium 195. These encryption and decryption will further be described later.

Note that in FIG. 1, the cryptography unit 150 and TS processor 130 are shown as separate blocks for the convenience of the illustration and explanation but these functions may be incorporated in a one-chip LSI or performed by a combination of software or hardware pieces.

Figure 2:
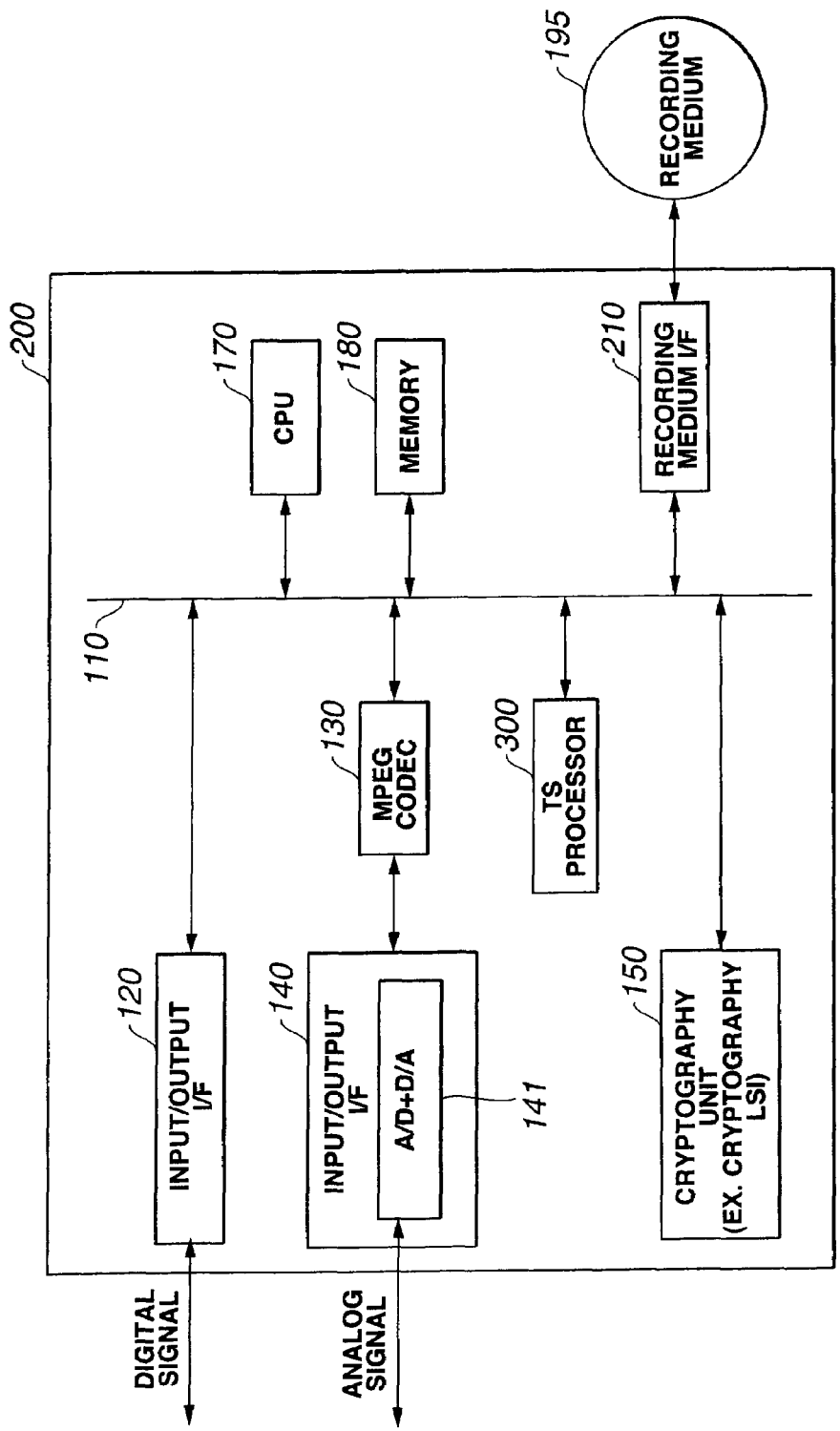
FIG. 2 is a block diagram showing a construction (2) of the information recorder/player according to the present invention.

In addition to the construction shown in FIG. 1, the recorder/player according to the present invention may be constructed as in FIG. 2. The recorder/player shown in FIG. 2 is generally indicated with a reference 200. In the recorder/player 200, a recording medium 195 is removably installable in a recording medium interface (I/F) 210 as a drive unit. Write and read of data to and from the recording medium 195 are also possible when it is used in another recorder/player. In the recorder/player as shown in FIG. 2, in which the recording medium 195 compatible with more than one recorder/player can be used, a device key unique to each recorder/player is not used but a common key to all such recorder/players, that is, a common key to the entire system, is stored in the memory 180.

[Data Recording and Playback]

Figure 3A:
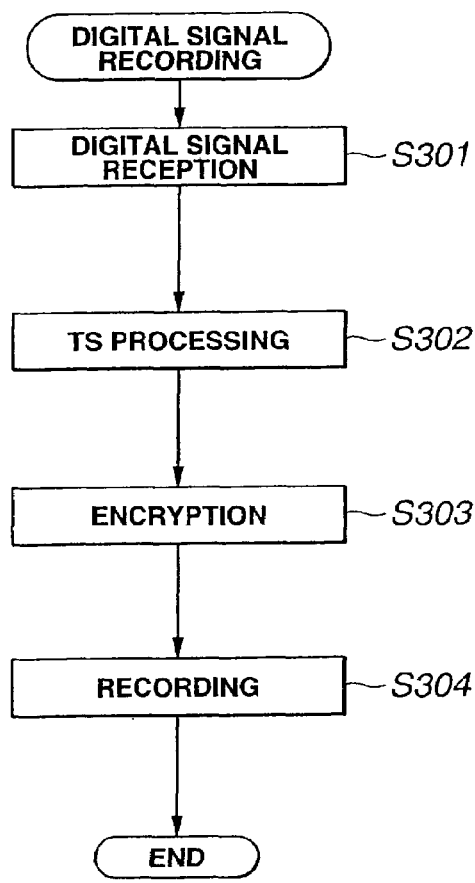
FIGS. 3A and 3B show flows of operations effected in a data recording process in the information recorder/player according to the present invention.

Referring now to FIGS. 3 and 4, there are shown flows of operations effected in data write to the recording medium in the recorder/player shown in FIG. 1 or 2, and in data read from the recording medium. For recording digital signals as a content from outside to the recording medium 195, operations are effected as shown in the flow chart in FIG. 3A. Namely, when digital signals as a content (digital content) is supplied to the input/output I/F 120 via an IEEE (Institute of Electrical and Electronics Engineers) 1394 serial bus or the like, the input/output I/F 120 will receive the digital content and outputs the data to the TS processor 300 via the bus 110 in step S301.

In step S302, the TS processor 300 generates block data in which an ATS is appended to each of transport packets in a transport stream, and outputs the data to the cryptography unit 150 via the bus 110.

In step S303, the cryptography unit 150 encrypts the received digital content, and outputs the encrypted content to the drive 190 or recording medium I/F 210 via the bus 110. In step S304, the encrypted digital content is recorded to the recording medium 195 via the drive 190 or recording medium I/F 210. Here the recorder/player exits the recording procedure. The encryption by the cryptography unit 150 will further be described later.

It should be reminded that as a standard to protect the digital content transmitted between the devices via the IEEE 1394 serial bus, "5CDTCP (Five Company Digital Transmission Content Protection)" (will be referred to as "DTCP" hereunder) was established by the five companies including the Sony Corporation being the Applicant of the present invention. It prescribes that in case a digital content not being any "copy-free" one is transmitted between devices, the transmitter and receiver sides should mutually authenticate, before the transmission, that copy control information can correctly be handled, then the digital content be encrypted at the transmitting side for transmission thereof and the encrypted digital contact (encrypted content) be decrypted at the receiving side.

In data transmission and reception under this DTCP standard, the input/output I/F 210 at the data receiver side receives the encrypted content via the IEEE 1394 serial bus, decrypts the encrypted content in conformity with the DTCP standard, and then outputs the data as a plain or unencrypted content to the cryptography unit 150 (in step S301).

For the DTCP-based encryption of a digital content, a time-varying key is to be generated. The encrypted digital content including the encryption key having been used for the encryption is transmitted over the IEEE 1493 serial bus to the receiver side, and the receiver side decrypts the encrypted digital content with the key included in the content.

More precisely, the DTCP standard prescribes that an initial value of the key and a flag indicative of a time of changing the key for encryption of digital content are included in the encrypted content. At the receiving side, the initial value of the key included in the encrypted content is changed with the timing indicated by the flag, included in the encrypted content, to generate a key having been used for the encryption, and the encrypted content is decrypted with the key thus generated. Namely, it may be considered that the encrypted content includes a key used to decrypt it, and so this consideration shall also be true in the following description. According to the DTCP standard, an informational version is available from for example a Web page identified by URL (uniform resource locator) of http://www.dtcp.com.

Figure 3B:
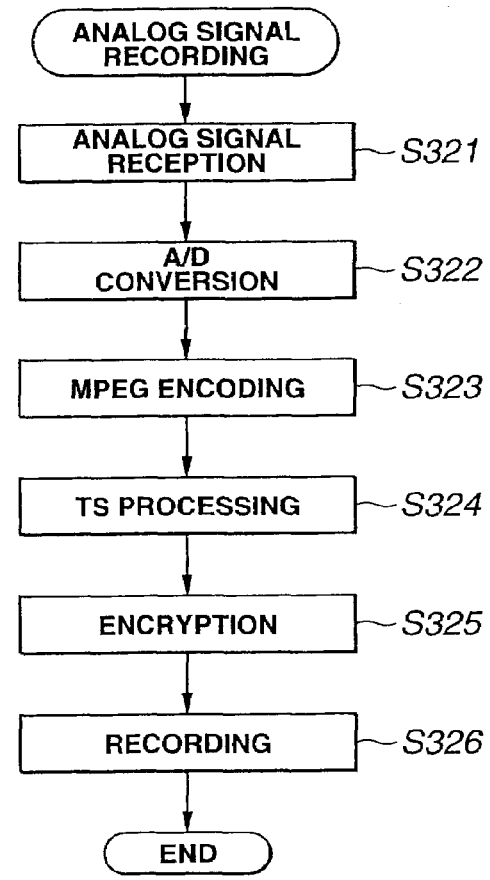

Next, write of external analog signals as a content to the recording medium 195 will be described with reference to the flow chart in FIG. 3B. When the input/output I/F 140 receives analog signals as a content (analog content) in step S321, it goes to step S322 where the A/D converter and D/A converter combination 141 will make A/D conversion of the analog content to provide digital signals as a content (digital content).

The digital content is supplied to the MPEG codec 130 which will make MPEG encoding of the digital content, namely, encoding of the digital content by MPEG compression, in step S323 and supply the encoded content to the cryptography unit 150 via the bus 110.

In subsequent steps S324, S325 and S326, similar operations to those in S302 and S303 in FIG. 3A are effected. That is, the TS processor 300 appends ATS to each of transport packets, the cryptography unit 150 encrypts the content, and the encrypted content thus obtained is recorded to the recording medium 195. Here the recorder/player exists the recording procedure.

Next, a flow of operations effected for playing back the content from the recording medium 195 and outputting it as a digital or analog content to outside will be described with reference to the flow chart in FIG. 4. This is done as in the flow chart in FIG. 4A. First in step S401, an encrypted content is read from the recording medium 195 by the drive 190 or recording medium I/F 210, and outputted to the cryptography unit 150 via the bus 110.

In step S402, the cryptography unit 150 decrypts the encrypted content supplied from the drive 190 or recording medium I/F 210, and outputs the decrypted data to the TS processor 300 via the bus 110.

In step S403, the TS processor 300 determines the timing of output based on the ATS appended to each of the transport packets included in the transport stream to make a control corresponding to the ATS, and supplies the data to the input/output I/F 120 via the bus 110. Note that the processing operations of the TS processor 300 and decryption of the digital content in the cryptography unit 150 will further be described later.

Note that when the digital content is outputted via the IEEE 1394 serial bus, the input/output I/F 120 makes a mutual authentication with a counterpart device as previously mentioned in conformity with the DTCP standard in step S404, and then encrypts the digital content for transmission.

Figures 4A, 4B:
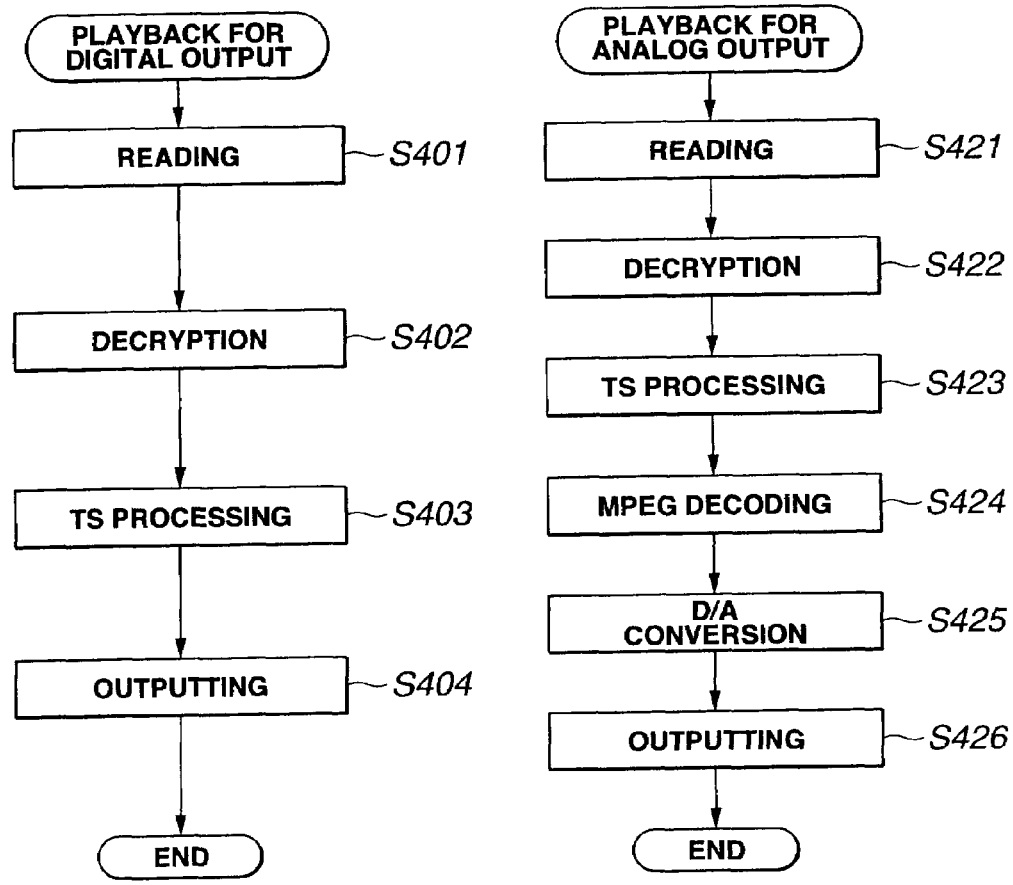
FIGS. 4A and 4B show flows of operations effected in a data playback process in the information recorder/player according to the present invention.

For reading a content from the recording medium 195 and outputting it as an analog content to outside, playback operations are done as in the flow chart shown in FIG. 4B.

Namely, similar operations to those in steps S401, S402 and S403 in FIG. 4A are effected in subsequent steps S421, S422 and S423. Thereby, the decrypted digital content provided from the cryptography unit 150 is supplied to the MPEG codec 130 via the bus 110.

In step S424, the MPEG codec 130 makes MPEG decoding of the digital content, namely, expands the digital data, and supplies the data to the input/output I/F 140. In step S425, the input/output I/F 140 makes D/A conversion of the digital content having been subjected to the MPEG decoding in the MPEG codec 130 in step S424 by the A/D converter and D/A converter combination 141. Then the input/output I/F 140 goes to step S426 where it will output the analog content to outside. Here the recorder/player exits the playback procedure.

[Data Format]

Next, the format of data written to or read from the recording medium according to the present invention will be described with reference to FIG. 5. The minimum unit in which data is read from or written to the recording medium according to the present invention is called "block". One block has a size of 192*X bytes (e.g., X=32).

According to the present invention, an ATS is appended to each MPEG2-defined TS (transport stream) packet (of 188 bytes) to provide a data of 192 bytes, and a number X of such data are taken as one block. The ATS is a data of 24 to 32 bits indicating an arrival time. ATS stands for "arrival time stamp" as having previously been described. The ATS is a random data corresponding to an arrival time of each packet. One block (sector) of the recording medium records a number X of TS (transport stream) packets each having an ATS appended thereto. According to the present invention, an ATS appended to the first one of TS packets in each of blocks included in a transport stream is used to generate a block key which is used to encrypt the data in the block (sector).

A unique key for each of the blocks is generated by generating an encrypting block key based on the random ATS. The block-unique key thus generated is used to encrypt each block. Also, by generating a block key based on the ATS, it is made unnecessary to provide an area in the recording medium for storage of the encryption key for each block and it becomes possible to effectively use the main data area in the recording medium. Further, during data playback, it is not necessary to access data other than in the main data area, which will assure a more efficient data recording or playback.

Note that a block seed shown in FIG. 5 is additional information including ATS. The block seed may also include copy control information (CCI) in addition to ATS. In this case, ATS and CCI are used to generate a block key.

Note that according to the present invention, the majority of data in a content stored into the recording medium such as a DVD is encrypted. As shown in the bottom of FIG. 5, m bytes (m=8 or 16 bytes for example) in the leading portion of a block are recorded as plain or unencrypted data, namely, not encrypted, while the remaining data (m+1 and subsequent) is encrypted because the encrypted data length is limited since the encryption is made in units of 8 bytes. Note that if the encryption may be effected in 1-byte units for example, not in 8-byte units, all the data except for the block seed may be encrypted with four bytes set in the leading portion of the block (m=4).

[Operations by the TS Processor]

The function of ATS will be described in detail hereinbelow. As having previously been described, the ATS is an arrival time stamp appended to each of transport packets included in an input transport stream to preserve a timing of appearance of the TS packet.

Figure 7A:
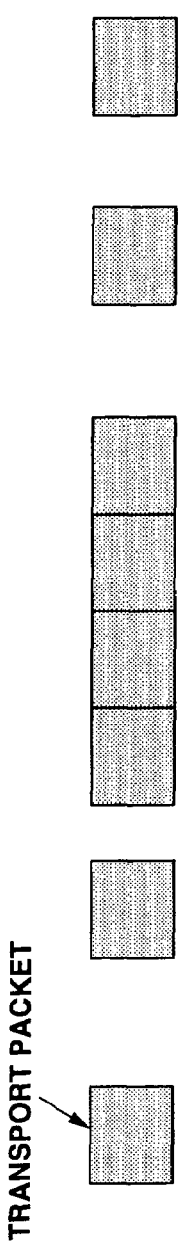
FIGS. 7A to 7C explain a transport stream processed in the information recorder/player according to the present invention.

That is, when one or some is extracted from a plurality of TV programs (contents) multiplexed in a transport stream, for example, transport packets included in the extracted transport stream appear at irregular intervals (see FIG. 7A). A timing in which each of the transport packets in a transport stream appears is important for the transport stream, and the timing of appearance is determined during encoding not to cause any failure of T-STD (transport stream system target decoder) being a virtual decoder defined in the MPEG-2 Systems (ISO/IEC 13818-1).

During playback of the transport stream, the timing of appearance is controlled based on the ATS appended to each transport packet. Therefore, when recording the transport packets to the recording medium, the input timing of the transport packet has to be preserved. When recording transport packets to a recording medium such as a DVD, an ATS indicative of the input timing of each transport packet is appended to the transport packet which is to be recorded to the recording medium.

Figure 6:
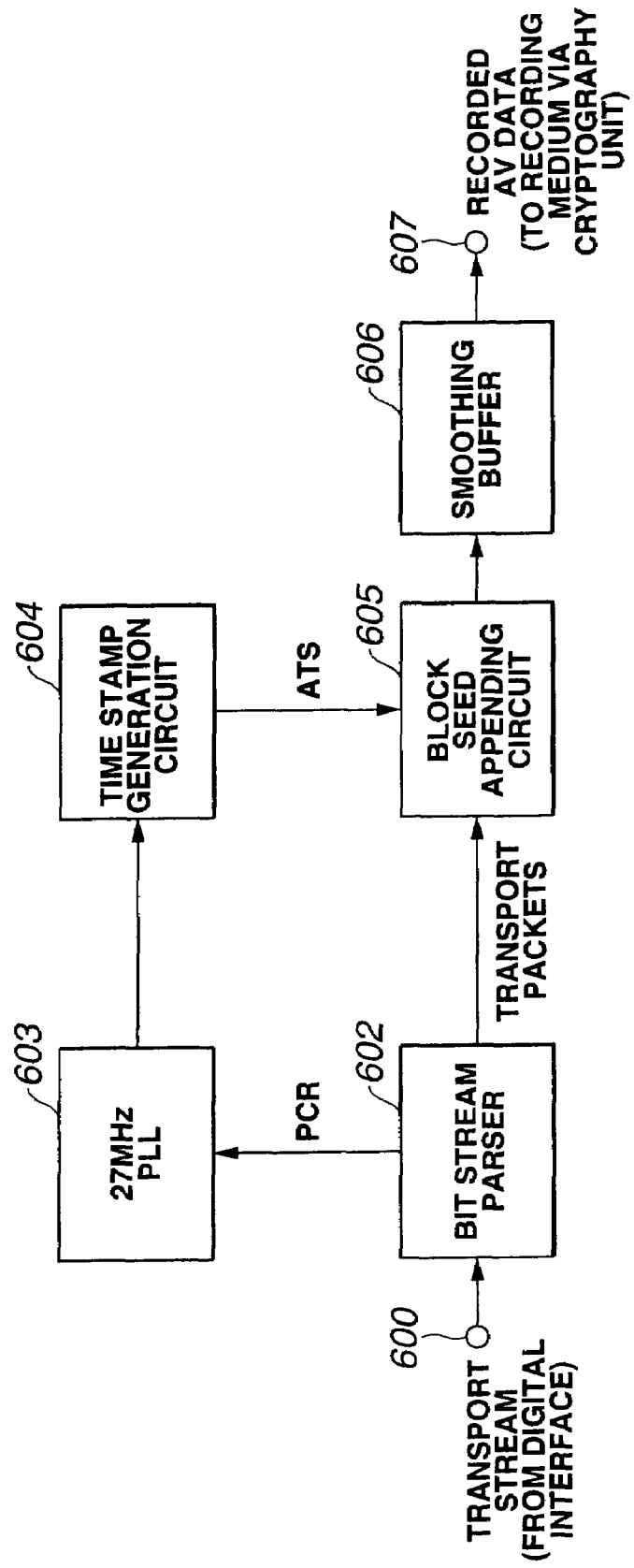
FIG. 6 is a block diagram showing the construction of a transport stream (TS) processing means in the information recorder/player according to the present invention.

FIG. 6 is a block diagram explaining the operations effected in the TS processor 300 when recording a transport stream supplied via a digital interface to a recording medium such as a DVD. As shown, the transport stream is supplied as digital data such as digital broadcast signals from a terminal 600 to the TS processor 300. As shown in FIG. 1 or 2, the transport stream is supplied from the terminal 600 via the input/output I/F 120 or the input/output I/F 140 and MPEG codec 130.

The transport stream is supplied to a bit stream parser 602 which will detect a PCR (program clock reference) packet in the input transport stream. The PCR packet is a packet in which PCR defined in the MPEG-2 Systems is encoded. The PCR packets have been encoded at time intervals of less than 100 msec. The PCR represents a time when a transport packet arrives at the receiving side with an accuracy of 27 MHz.

Then, a 27-MHz PLL 603 locks a 27-MHz clock of the recorder/player to the PCR of the transport stream. A time stamp generation circuit 604 generates a time stamp based on a count of 27-MHz clocks. A block seed appending circuit 605 appends a time stamp, indicative of a time when the first byte of the transport packet is inputted to a smoothing buffer 606, as ATS to the transport packet.

The transport packet having ATS appended thereto is outputted from a terminal 607 through the smoothing buffer 606 to the cryptography unit 150 where it will be encrypted as will further be described, and then recorded to the recording medium 195 via the drive 190 (in FIG. 1) and recording medium I/F 210 (in FIG. 2).

FIG. 7 shows, by way of example, operations effected for recording an input transport stream to the recording medium. FIG. 7A shows input of transport packets included in a certain program (content). The horizontal axis in the FIG. 7A is a time base indicative of a time of the transport stream. In this embodiment, transport packets in the input transport stream appear at irregular times as shown in FIG. 7A.

Figure 7B:
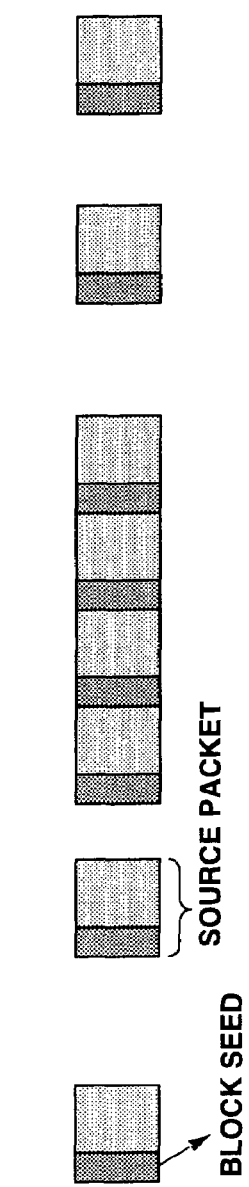
Figure 7C:
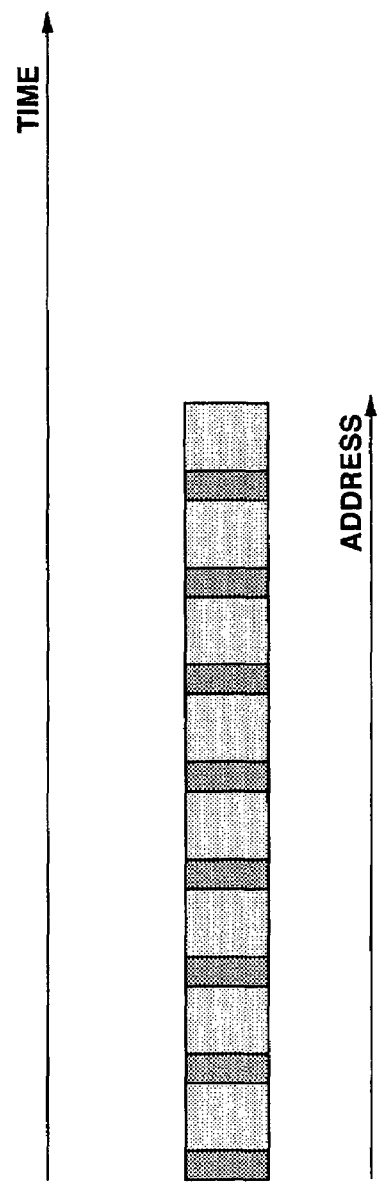

FIG. 7B shows an output of the block seed appending circuit 605. This block seed appending circuit 605 appends a block seed including an ATS indicating an arrival time of each of transport packets in a transport stream to the transport packet, and outputs a source packet. FIG. 7C shows source packets recorded in the recording medium. The source packets are recorded to the recording medium with no space between successive packets as shown in FIG. 7C. Owing to this arrangement of the source packets with no space between them, the recording area in the recording medium can be used effectively.

Figure 8:
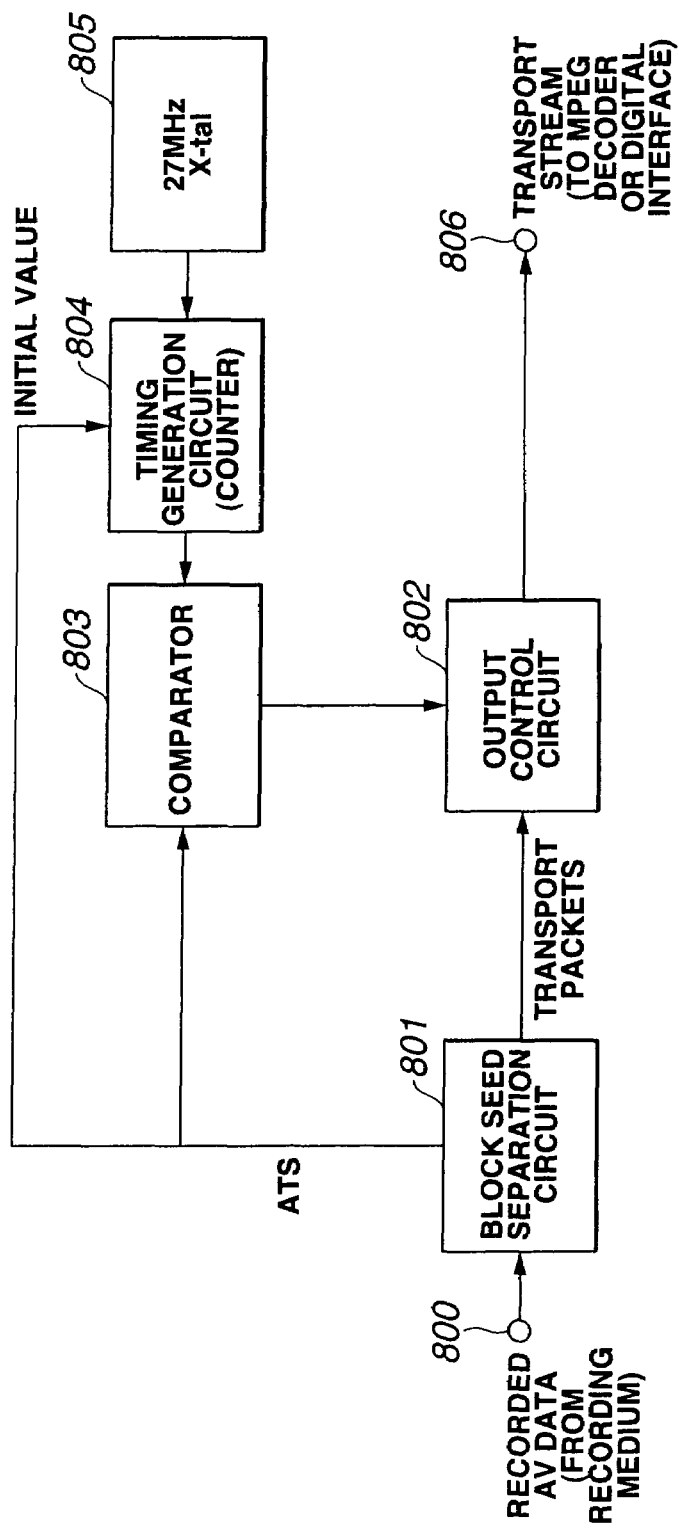
FIG. 8 is a block diagram showing the construction of a transport stream (TS) processing means in the information recorder/player according to the present invention.

FIG. 8 is a block diagram of the TS processor 300, showing a data processing procedure to read a transport stream from the recording medium 195. A transport packet having been decrypted in a cryptography unit which will further be described later and having an ATS appended thereto is supplied from a terminal 800 to a block seed separation circuit 801 where the ATS and transport packet will be separated from each other. There is provided a timing generation circuit 804 to compute a time based on a clock count of a 27-MHz clock 805 of the player.

Note that the first ATS is set as an initial value in the timing generation circuit 804. There is also provided a comparator 803 to compare the ATS with a current time supplied from the timing generation circuit 804. Also an output control circuit 802 is provided to output the transport packet to the MPEG codec 130 or digital input/output I/F 120 when a timing generated by the timing generation circuit 804 becomes equal to the ATS.

Figure 9:
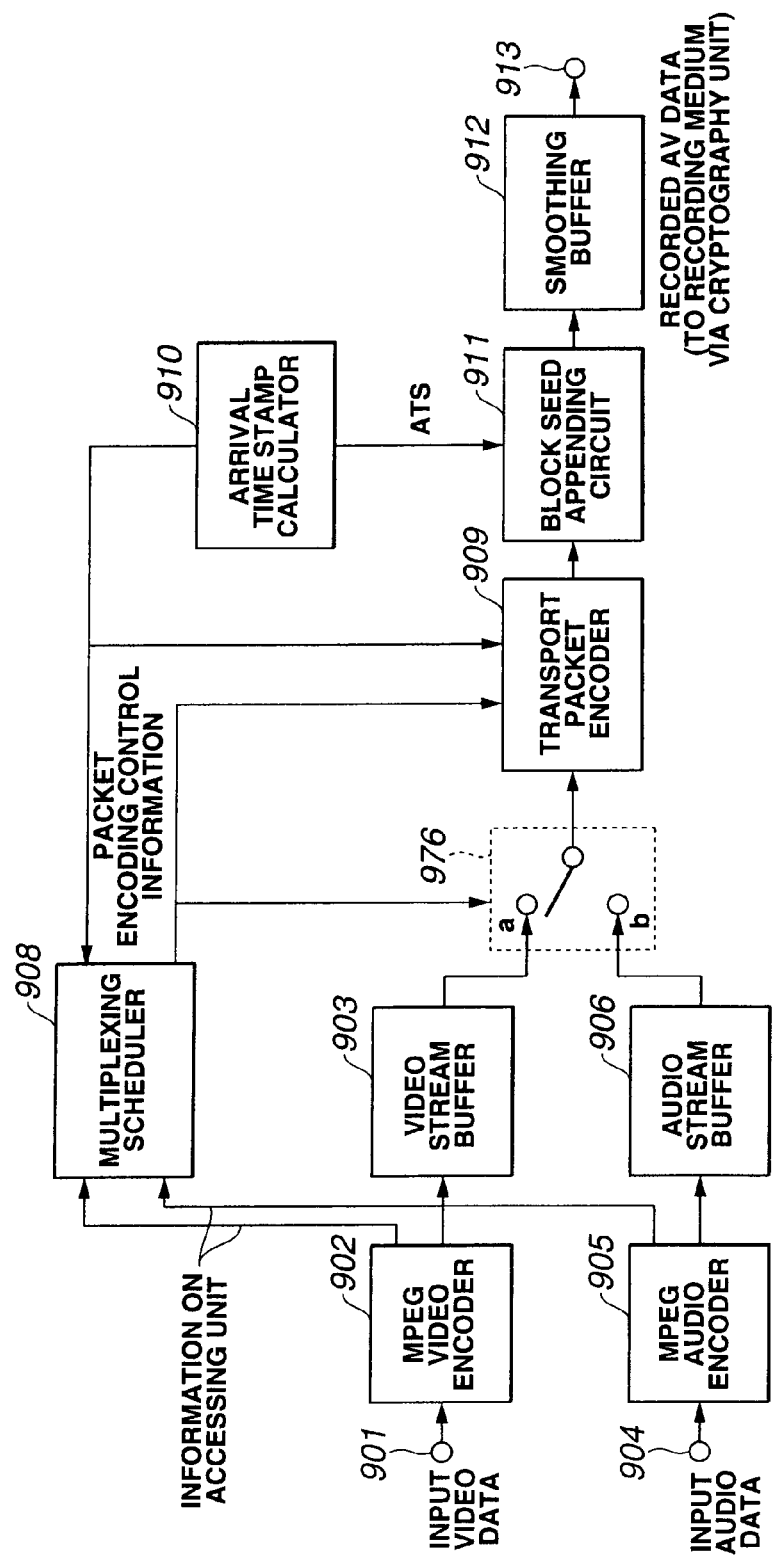
FIG. 9 is a block diagram showing the construction of a transport stream (TS) processing means in the information recorder/player according to the present invention.

FIG. 9 shows MPEG encoding of input AV signals in the MPEG codec 130 of the recorder/player 100 and encoding of the transport stream in the TS processor 300. Namely, FIG. 9 is a block diagram of operations effected in both the MPEG codec 130 in FIG. 1 or FIG. 2 and TS processor 300. Video signals are supplied from a terminal 901 to an MPEG video encoder 902.

The MPEG video encoder 902 encodes the input video signals to an MPEG video stream, and outputs the data to a video stream buffer 903. Also, the MPEG video encoder 902 outputs access unit information on the MPEG video stream to a multiplexing scheduler 908. The "access unit" of video stream includes a type, encoded bit amount and decode time stamp of each picture. The "picture type" is information on an I/P/B picture, and the "decode time stamp" is information defined in the MPEG-2 Systems.

There are supplied audio signals from an terminal 904 to an MPEG audio encoder 905. The MPEG audio encoder 905 encodes the input audio signals to an MPEG audio stream and outputs the data to a buffer 906. The MPEG audio encoder 905 outputs also access unit information on the MPEG audio stream to the multiplexing scheduler 908. The "access unit" of the audio stream is an audio frame, and the access unit information includes an encoded bit amount and decode time stamp of each audio frame.

The multiplexing scheduler 908 is supplied with both the video and audio access information, and controls encoding of the video and audio streams based on the access unit information. The multiplexing scheduler 908 incorporates a clock to generate a reference time with an accuracy of 27 MHz, and thus determines packet encoding control information for the transport packet according to the T-STD which is a virtual decoder model defined in the MPEG-2. The packet encoding control information includes the type and length of a stream to be packetized.

In case the packet encoding control information is video packets, a switch 976 is placed at a side a thereof to read, from the video stream buffer 903, video data of a payload data length designated by the packet encoding control information and supply the data to a transport packet encoder 909.

In case the packet encoding control information is audio packets, the switch 976 is placed at a side b thereof to read, from the audio stream buffer 906, audio data of a designated payload data length, and supply the data to the transport packet encoder 909.

In case the packet encoding control information is PCR packets, the transport packet encoder 909 acquires PCR supplied from the multiplexing scheduler 908 and outputs PCR packets to outside. To indicate that the packet encoding control information will not encode packets, nothing is supplied to the transport packet encoder 909.

For an indication that the packet encoding control information will not encode packets, the transport packet encoder 909 outputs no packets. In other case, transport packets are generated based on the packet encoding control information and outputted. Therefore, the transport packet encoder 909 outputs transport packets intermittently. Also there is provided an arrival time stamp calculator 910 to calculate ATS indicative of a time at which the first byte of a transport packet arrives at the receiving side, based on the PCR supplied from the multiplexing scheduler 908.

Since PCR supplied from the multiplexing scheduler 908 indicates a time at which the tenth byte of a transport packet defined in the MPEG-2 arrives at the receiving side, so the value of an ATS is a time at which a byte 10 bytes before the time indicated by PCR.

A block seed appending circuit 911 appends an ATS to each of packets outputted from the transport packet encoder 909. An ATS-appended transport packet outputted from the block seed appending circuit 911 is supplied to the cryptography unit 150 through a smoothing buffer 912 where it will be encrypted as will further be described later and then stored into the recording medium 195.

For storage into the recording medium 195, the ATS-appended transport packets are arranged with no space between them as shown in FIG. 7C and then stored into the recording medium 195 before subjected to encryption in the cryptography unit 150. Even if the transport packets are arranged with no space between them, reference to the ATS appended to each of the packets makes it possible to control the time of supplying the transport packets to the receiving side.

Note that the size of ATS is not fixed to 32 bits but it may be within a range of 24 to 32 bits. The longer the bit length of ATS, the longer the operating cycle of the ATS time counter is. For instance, in case the ATS time counter is a binary counter whose ATS counting accuracy is 27 MHz, an ATS of 24 bits in length will appear again in about 0.6 sec. This time interval is long enough for an ordinary transport stream because the packet interval of a transport stream is defined to be 0.1 sec at maximum by the MPEG-2. However, the bit length of ATS may be more than 24 bits for a sufficient allowance.

Figure 10:
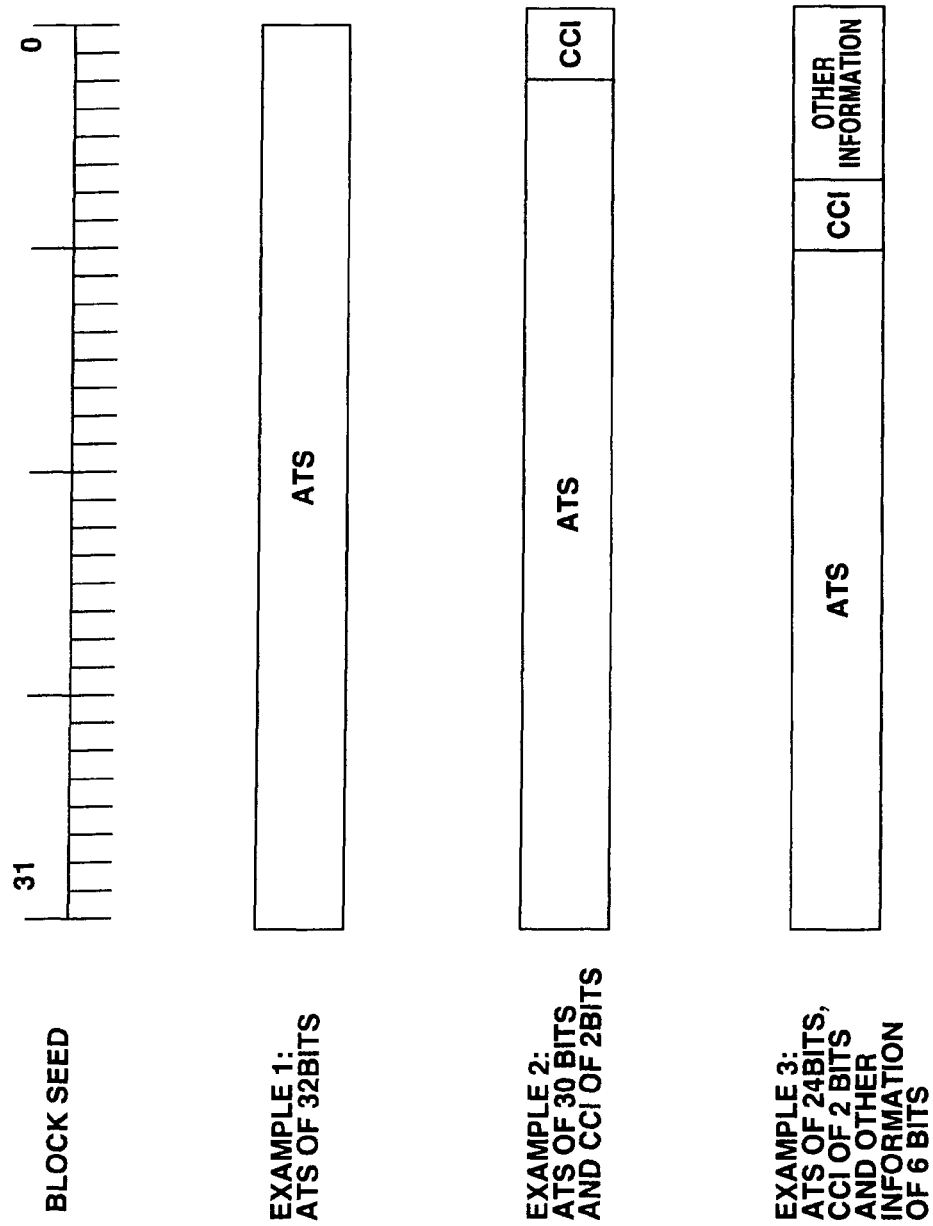
FIG. 10 shows an example of additional information to the block data processed in the information recorder/player according to the present invention.

By varying the bit length of ATS as in the above, the block seed being an additional data to a block data can be configured in some types. Example configurations of the block seed are shown in FIG. 10. Example 1 shown in FIG. 10 is a block seed using an ATS of 32 bits in length. Example 2 in FIG. 10 is a block seed using an ATS of 30 bits and copy control information (CCI) of 2 bits. The copy control information indicates a controlled state of copying of data having the CCI appended thereto. SCMS (serial copy management system) and CGMS (copy generation management system) are most well-known as copy control information. These copy control information indicate that data having the copy control information appended thereto is allowed to limitlessly be copied (copy-free), the data is allowed to be copied only for one generation (one-generation-copy-allowed) or that the data is prohibited from being copied (copy-prohibited).

An example 3 shown in FIG. 10 is a block seed using ATS of 24 bits, CCI of 2 bits and other information of 6 bits. The other information may be selected from various kinds of information such as information indicating on/off operation of a Macrovision which is a copy control mechanism for analog video data when the block seed data is outputted in an analog form.

[Encryption in Data Recording in a System with which Recorded Data has to be Compatible]

Next, there will be described an encryption to be effected in data recording in a system with which recorded data has to be compatible, namely, in a system in which a recording medium having data recorded therein in a recorder/player has to be playable in another recorder/player. The system with which recorded data has to be compatible is the recorder/player 200 for example as shown in FIG. 2. That is, the recording medium 195 having data recorded therein by the recorder/player 200 has to be playable in another recorder/player.

The encryption effected in data recording in such a system will be described with reference to the block diagrams in FIGS. 11 and 12 and flow chart in FIG. 13. An optical disc will be taken herebelow as an example of the recording medium. This embodiment is a system with which recorded data has to be compatible, that is, a system in which data recorded in a recorder/player has to be playable back in another recorder/player, as in the Japanese Published Unexamined Application No. 224461 of 1999 (Japanese Patent Application No. 25310 of 1998). In order to prevent data in the recording medium from being bit-by-bit copied, disc ID as recording medium-unique identification information is made to act on a data encryption key.

Figure 11:
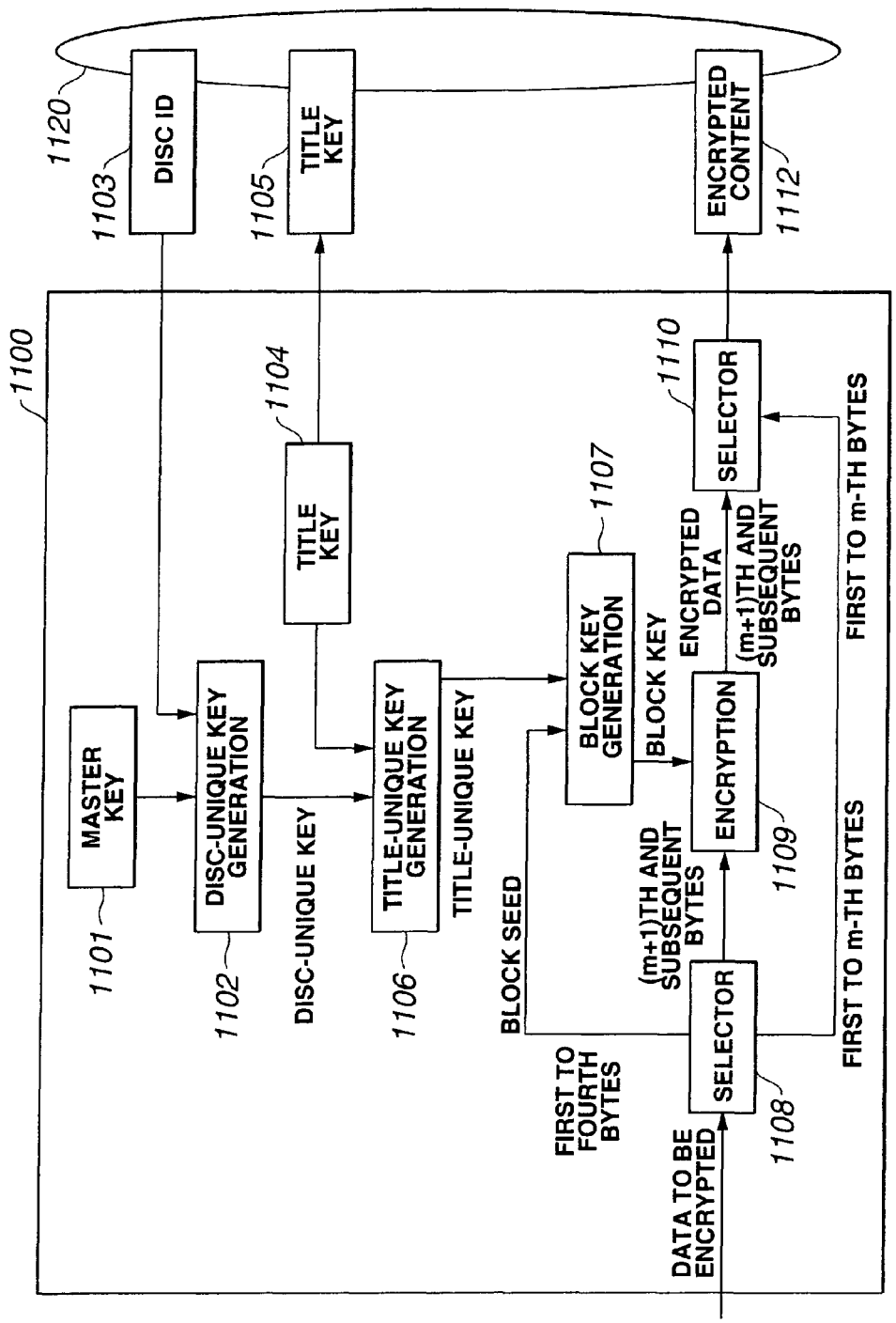
FIG. 11 is a block diagram (1) explaining the encryption effected for data recording in the information recorder/player according to the present invention in a system with which the data has to be compatible.
Figure 12:
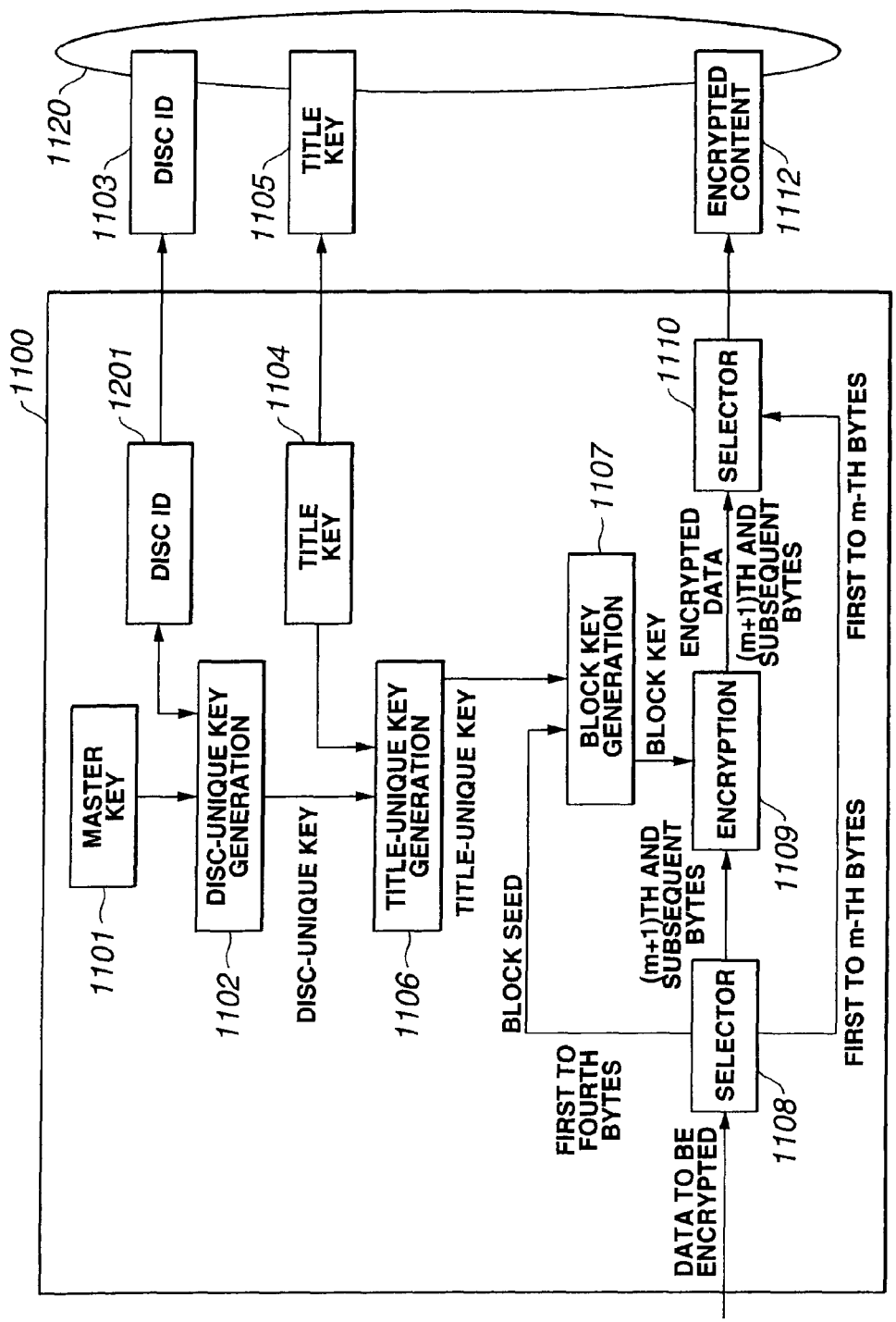
FIG. 12 is a block diagram (2) explaining the encryption effected for data recording in the information recorder/player according to the present invention in a system with which the data has to be compatible.
Figure 13:
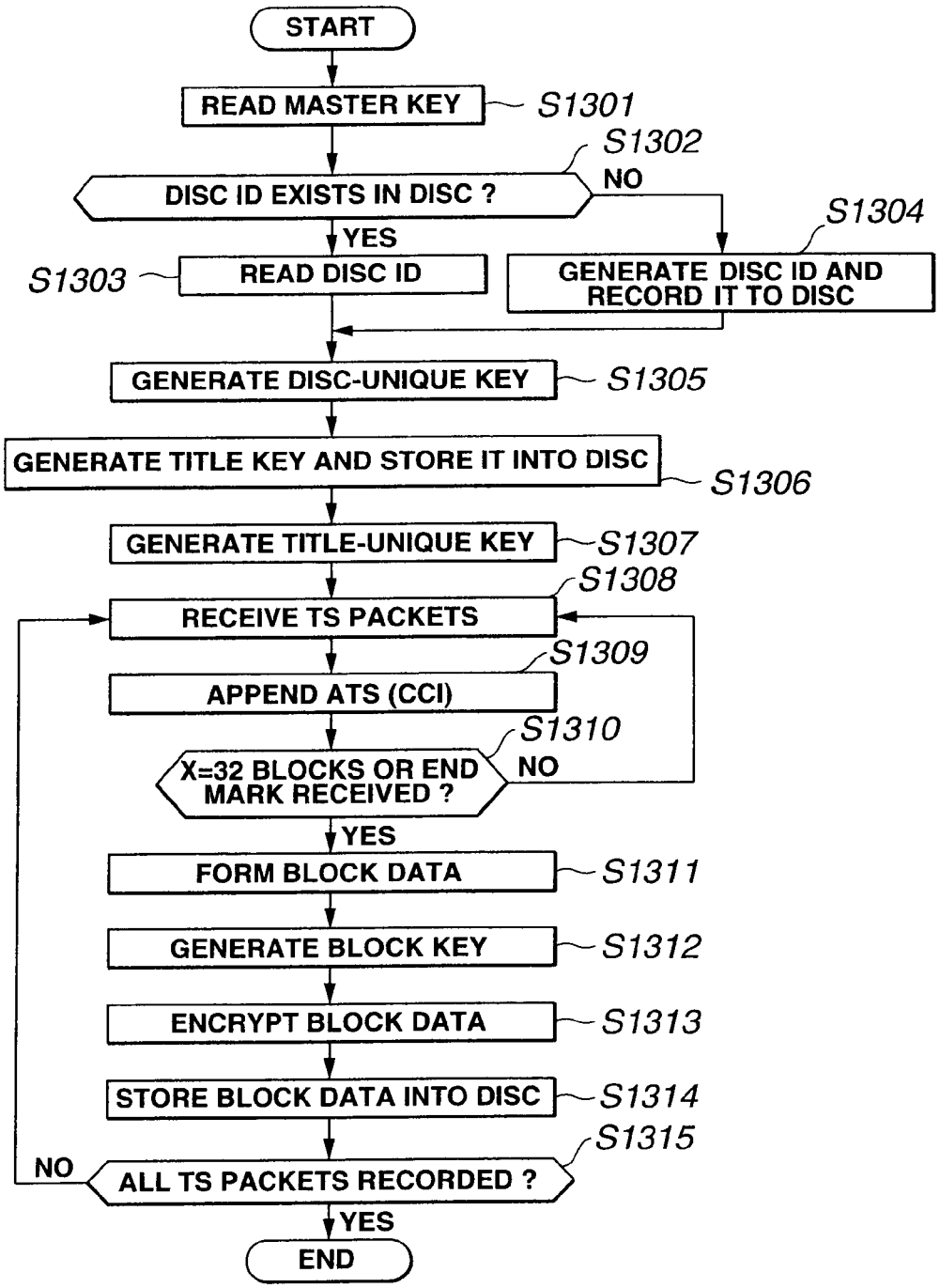
FIG. 13 shows a flow of operations made in the encryption for data recording in the information recorder/player according to the present invention in a system with which the data has to be compatible.

The data encryption by the cryptography unit 150 will be outlined herebelow with reference to the block diagrams in FIGS. 11 and 12.

A recorder/player 1100 reads a master key 1101 stored in its own memory 180 (as shown in FIG. 2). The master key 1101 is a private key stored in a licensed recorder/player, and also a common key to a plurality of recorder/players, namely, to an entire system. The recorder/player 1100 checks if a disc ID 1103 as identification information is already recorded in a recording medium 1120 which is an optical disc for example. If the disc ID 1103 is found recorded in the recording medium 1120, the recorder/player 1100 reads the disc ID 1103 (as in FIG. 11). If not, the cryptography unit 150 in the recorder/player 1100 generates a disc ID 1201 at random or by generating a predetermined random number, and records the disc ID 1201 to the disc (as in FIG. 12). For each disc, there has to be available only one such disc ID 1103, and so the disc ID can be stored in the lead-in area or the like of the disc.

Next, the recorder/player 1100 generates a disc-unique key 1102 from the master key and disc ID (as indicated at a reference 1102). More particularly, the disc-unique key is generated for example by placing data generated by bit-by-bit combination of the master key and disc ID in a hash function SHA-1 defined in FIPS 180-1 to provide an output of 160 bits and taking only data of a necessary length from the 160-bit output for use as a disc-unique key, by placing the master key and disc ID in a hash function based on a block encryption function and using a result of the placement, or otherwise.

Then, a title key unique to each record is generated (as indicated at a reference 1104) at random or by a predetermined random-number generation in the cryptography unit 150, and recorded to the disc 1120. The disc 1120 has a data management file which has stored therein information on what title is formed from data and where the data is from, and can store the title key in the file.

Next, a title-unique key is generated from the disc-unique key and title key. It can be generated in some ways, for example, by using the hash function SHA-1 or the hash function based on a block encryption function.

In the above, the disk-unique key is generated from the master key and disc ID and the title-unique key is generated from the disc-unique key and title key. However, the title-unique key may be generated directly from the master key and disc ID without having to generate the disc-unique key or a key equivalent to the title-unique key may be generated from the master key and disc ID without using the title key.

It should be reminded that in case one of the transmission formats defined in the above DTCP standard for example is used, data is transmitted as MPEG-2 TS packets in some cases. For example, when a set top box (STB) having received a satellite broadcast transmits the broadcast to a recorder without using the DTCP transmission format, the STB should preferably transmit, also on the IEEE 1394 serial data bus, the MPEG-2 TS packets transmitted on the satellite broadcasting transmission path since data conversion is not required.

The recorder/player 1100 receives to-be-recorded content data in the form of TS packets, and the aforementioned TS processor 300 appends, to each TS packet, an ATS being a time at which the TS packet has been received. Note that as in the above, a block seed appended to block data may be composed of an ATS, copy control information and other information in combination.

A number X (e.g., X=32) of TS packets each having an ATS appended thereto are arranged side by side to form one block of block data (shown in the upper portion of FIG. 5). As shown in the lower portions of FIGS. 11 and 12, the first to fourth bytes in the leading portion of the block data supplied for encryption are separated (in a selector 1108) to output a block seed including an ATS of 32 bits. A block key being an encryption key for data in the block is generated (as indicated at a reference 1107) from the block seed and the previously generated title-unique key.

FIG. 14 shows an example of the block key generation. FIG. 14 shows two examples of generation of a 64-bit block key from a 32-bit block seed and 64-bit title-unique key.

In Example 1 shown in the upper half of FIG. 14, there is used an encryption function whose key length is 64 bits and input and output are of 64 bits, respectively. A title-unique key is taken as a key to this encryption function, a combination of a block seed and 32-bit constant is placed in the encryption function, and a result of the placement is taken as a block key.

Example 2 uses a hash function SHA-1 defined in FIPS 180-1. A combination of a title-unique key and block seed is placed in the hash function SHA-1, and an output of 160 bits is reduced to 64 bits by using for example only low-order 64 bits. The 64 bits are used as a block key.

In the above, there have been described the examples of the block key generation in which the disk-unique key, title-unique key and block key are generated. However, the block key may be generated from a masker key, disc ID, title key and block seed for each block without generating the disc-unique key and title-unique key.

The block key, thus generated, is used to encrypt the block data. As shown in the lower portions of FIGS. 11 and 12, the first to m-th bytes (m=8 for example) in the leading portion of the block data including a block seed are separated (in the selector 1108) not to be encrypted, and the (m+1)th to the last bytes are encrypted (as indicated at a reference 1109). Note that the m bytes not to be encrypted include the first to fourth bytes as a block seed. The (m+1)th and subsequent bytes of the block data, selected in the selector 1108, are encrypted (as indicated at a reference 1109) according to an encryption algorithm preset in the cryptography unit 150. The encryption algorithm may be DES (Data Encryption Standard) defined in FIPS 46-2 for example.

When the block length (input/output data size) in the encryption algorithm used is 8 bytes as in DES, the entire block data including the (m+1)th and subsequent bytes with no fraction can be encrypted by taking X as 32 and m as a multiple of 8 for example.

Namely, in case a number X of TS packets are stored in one block, input/output data size of the encryption algorithm is L bytes and n is an arbitrary natural number, determining X, m and L so that 192*X=m+n*L makes it unnecessary to process any fraction.

The encrypted (m+1)th and subsequent bytes of the block data are combined with the unencrypted first to m-th bytes of the block data by a selector 1110, and stored as an encrypted content 1112 into the recording medium 1120.

With the above operations, the content will be encrypted block by block with a block key generated from a block seed including ATS, and stored into the recording medium. As having previously been described, since ATS is a random data unique to a block, so the block key generated based on ATS set for each block is different from one another. That is, the encryption key is varied from one block to another and thus can provide an enhanced data protection against cryptanalysis. Use of the block seed as encryption key generating data makes it unnecessary to store the encryption key for each block separately from data. Thus, no special storage area is required for the encryption key, and the storage area of the recording medium can effectively be saved. Since the block seed is data which can be written and read along with content data, so it is possible to omit the operation of writing or reading the encryption key generating data during data write or read, which is different from the conventional system in which the encryption key has to be stored in an area other than the data area. Namely, information recording and playback can be done with a higher efficiency.

The flow of operations effected in ATS appending by the TS processor 300 and data encryption by the cryptography unit 150 for recording data, will be described with reference to the flow chart in FIG. 13. In step S1301 in FIG. 13, the recorder/player reads a master key stored in its own memory 180.

In step S1302, the recorder/player checks if a disc ID as identification information is already recorded in the recording medium. When the disc ID is found recorded there, the recorder/player reads the disc ID in step S1303. If the disc ID is not found recorded there, the recorder/player generates a disc ID at random or by a predetermined method, and records it to the disc (recording medium) in step S1304. Next in step S1305, the recorder/player generates a disc-unique key from a master key and disc ID. As having previously been described, the disc-unique key is generated by the use of the hash function SHA-1 defined in FIPS 180-1 or the hash function based on a block encryption function, for example.

The recorder/player goes to step S1306 where it will generate a title key as a key unique to each record and record it to the disc. In next step S1307, the recorder/player generates a title-unique key from the disc-unique key and title key by the use of the hash function SHA-1 or the hash function based on a block encryption function, for example.

In step S1308, the recorder/player receives data resulted from to-be-recorded content data in the form of TS packets. In step S1309, the TS processor 300 appends, to each TS packet, ATS which is information on a time at which the TS packet has been received. Alternatively, the TS processor 300 appends, to each TS packet, a combination of copy control information CCI, ATS and other information. Next in step S1310, the recorder/player receives TS packets each having ATS appended thereto one after another, and judges if a number X=32, for example, of TS packets forming one block have been received or an identification data indicative of the last TS packet has been received. When either of these conditions is fulfilled, the recorder/player goes to step S1311 where it will arrange the number X of TS packets or TS packets down to the last one side by side to form one block of data.

Next in step S1312, the cryptography unit 150 generates a block key for use to encrypt data in the block from 32 bits (block seed including ATS) in the leading portion of the block data and the title-unique key having been generated in step S1307.

In step S1313, the cryptography unit 150 encrypts the block data formed in step S1311 with the block key. It should be reminded here that as having previously been described, the cryptography unit 150 encrypts the (m+1)th to last bytes of the block data. The encryption algorithm used here is for example the DSE (Data Encryption Standard) defined in FIPS 46-2.

In step S1314, the recorder/player records the encrypted block data to the recording medium. In step S1315, it is judged whether all the data have been recorded. If the result of judgment is that all the data have been recorded, the recorder/player exits the recording procedure. If not, the recorder/player goes back to step S1308 where it will process the remaining data.

[Cryptography for Data Playback in a System with which Recorded Data has to be Compatible]

Figure 15:
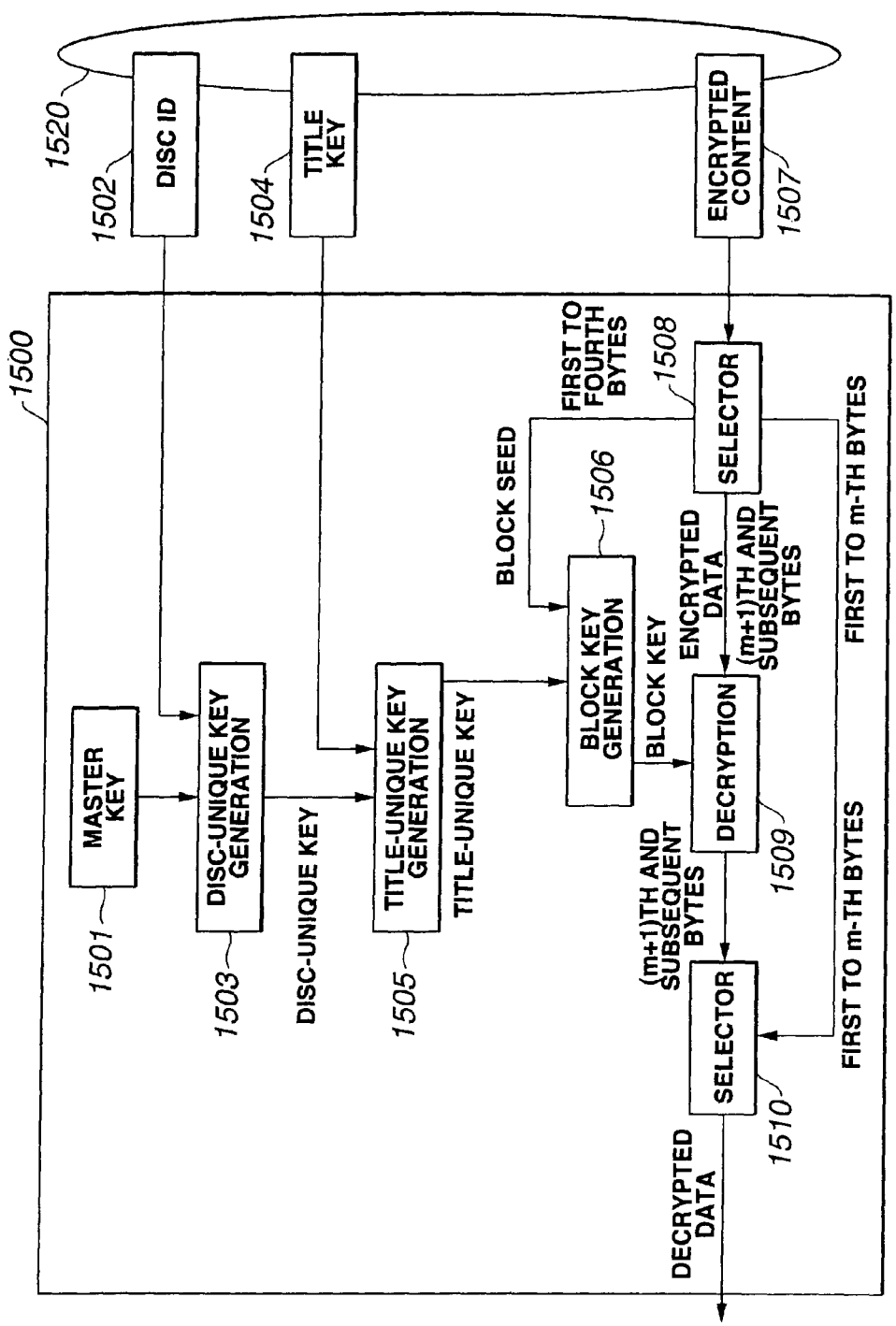
FIG. 15 is a block diagram explaining the decryption effected for data playback in the information recorder/player according to the present invention in a system with which the data has to be compatible.
Figure 16:
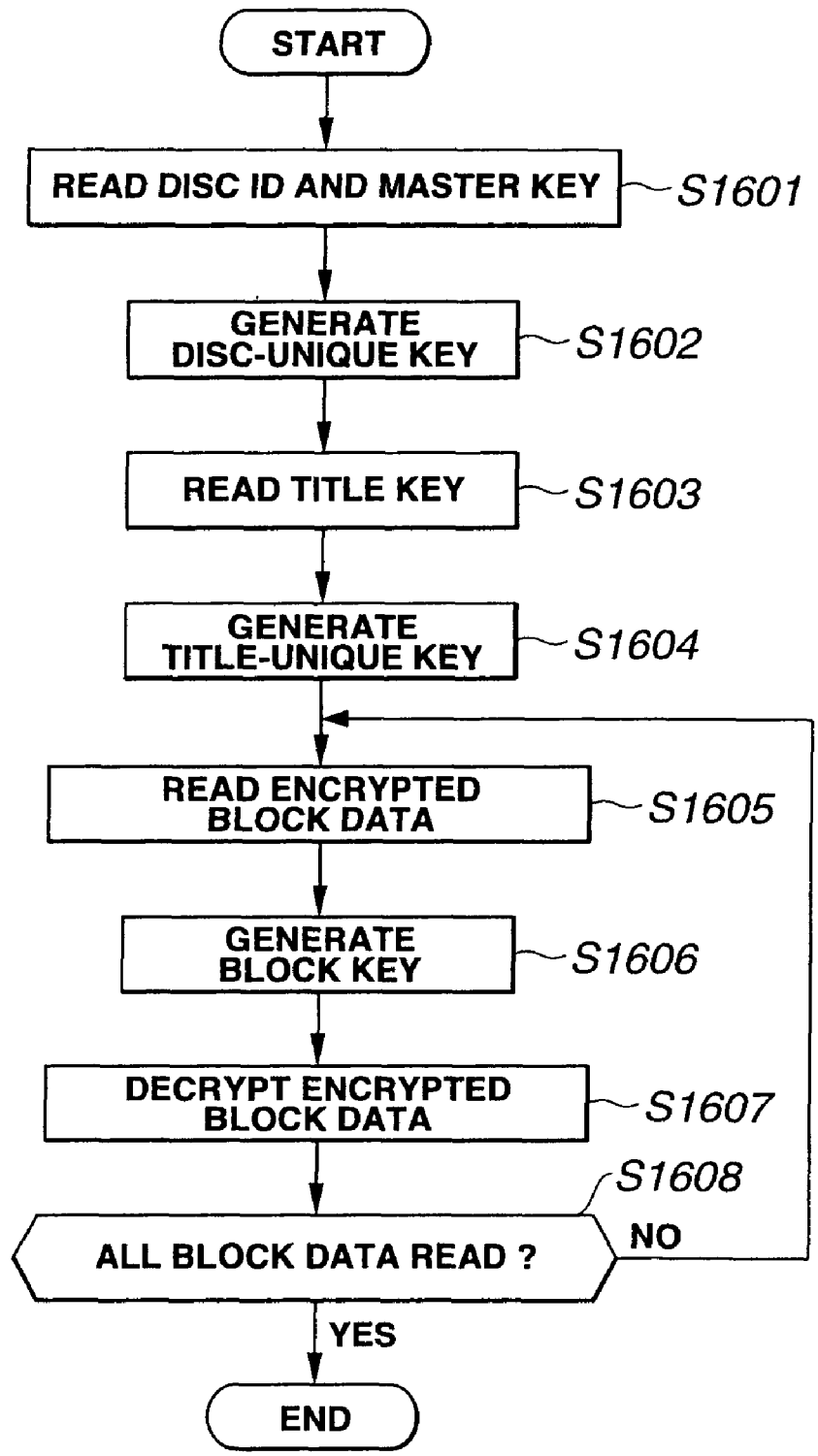
FIG. 16 shows a flow of operations made in the decryption for data playback in the information recorder/player according to the present invention in a system with which the data has to be compatible.

Next, decryption, for playback, of the encrypted content recorded in the recording medium as having been described in the foregoing will be described below with reference to the block diagram in FIG. 15 and flow chart in FIG. 16.

First, the description will be made with reference to the block diagram in FIG. 15. A recorder/player 1500 reads a disc ID 1502 from a disc 1520, and a master key 1501 from its own memory. As apparent from the foregoing description of the data recording procedure, the disc ID is a disc-unique identifier recorded in a disc. Alternatively, when no disc ID is recorded, the recorder/player 1500 generates a disc ID and records it to a disc. The master key 1501 is a private key stored in a licensed recorder/player.

Next, the recorder/player 1500 generates a disc-unique key from the disc ID and master key (as indicated at a reference 1503) as follows. Data generated by a bit-by-bit combination of the master key and disc ID is placed in a hash function SHA-1 defined in FIPS 180-1 for example, and only a necessary data length of an output of 160 bits resulted from calculation of the hash function is used as a disc-unique key. Alternatively, a result of the placement of the master key and disc ID in the hash function based on a block encryption function is used as a disc-unique key.

Next, the recorder/player 1500 reads, from the disc, a title key 1504 recorded correspondingly to data to be read, and generates a title-unique key 1505 from the title key 1504 and disc-unique key. The title-unique key 1505 may also be generated by the use of the hash function SHA-1 or the hash function based on a block encryption function.

In above, the disk-unique key is generated from the master key and disc ID and the title-unique key is generated from the disc-unique key and title key. However, the title-unique key may be generated directly from the master key and disc ID without having to generate any disc-unique key or a key equivalent to a title-unique key may be generated from the master key and disc ID without using any title key.

Next, the recorder/player 1500 reads block data one after another from an encrypted content 1507 stored in the disc, separates a block seed forming four bytes in the leading portion of the block data by a selector 1508, and generates a block key by the processing operation having also been made for generation of the title-unique key.

The block key may be generated as having been described in the foregoing with reference to FIG. 14. That is, a block key of 64 bits can be generated from a 32-bit block seed and 64-bit title-unique key.

In the above, there have been described examples of the block key generation in which the disk-unique key, title-unique key and block key are generated. However, the block key may be generated from a masker key, disc ID, title key and a block seed for each block without generating the disc-unique key and title-unique key.

When the block key is thus generated, the block data encrypted with a block key is decrypted (as indicated at a reference 1509) and outputted as decrypted data via a selector 1510. Note that the decrypted data includes ATS appended to each of transport packets included in the transport stream and the stream is processed based on the ATS by the aforementioned TS processor 300. Thereafter, the data can be used to display an image or play a music, for example.

As in the above, a content encrypted in units of a block and recorded in the recording medium can be decrypted in units of a block for playback with a block key generated from a block seed including ATS.

Next, the flow of operations effected in data decryption and playback will be described with reference to the flow chart shown in FIG. 16. In step S1601 in FIG. 16, the recorder/player reads a disc ID from the disc and a master key from its own memory. In step S1602, the disc ID and master key are used to generate a disc-unique key.

Next in step S1603, the recorder/player reads a title key of data to be read from the disc. In step S1604, the recorder/player generates a title-unique key from the title key and disc-unique key. Next in step S1605, the recorder/player reads encrypted block data from the disc. In step S1606, the recorder/player generates a block key from a 4-byte block seed in the leading portion of the block data and the title-unique key generated in step S1604.

Next in step S1607, encrypted data is decrypted with the block key. In step S1608, it is judged whether the recorder/player has read all the data. If it has read all the data, the recorder/player exits the decrypting procedure. If not, the recorder/player goes back to step S1605 where it will read the remaining data.

[Data Encryption for Recording in a System with which Recorded Data Have not to be Compatible]

Next, there will be described with reference to the block diagram in FIG. 17 and flow chart in FIG. 18 the encrypting procedure for data recording in a system with which recorded data has not to be compatible, namely, a system in which a recording medium having data recorded therein by a recorder/player has not to be playable in another recorder/player, namely, a system in which recorded data can be read only by a recorder/player having recorded the data to the recording medium.

The description will be made with reference to the block diagram in FIG. 17 and following the sequence of operations in the flow chart in FIG. 18.

Figure 17:
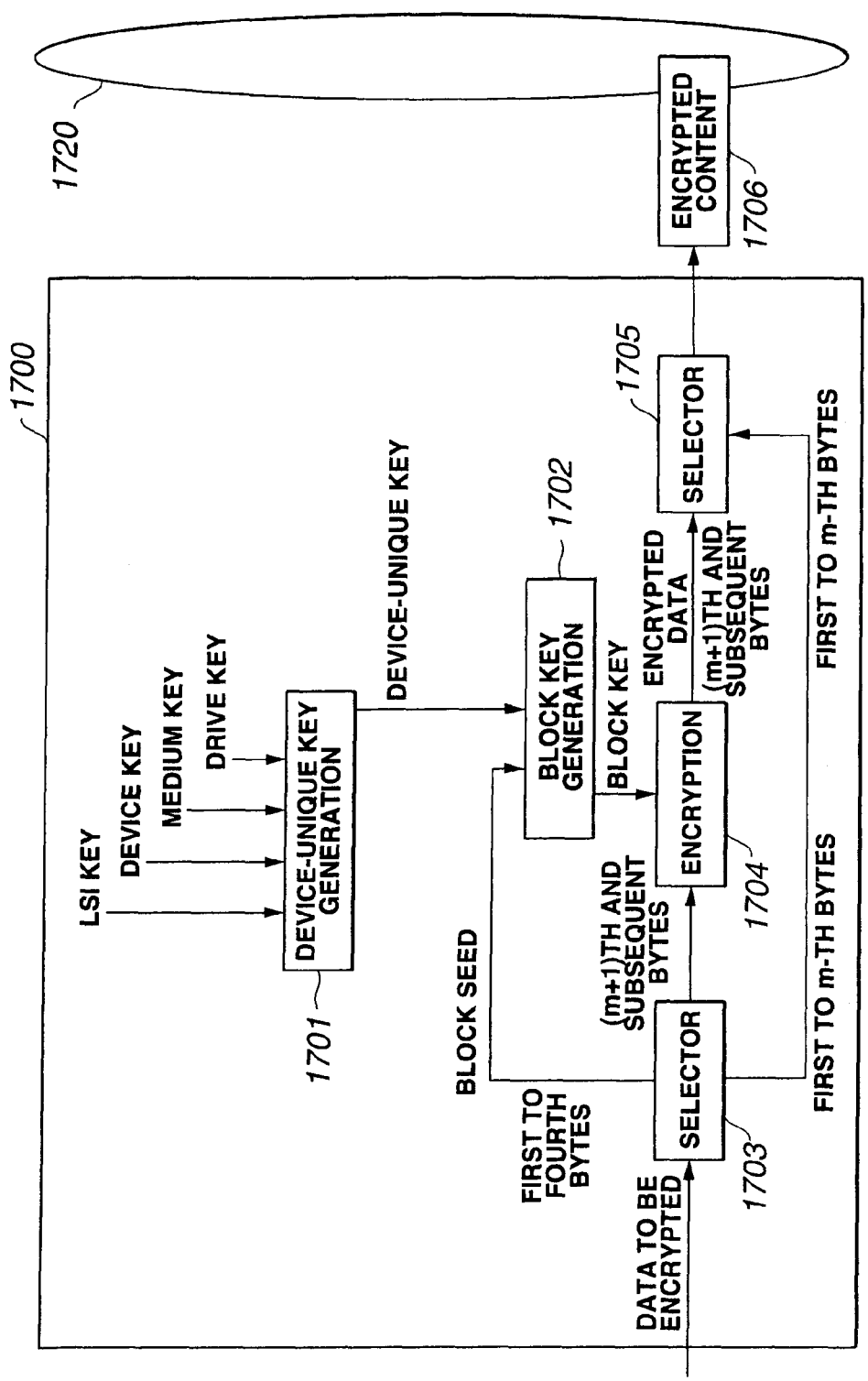
FIG. 17 is a block diagram explaining the encryption for data recording in the information recorder/player according to the present invention in a system with which the data has not to be compatible.
Figure 18:
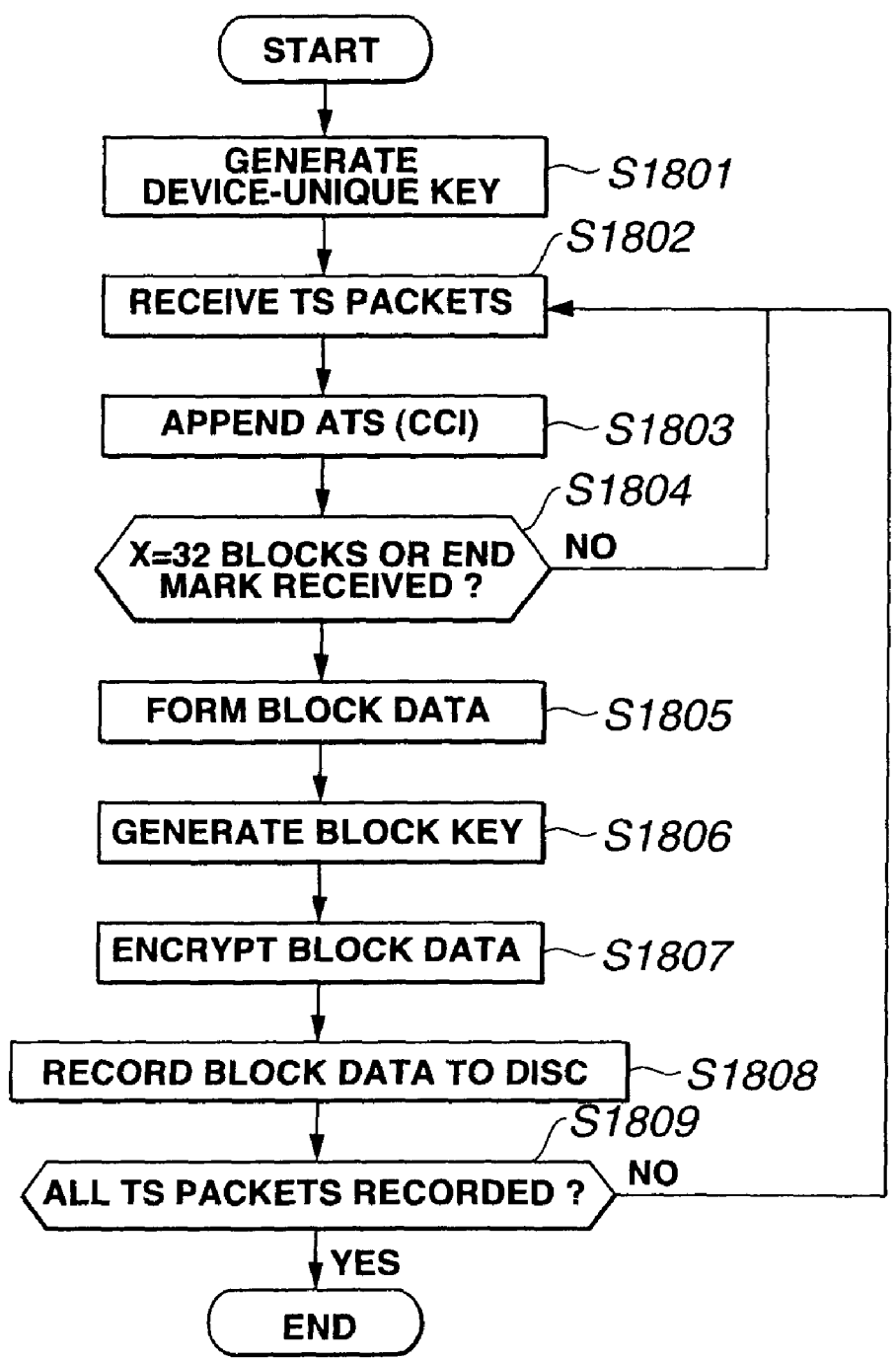
FIG. 18 shows a flow of operations effected in the encryption for data recording in the information recorder/player according to the present invention in a system with which the data has not to be compatible.

In step S1801 in FIG. 18, a recorder/player 1700 (in FIG. 17) generates a device-unique key which is a key unique to the recorder/player itself.

As shown in FIG. 17, the device-unique key is generated from any of LSI key, device key, medium key and a drive key or a combination of any of these keys. The LSI key is a key having been stored in the LSI during production of the LSI included in the cryptography unit 150 (in FIG. 1). The device key is a key having been set correspondingly to a device, namely, a recorder/player, and stored in a memory element such as a flash memory, EEPROM or the like during production of the recorder/player. The medium key is a key set for a recording medium which stores a content and stored in the recording medium. The drive key is a key appended to the drive unit for the recording medium such as a DVD or the like.

In this embodiment, the device-unique key is generated from any of LSI key, device key, medium key and drive key or a combination of any of these keys.

Figure 19:
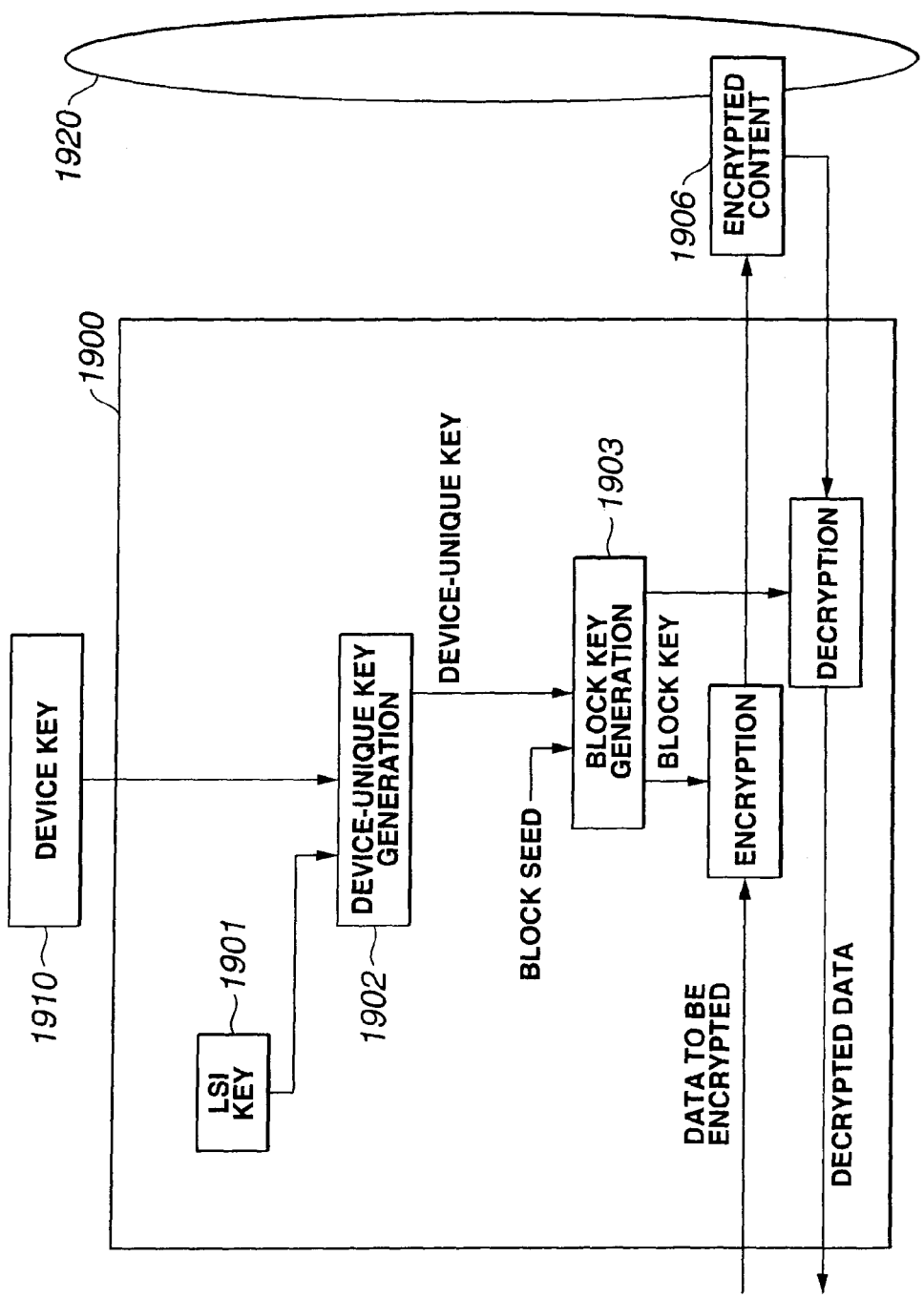
FIG. 19 is a block diagram explaining an example (1) of device-unique key generation in the information recorder/player according to the present invention in a system with which the data has not to be compatible.

The generation of the device-unique key from the LSI key and device key for example will be described with reference to FIG. 19 showing, by way of example, operations effected in a cryptography LSI 1900 being the cryptography unit 150 in FIG. 1 formed in the form of an LSI for example.

The cryptography LSI 1900 includes an LSI key memory 1901 which stores an LSI key common to a plurality of cryptography LSIs (therefore, common to a plurality of recorder/players). More particularly, the same key is stored in the LSIs in one production lot. A common LSI key may be stored in all the cryptography LSIs, or a common LSI key may be stored in each group of some cryptography LSIs. To how many LSIs the common LSI key should be common may be determined based on the manufacturing cost of the cryptography LSI for example.

The cryptography LSI 1900 has a key generator which reads LSI key from the key memory 1901 while reading a device key 1910 from a ROM in the recorder/player for example as an external memory element of the cryptography LSI 1900 via a bus, and generates a device-unique key by applying a key generation function to the LSI key and device key.

Note that as a key generation function, there may be used a one-way function with which the device-unique key can easily be calculated from the LSI and device keys but the LSI and device keys cannot be calculated. More specifically, with a combination of the LSI and device keys being placed in the one-way function such as a hash function SHA-1 defined in FIPS 180-1 for example, a device-unique key generator 1902 calculates the hash function to generate a device-unique key. The device-unique key may be generated by the use of a one-way function using DES defined in FIPS 46-2 or Triple-DES defined in FIPS 46-3 and encrypting the device key with the LSI key.

A block key is generated from the device-unique key thus generated and a block seed set as additional data to the content data, encryption or decryption is effected with the block key thus generated to write or read an encrypted content 1906 to or from a recording medium 1920.

For the content encryption and decryption, there may be used the DES (Data Encryption Standard) defined in FIPS 46-2 or the like.

FIG. 19 shows an example that a device-unique key is generated from an LSI key and device key. However, in case a medium key is assigned as a fixed value to a recording medium or in case a drive key is assigned as a fixed value to a drive for the recording medium, the medium key and drive key may be used for generation of the device-unique key.

Figure 20:
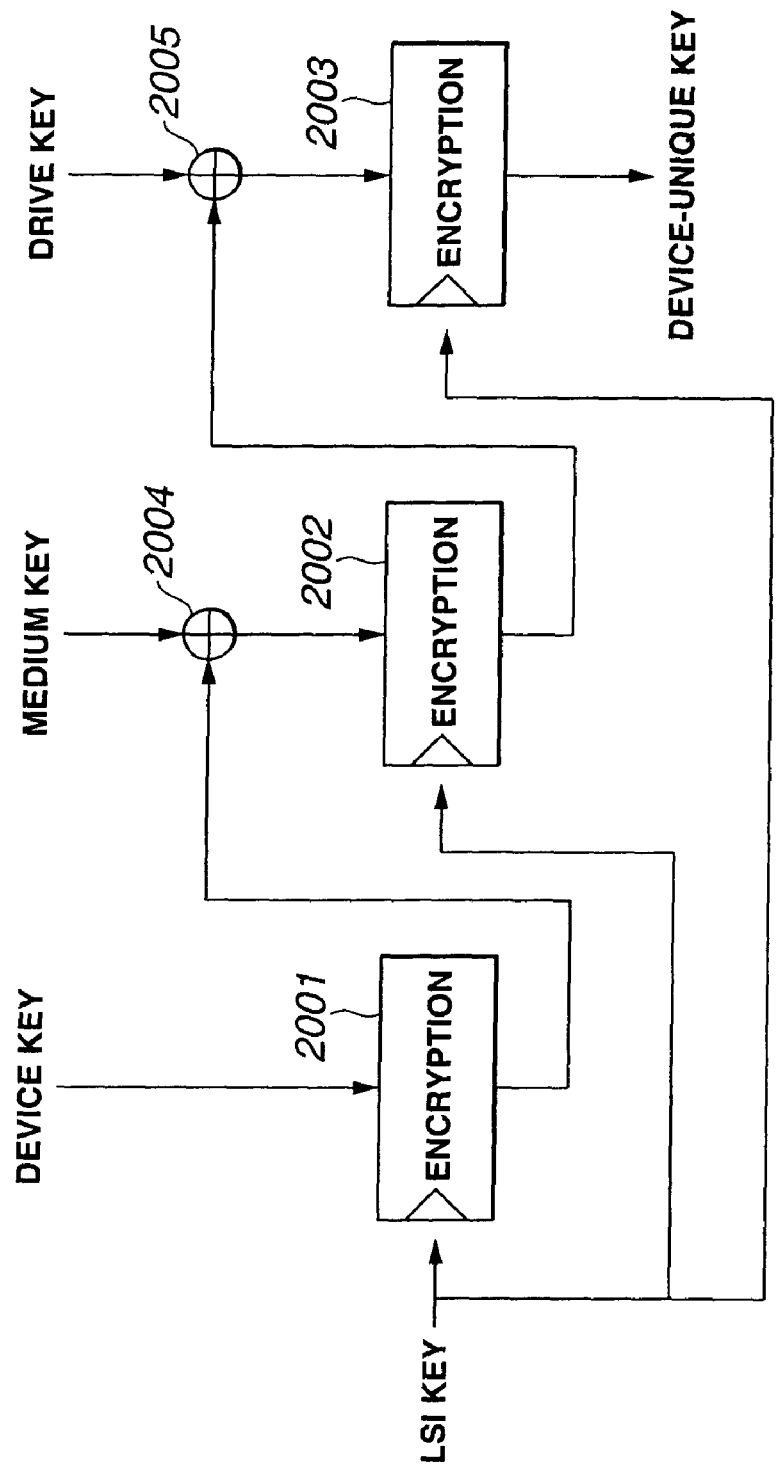
FIG. 20 is a block diagram explaining an example (2) of device-unique key generation in the information recorder/player according to the present invention in a system with which the data has not to be compatible.

FIG. 20 shows an example of the generation of a device-unique key from all the keys including the medium key and drive key in addition to the LSI key and device key. In FIG. 20, there is illustrated an example of the generation of the device-unique key by the DIM (data integrity mechanism) defined in ISO/IEC 9797.

An encryption unit 2001 encrypts the LSI key with the device key, and outputs the encrypted LSI key to an arithmetic unit 2004. The arithmetic unit 2004 makes an exclusive-OR operation of the output from the encryption unit 2001 and medium key, and supplies a result of the exclusive-OR operation to an encryption unit 2002. The encryption unit 2002 encrypts the output of the arithmetic unit 2004 with the LSI key, and outputs the data to an arithmetic unit 2005. The arithmetic unit 2005 makes an exclusive-OR operation of the output of the encryption unit 2002 and drive key, and outputs the data to an encryption unit 2003. The encryption unit 2003 encrypts the output of the arithmetic unit 2005 with the LSI key, and outputs a result of the encryption as a device-unique key.

The data recording procedure will be continuously described with reference to FIG. 18 again. In step S1801, a device-unique key is generated from any of the LSI key, device key, medium key and drive key or a combination of any of these key.

In step S1802, the recorder/player receives a to-be-recorded encoded content data in the form of TS packets. In step S1803, the TS processor 300 appends, to each TS packet, ATS being a time at which each of the TS packets has been received. Alternatively, the TS processor 300 appends, to each TS packet, a combination of copy control information CCI, ATS and other information. Next in step S1804, the TS packets each having ATS appended thereto are received one after another, and it is judged whether a number X (e.g., X=32) of TS packets forming one block have been received or an identification data indicative of the last TS packet has been received. If any of the above conditions is found fulfilled, the recorder/player goes to step S1805 where it will arrange the number X of TS packets or TS packets down to the last one side by side to form one block of data.

Next, in step S1806, the cryptography unit 150 generates a block key being a key to encrypt the block data from 32 bits (block seed including ATS) in the leading portion of the block data and the device-unique key having been generated in step S1801.

In step S1807, the block data formed using the block key in step S1805 is encrypted. Note that as having previously been described, it is the (m+1)th byte to the last byte of the block data that are encrypted. The encryption algorithm used for this purpose is DES (Data Encryption Standard) defined in FIPS 46-2 for example.

In step S1808, the recorder/player records the encrypted block data to the recording medium. In step S1809, it is judged whether or not all the data have been recorded. If all the data have been recorded, the recorder/player exits the recording procedure. If all the data have not yet been recorded, the recorder/player goes back to step S1802 where it will process the remaining data.

[Data Encryption for Playback in a System with which Recorded Data has not to be Compatible]

Next, playback or reading of the data thus recorded will be described with reference to the block diagram in FIG. 21 and flow chart in FIG. 22.

The description will be made with reference to the block diagram in FIG. 21 and following the sequence of operations in the flow chart in FIG. 22.

Figure 21:
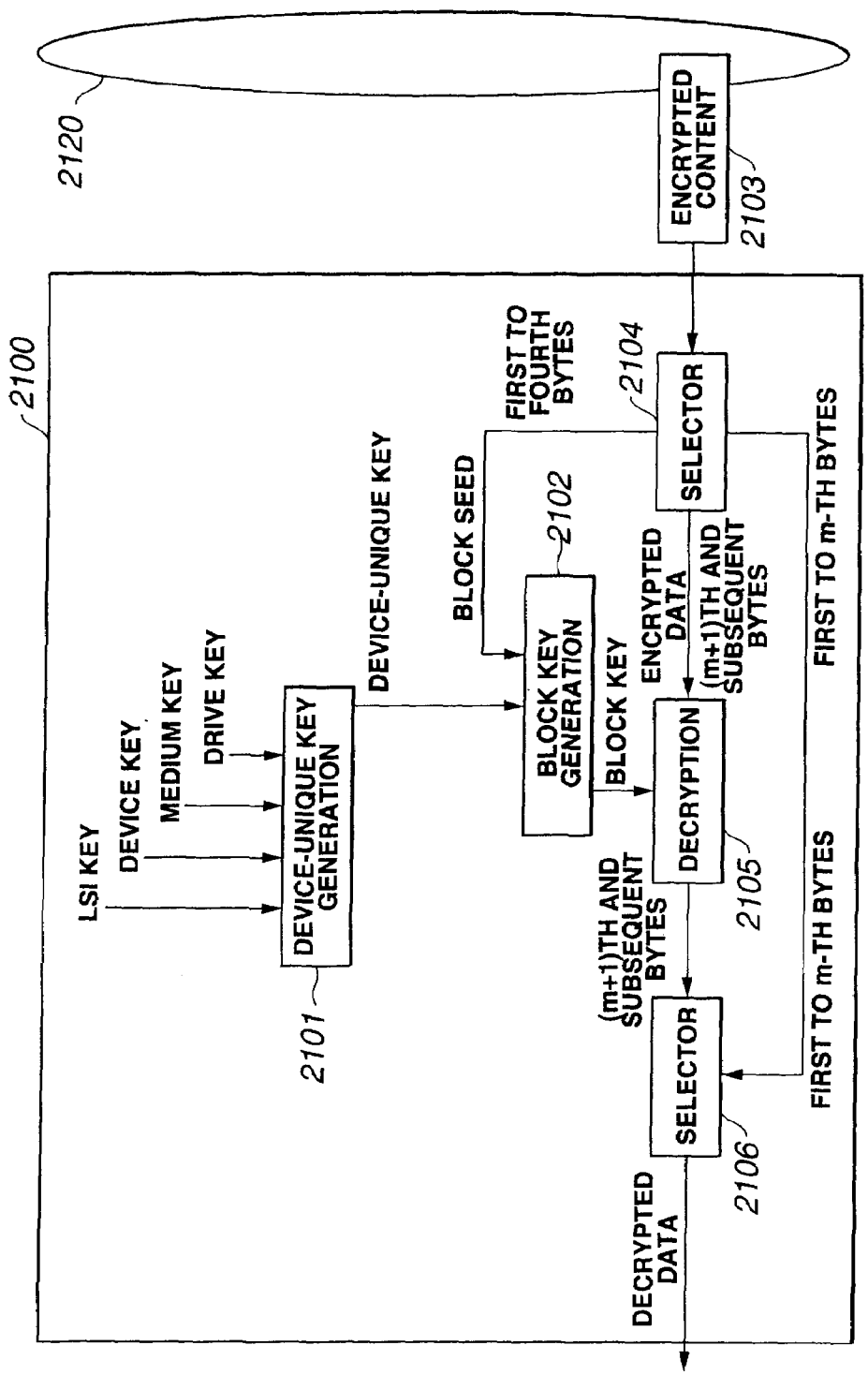
FIG. 21 is a block diagram explaining the decryption for data playback in the information recorder/player according to the present invention in a system with which the data has not to be compatible.
Figure 22:
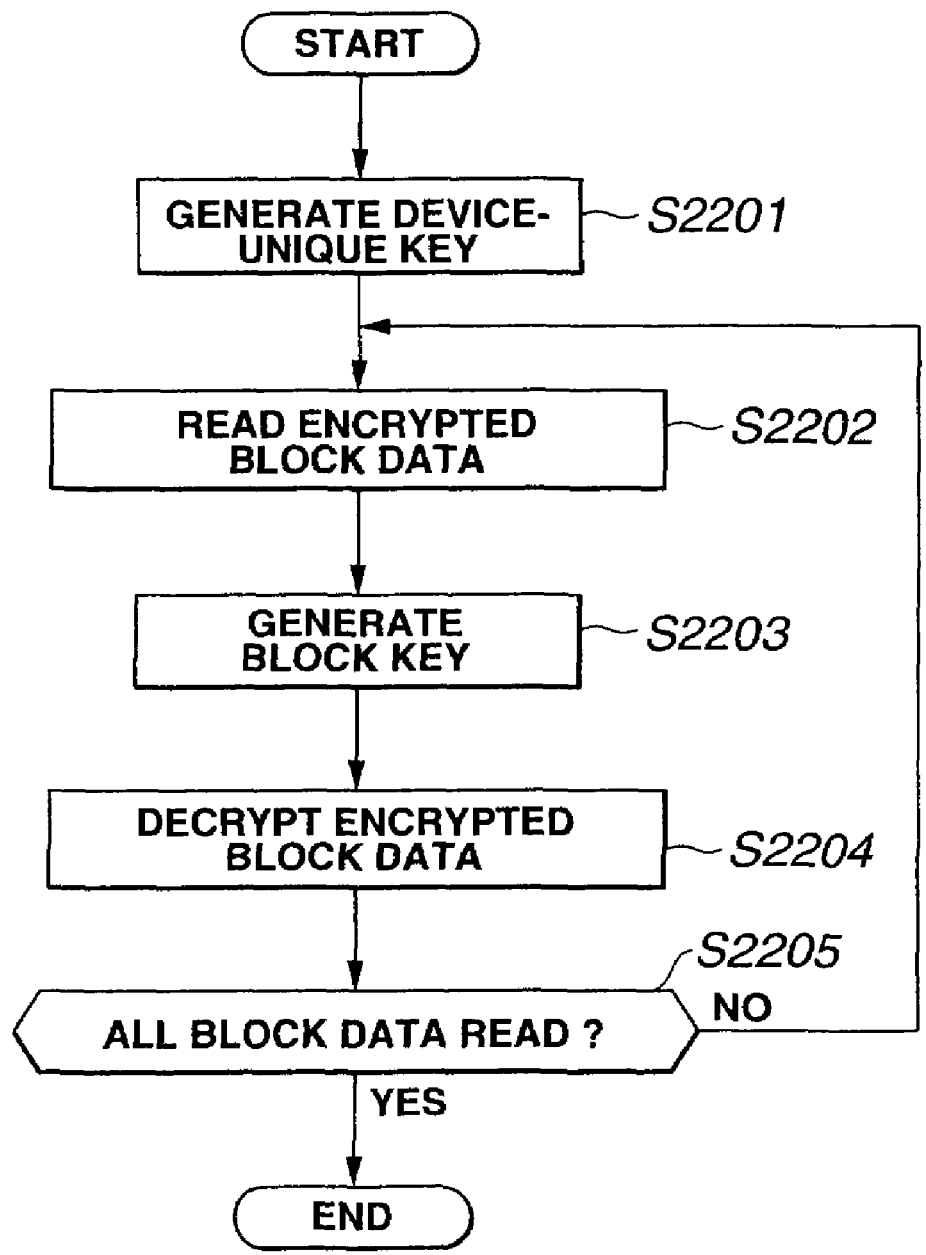
FIG. 22 shows a flow of operations effected in the decryption for data playback in the information recorder/player according to the present invention in a system with which the data has not to be compatible.

First in step S2201 in FIG. 22, a recorder/player 2100 (see FIG. 21) generates a device key unique to itself.

As shown in FIG. 21, the device-unique key is generated from any of LSI key, device key, medium key and drive key or a combination of any of these keys (as indicated at a reference 2101). As mentioned in the foregoing, the LSI key is a key having been stored in the LSI during production of the LSI included in the cryptography unit 150 (in FIGS. 1 and 2), the device key is a key having been set correspondingly to a device, namely, a recorder/player, and stored in a memory element such as a flash memory, EEPROM or the like during production of the recorder/player, the medium key is a key set for a recording medium which stores a content and stored in the recording medium, and the drive key is a key appended to the drive unit for the recording medium such as a DVD or the like.

Next in step S2202, the recorder/player reads an encrypted block data from the disc. In S2203, the recorder/player generates a block key from a block seed of 4 bytes in the leading portion of the block data and the device-unique key having been generated in step S2201 (as indicated at a reference 2102 in FIG. 21).

Next in step S2204, the recorder/player decrypts the block data having been encrypted with the block key (as indicated at a reference 2105 in FIG. 21), judges in step S2205 whether or not all the data have been read. If all the data have been read, the recorder/player exits the reading procedure. If not, the recorder/player goes back to step S2202 where it will read the remaining data.

Note that also in this playback procedure, the first to fourth bytes of a block seed in the leading portion of the block data in an encrypted content 2103 stored in a recording medium 2120 are separated by a selector 2104 while the first to m-th bytes yet to be encrypted are not decrypted, but the bytes are combined together in a selector 2106 and outputted from the latter. The decrypted data includes ATS appended to each of packets and indicating a time at when it has been inputted, and thus can normally be played back owing to the processing by the aforementioned TS processor.

As in the above, according to the present invention, a content is encrypted with a block key varying depending upon an ATS which also varies with a reception time of the leading TS packet in the block data. So, even if a block key for encrypting a certain content has leaked to any unlicensed user, other contents can be protected without being influenced by the leakage. In case a single encryption key is used for encryption of all contents as in the conventional system, the encryption with a fixed data key will possible result as follows. Namely, if an unlicensed user trying to illegally copy the contents has acquired a combination of an unencrypted or plain content and a content derived from encryption of that content with a data key, it is likely that the data key can be analyzed by a so-called linear or differential attack (to lay open the contents), whereby all contents having been encrypted with the data key can be decrypted for illegal copying. According to the present invention, however, since the encryption key is different from one block to another, such an illegal copying is almost impossible.

According to the present invention, since the data amount encrypted with one encryption key is only one block which includes an extremely small amount of data, so it is very difficult to use the so-called linear or differential attack for acquisition of the key with which the data has been encrypted.

Further, according to the present invention, since an encryption key is generated based on an ATS appended as additional information to the main data, so it has not to newly be recorded in a sector header etc. of a data sector of a recording medium even in case it is varied from one block to another. Thus, no extra recording area is required and it is not necessary to read and write an encryption key for each block for write and read of data.

[Data Encryption for Recording in a System in which the Player Restriction can be Set]

The aforementioned construction of the recorder/player according to the present invention is such that a block key can be generated from a master key and recorded data can be read by recorder/players having a common master key. However, it is desirable as the case may be that only a recorder/player having recorded a specific data should be able to read or play back the data. Such a player restriction will be described below.

There will be described a system in which the recording medium 195 is removably set in the recorder/player having been described in the foregoing with reference to FIGS. 1 and 2 and can also be used in another recorder/player. That is, when data is recorded to the recording medium 195, it is settable whether or not the recording medium having the data recorded therein can be played in another recorder/player.

The data encryption for recording in such a system will be described with reference to the block diagrams shown in FIGS. 23 and 24 and flow chart shown in FIG. 25. The recording medium used here is an optical disc. In this embodiment, a disc ID as information unique to a recording medium is caused to act on a data encryption key in order to prevent bit-by-bit copying of data in the recording medium.

Data encryption by the cryptography unit 150 will be outlined below with reference to the block diagrams in FIGS. 23 and 24.

A recorder/player 2300 reads a master key 2301, device ID 2331 for identification of the recorder/player, and a device-unique key 2332 from its own memory 180 (see FIGS. 1 and 2). The master key 2301 is a private key stored in a licensed recorder/player and which is common to a plurality of recorder/players, namely, to an entire system. The device ID is an identifier for the recorder/player 2300, such as a serial number or the like having been prestored in the recorder/player. The device-unique key is a private key unique to the recorder/player 2300 and preset to be different from one recorder/player to another. These keys have been prestored in the recorder/player 2300.

The recorder/player 2300 checks that the disc ID 2303 as identification information has already been recorded in a recording medium 2320 which is an optical disc for example. If the disc ID 2303 has been so recorded, the recorder/player 2300 reads the disc ID 2303 (as in FIG. 23). If not, the cryptography unit 150 will generate a disc ID 2401 at random or by a predetermined random number generation method, and record it to the optical disc (as in FIG. 24). Only one disc ID 2303 has to be available to each disc, and so the disc ID may be stored in a lead-in area or the like of the optical disc.

Next, the recorder/player 2300 generates a disc-unique key from the master key and disc ID (as indicated at a reference 2302). More particularly, the disc-unique key is generated as will be described below. Namely, as shown in FIG. 26, a result from placement of the master key and disc ID in a hash function based on a block encryption function is used as a device-unique key (method 1). Alternatively, a necessary data length of an output of 160 bits resulted from placement, in a hash function SHA-1 defined in FIPS 180-1, of data generated by bit-by-bit combination of the master key and disc ID is used as a disc-unique key (method 2).

Next, a title key being a unique key for each record is generated at random or by a predetermined random number generation method for example by the cryptography unit 150 (as indicated at a reference 2304), and recorded to the disc 2320.

Further, a flag indicating which the title (data) is a data that can be played back only by the recorder/player having recorded the data (when the player restriction is set) or a data that can be played back also in another recorder/player (when the player restriction is not set), that is, a player restriction flag, is set (as indicated at a reference 2333) and recorded to the disc 2320 (as indicated at a reference 2335). Moreover, a device ID 2334 as device identification information is taken out (as indicated at a reference 2331) and recorded to the disc 2320 (as indicated at a reference 2334).

The disc has provided therein a data management file having stored therein information on what title is formed from data and where the data is from, and which can store a title key 2305, player restriction flag 2335 and device ID 2334.

Next, a title-unique key is generated from either a combination of the disc-unique key, title key and device ID or a combination of the disc-unique key, title key and device-unique key.

Namely, in case the player restriction is not set, the title-unique key is generated from the disc-unique key, title key and device ID. On the other hand, in case the player restriction is set, the title-unique key is generated from the disc-unique key, title key an device-unique key.

Figure 28:
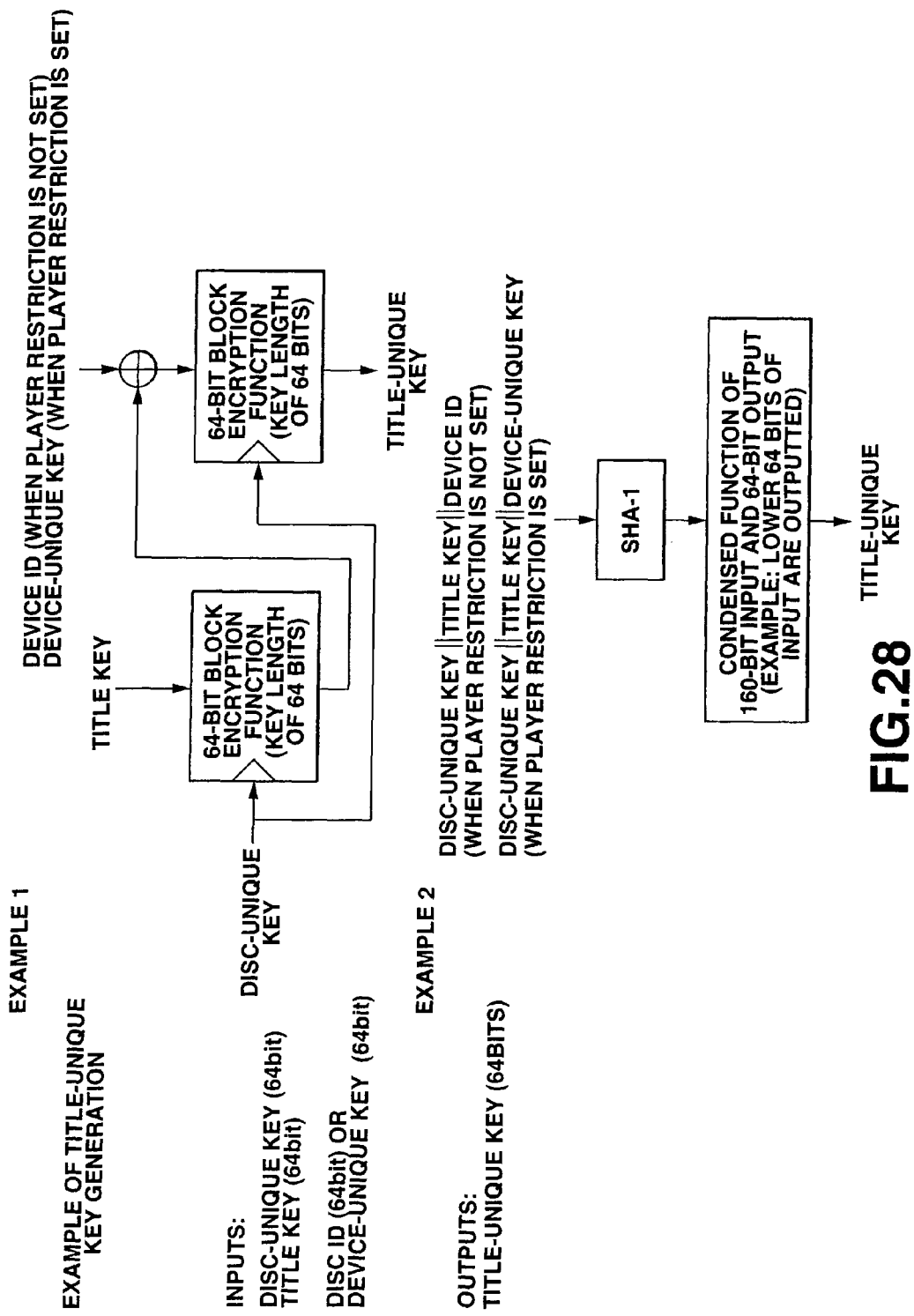
FIG. 28 shows an example of title-unique key generation for data recording in the information recorder/player according to the present invention in a system in which the player restriction can be set.

More particularly, the title-unique key is generated is generated as in either Example 1 or Example 2 shown in FIG. 28. In Example 1, a title key, disc-unique key and a device ID (when the player restriction is not set) or a device-unique key (when the player restriction is set) are placed in a hash function based on a block encryption function, and a result of the placement is used as a title-unique key. In Example 2, data generated by bit-by-bit combination of a master key, disc ID and a device ID (when the player restriction is not set) or a device-unique key (when the player restriction is set) is placed in a hash function SHA-1 defined in FIPS 180-1, and only a necessary data length of an output of 160 bits resulted from the placement is used as a title-unique key.

In the above, a disc-unique key is generated from a master key and disc ID, and then a title-unique key is generated from the disc-unique key, title key and device ID or from the title key and device-unique key. Note however that the title-unique key may be generated directly from the master key, disc ID, title key and device ID or device-unique key without using the disc-unique key or a key equivalent to the title-unique key may be generated from the master key, disc ID and a device ID (when the player restriction is not set) or a device-unique key (when the player restriction is set) without using the title key.

For example, in case one of the transmission formats defined in the aforementioned DTCP standard is used, data is transmitted in the form of MPEG-2 TS packets in some cases. When a STB (set top box), for example, having received a satellite broadcast transmits the broadcast to a recorder under the DTCP standard, it is desirable because there is no necessity of data conversion that the STB should transmit, on an IEEE 1394 serial bus as well, MPEG-2 TS packets having been transmitted over a satellite broadcasting communication path.

The recorder/player 2300 receives a to-be-recorded content data in the form of the TS packets, and the TS processor 300 appends, to each of the TS packets, ATS which is information indicative of a time at which the TS packet has been received. Note that a combination of ATS, copy control information and other information may be appended as a block seed being additional information unique to the block data, as having previously been described.

Figure 23:
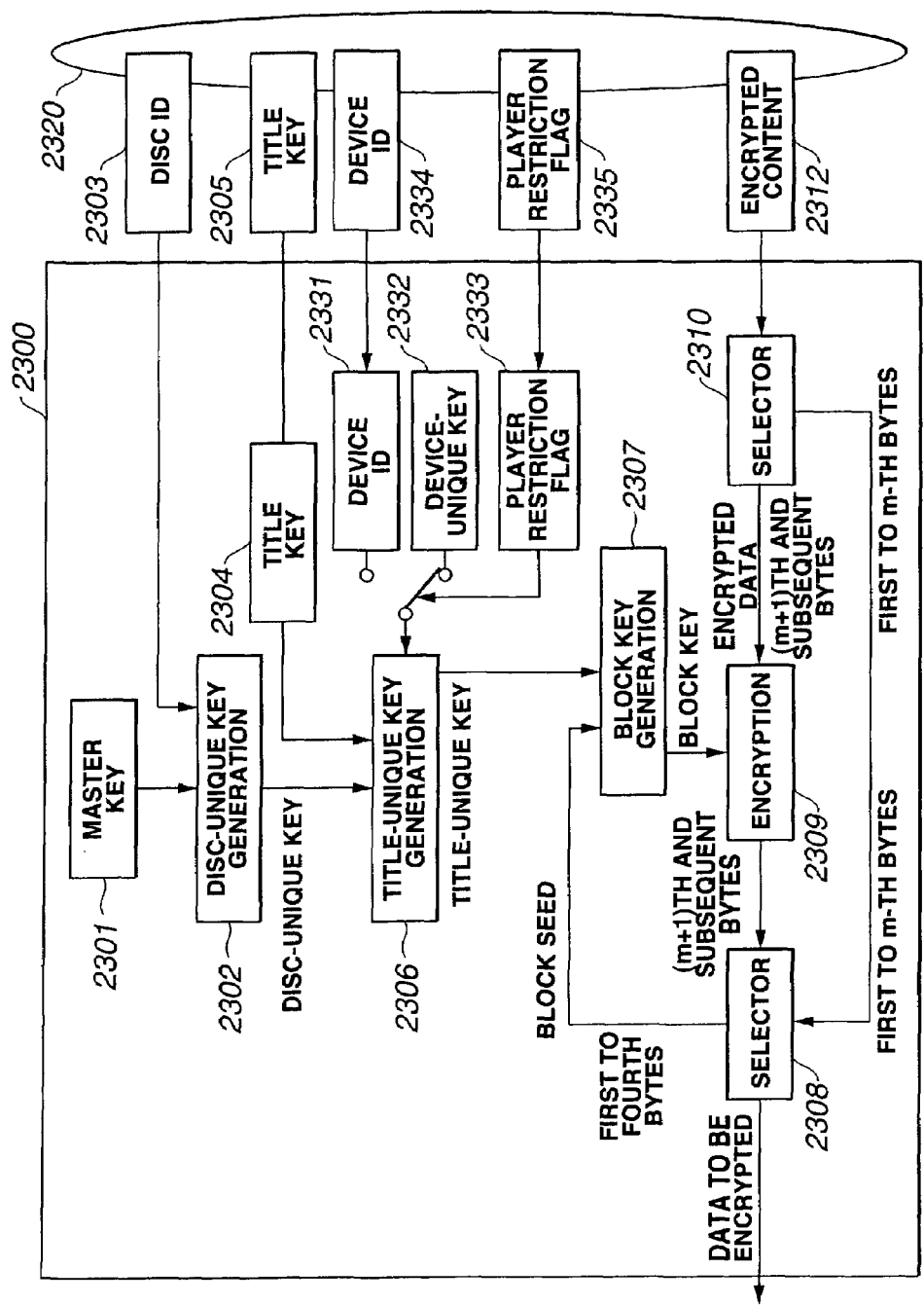
FIG. 23 is a block diagram (1) explaining the encryption for data recording in the information recorder/player according to the present invention in a system in which a player restriction can be set.
Figure 24:
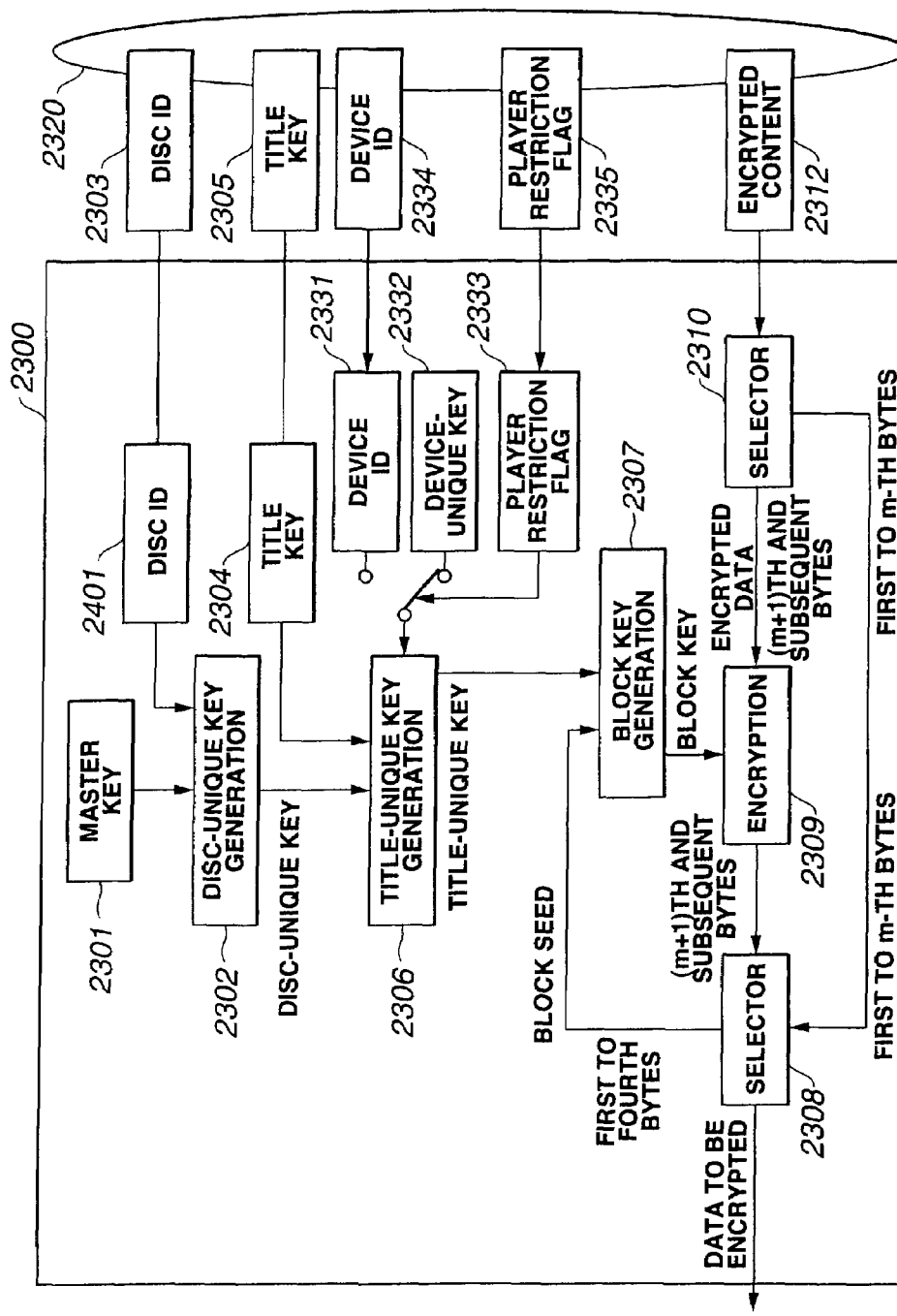
FIG. 24 is a block diagram (2) explaining the encryption for data recording in the information recorder/player according to the present invention in a system in which the player restriction can be set.
Figure 25:
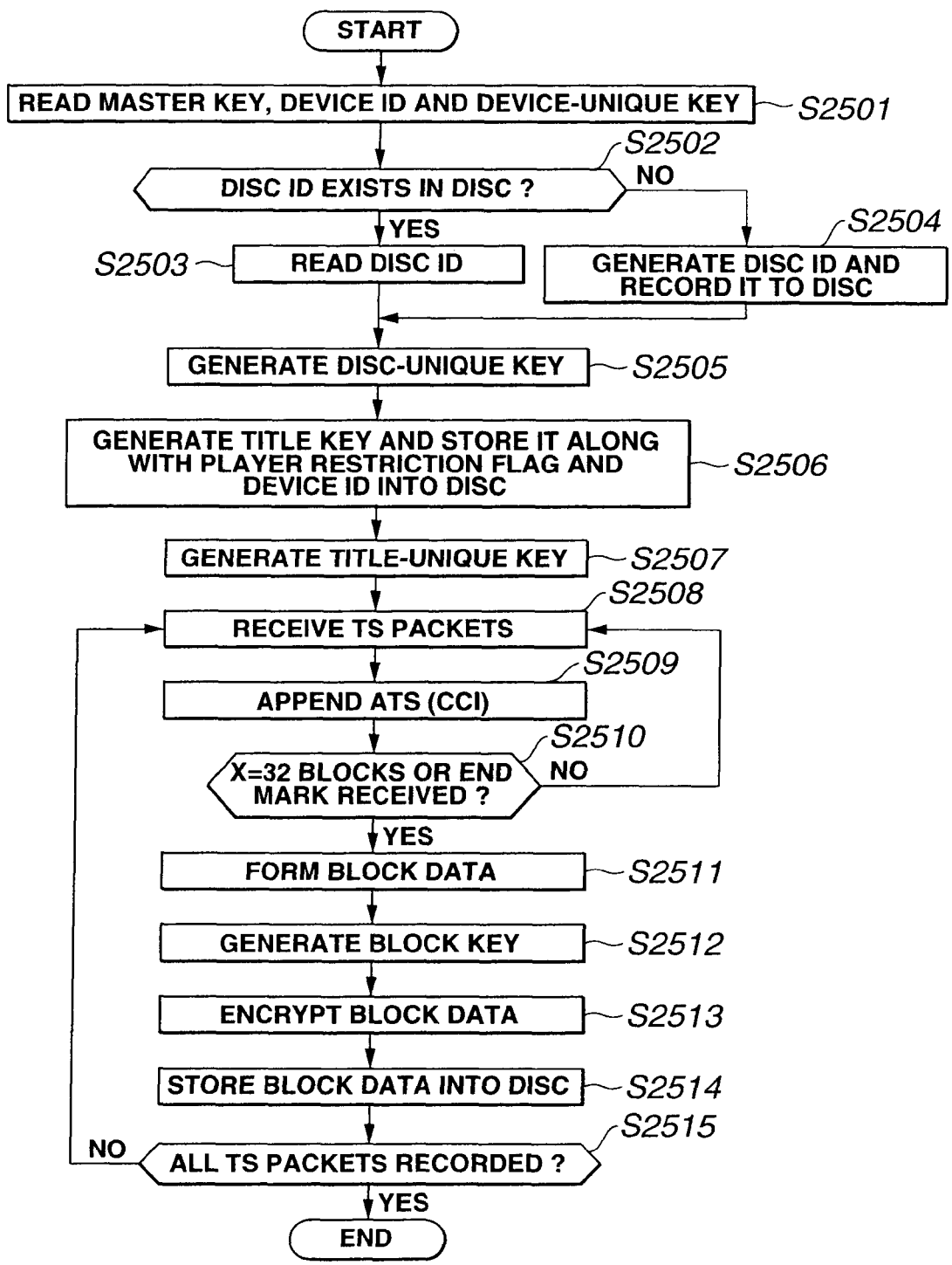
FIG. 25 shows a flow of operations effected in the data recording in the information recorder/player according to the present invention in a system in which the player restriction can be set.

A number X (e.g., X=32) of TS packets each having ATS appended thereto are arranged side by side to form a block of data (block data) as shown in the upper portion of FIG. 5, and a block key intended for encryption of data in the block is generated from a block seed including a 32-bit ATS derived from separation of the first to fourth bytes in the leading portion of the block data supplied as encrypted data (in the selector 2308) and the title-unique key previously generated (as indicated at a reference 2307) as shown in the lower portions of FIGS. 23 and 24. The block key may be generated by the method having previously been described with reference to FIG. 14.

In the above, examples of the generation of disc-unique key, title-unique key and block key have been described. However, it should be noted that the block key may be generated from a master key, disc ID, title key, block seed and a device ID (when the player restriction is not set) or a device-unique key (when player ion is set) without generating any disc-unique key and title-unique key.

The block key, thus generated, is used to encrypt the block data. As shown in the lower portions of FIGS. 23 and 24, the first to m-th bytes (e.g., m=8) in the leading portion of the block data including a block seed are separated (in the selector 2308) not to be encrypted, and the (m+1)th to the last bytes are encrypted (as indicated at a reference 2309). Note that the m bytes not to be encrypted include the first to fourth bytes as a block seed. The (m+1)th and subsequent bytes of the block data, separated by the selector 2308, are encrypted (as indicated at a reference 2309) according to an encryption algorithm preset in the cryptography unit 150. The encryption algorithm may be DES (Data Encryption Standard) defined in FIPS 46-2 for example.

When the block length (input/output data size) in the encryption algorithm used is 8 bytes as in DES, the entire block data including the (m+1)th and subsequent bytes with no fraction can be encrypted by taking X as 32 and m m as a multiple of 8 for example.

Namely, in case a number X of TS packets is stored in one block, input/output data size of the encryption algorithm is L bytes and n is an arbitrary natural number, any fraction has not to be processed by determining X, m and L so that 192*X=m+n*L.

The encrypted (m+1)th and subsequent bytes of the block data are combined with the unencrypted first to m-th bytes of the block data by a selector 2310, and stored as an encrypted content 2312 into the recording medium 1120.

With the above operations, the content will be encrypted block by block with a block key generated from a block seed including ATS, and stored into the recording medium. The block key is generated from a device ID when the player restriction is not set, or from a device-unique key when the player restriction is set. In case the player restriction is set, these encrypted data can be read or played back only by a device having recorded the data.

More particularly, when the player restriction is not set, a block key being a key for use to encrypt block data is generated from data including a device ID and the device ID is stored into the recording medium. Therefore, a player going to play the recording medium can acquire the device ID from the recording medium set therein and thus generate a similar block key. Thus the block data can be decrypted. However, in case the player restriction is set, a block key being a key for use to encrypt block data is generated from data including a device-unique key. Since this device-unique key is a private key which varies from one device to another, so it cannot be acquired by the other device. In case block data is encrypted for storage into a recording medium, data write is not made to a recording medium having the device-unique key stored therein. Therefore, since the same device-unique key cannot be acquired even with a recording medium having encrypted block data stored therein, set in the other player, so any decryption key for decryption of the block data cannot be generated and thus the block data cannot be decrypted for playback. Note that the playback operations will further be described later.

Next, there will be described with reference to FIG. 25 a flow of operations effected in appending ATS in the TS processor 300 and a flow of operations effected in encryption by the cryptography unit 150, when recording data. In step S2501 in FIG. 25, the recorder/player reads a master key, device ID which identifies the recorder/player and a device-unique key stored in its own memory 180.

In step S2502, the recorder/player checks whether the disc ID as identification information has already been recorded in the recording medium. If it is found so recorded, the recorder/player reads the disc ID in step S2503. If not, the recorder/player generates a disc ID at random or by a predetermined method, and records it in the disc in step S2504. Next in step S2505, the recorder/player generates a disc-unique key from the master key and disc ID. A disc-unique key is generated by the use of the function SHA-1 defined in FIPS 180-1 or the hash function based on a block encryption function, for example, as in the above.

The recorder/player goes to step S2506 where it will extract a title key unique to each record, player restriction flag and a device ID being identification information for the device, and record them to the disc. Next in step S2507, the recorder/player generates a title-unique key from the disc-unique key, title key and a device ID (when the player restriction is not set) or a device-unique key (when the player restriction is set).

Figure 27:
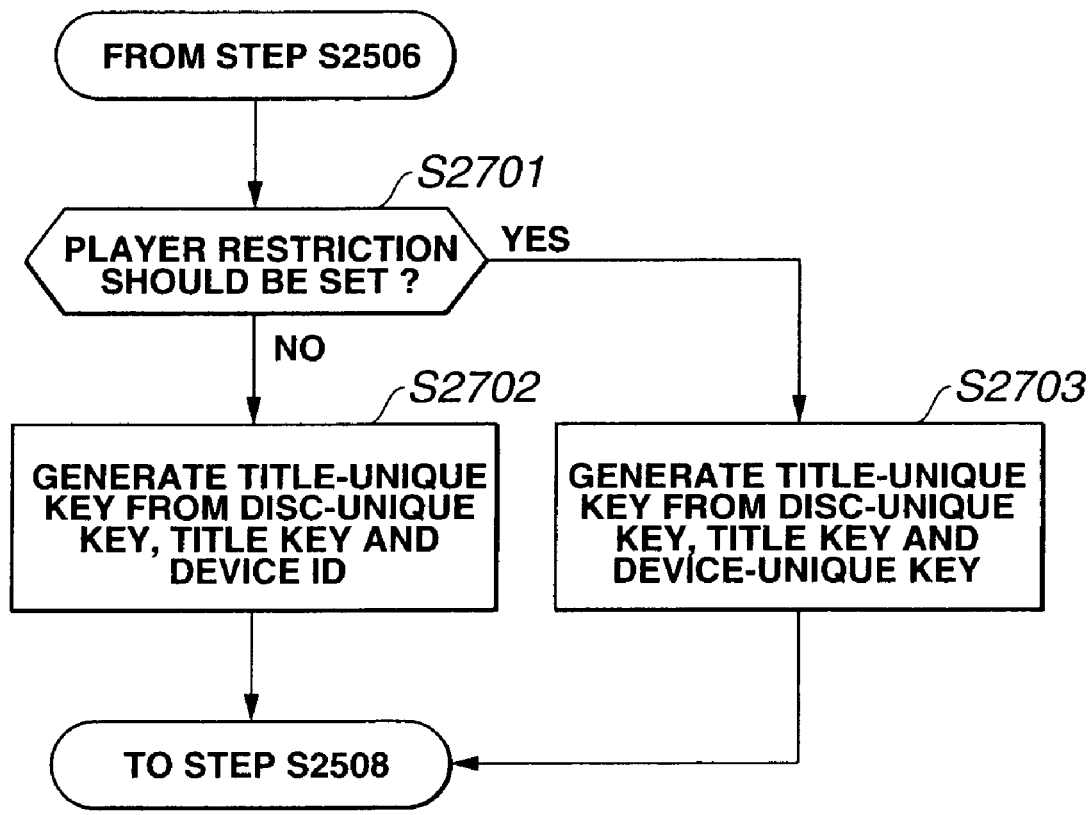
FIG. 27 shows a flow of operations effected in generation of title-unique key in the information recorder/player according to the present invention in a system in which the player restriction can be set.

FIG. 27 shows the flow of operations effected in generation of a title-unique key in detail. In step S2701, the cryptography unit 150 judges if the player restriction should be set, based on instructive data entered by the user of the recorder/player or use-limiting information appended to content.

If the judgment made in step S2701 is "NO", namely, if the player restriction is not set, the recorder/player goes to step S2702 where it will generate a title-unique key from a disc-unique key, title key and device ID.

If the judgment made in step S2701 is "YES", namely, if the player restriction is set, the recorder/player goes to step S2703 where it will generate a title-unique key from a disc-unique key, title key and device-unique key, by the use of the hash function SHA-1 or the hash function based on a block encryption function.

In step S2508, the recorder/player receives to-be-encrypted data of a to-be-recorded content data in the form of TS packets. In step S2509, the TS processor 300 will append, to each of the TS packets, ATS being information indicative of a time at which the packet has been received. Alternatively, the TS processor 300 will append, to each TS packet, a combination of copy control information CCI, ATS and other information. Next in step S2510, the recorder/player receives TS packets each having ATS appended thereto one after another, and judges whether a number X (e.g., X=32) of the TS packets forming one block have been received or identification data indicating the last packet has been received. When either of the above conditions is fulfilled, the recorder/player goes to step S2511 where it will arrange the number X of TS packets or TS packets down to the last one side by side to form one block of data.

Next in step S2512, the cryptography unit 150 generates a block key being a key for use to encrypt the data in the above block from 32 bits (block seed including ATS) in the leading portion of the block data and the title-unique key having been generated in step S2507.

In step S2513, the block data formed in step S2511 is encrypted with the block key. As having previously been described, the (m+1)th to the last bytes in the block data are subjected to the encryption. The encryption algorithm is DES (Data Encryption Standard) defined in FIPS 46-2 for example.

In step S2514, the encrypted block data is recorded to a recording medium. In step S2515, it is judged whether or not all the data have been recorded to the recording medium. When all the data have been recorded, the recorder/player exits the recording procedure. If not, the recorder/player goes back to step S2508 where it will process the remaining data.

[Decryption are Playback of Recorded Data in a System in which the Player Restriction Can be Set]

Figure 29:
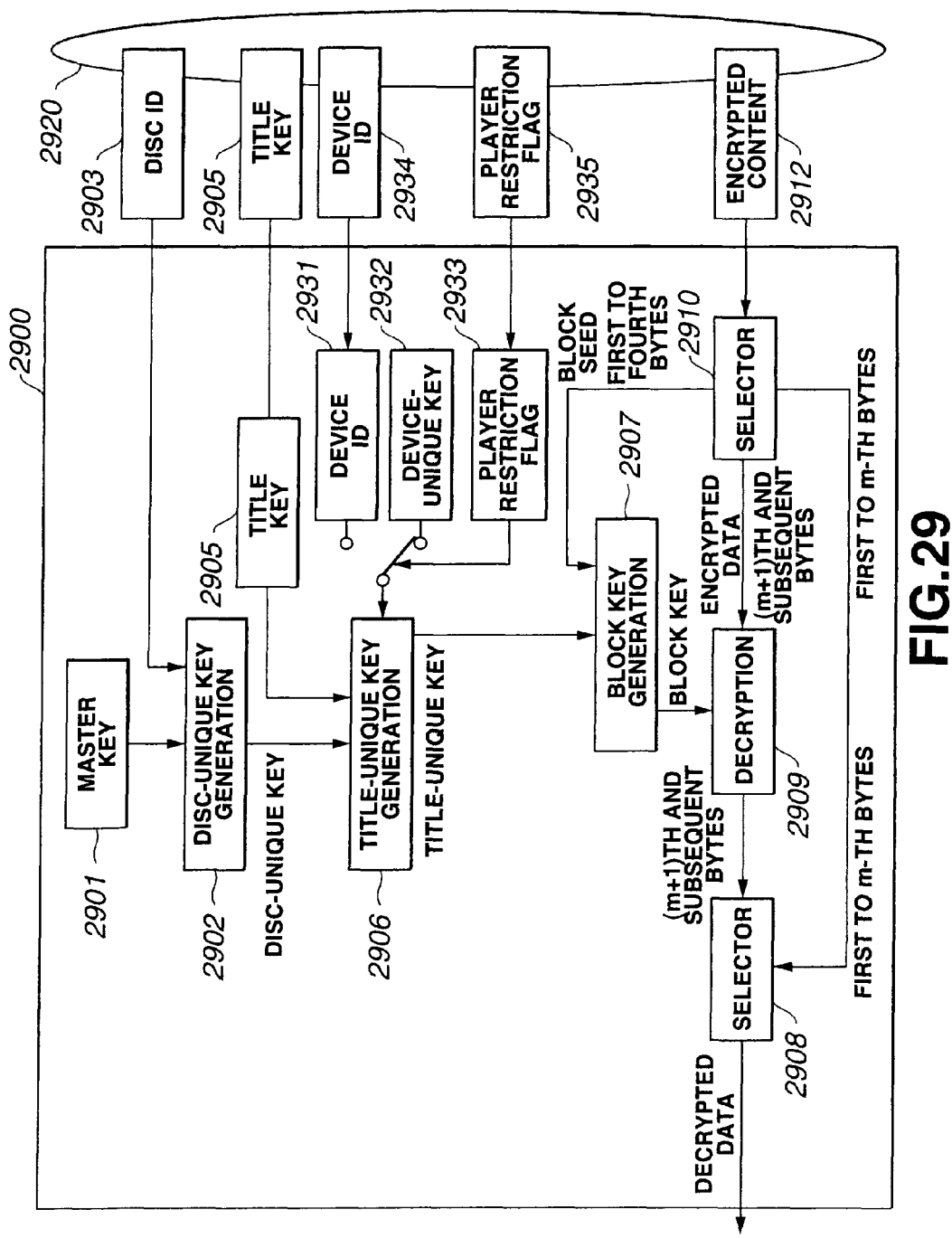
FIG. 29 is a block diagram explaining the decryption for data playback in the information recorder/player according to the present invention in a system in which the player restriction can be set.
Figure 30:
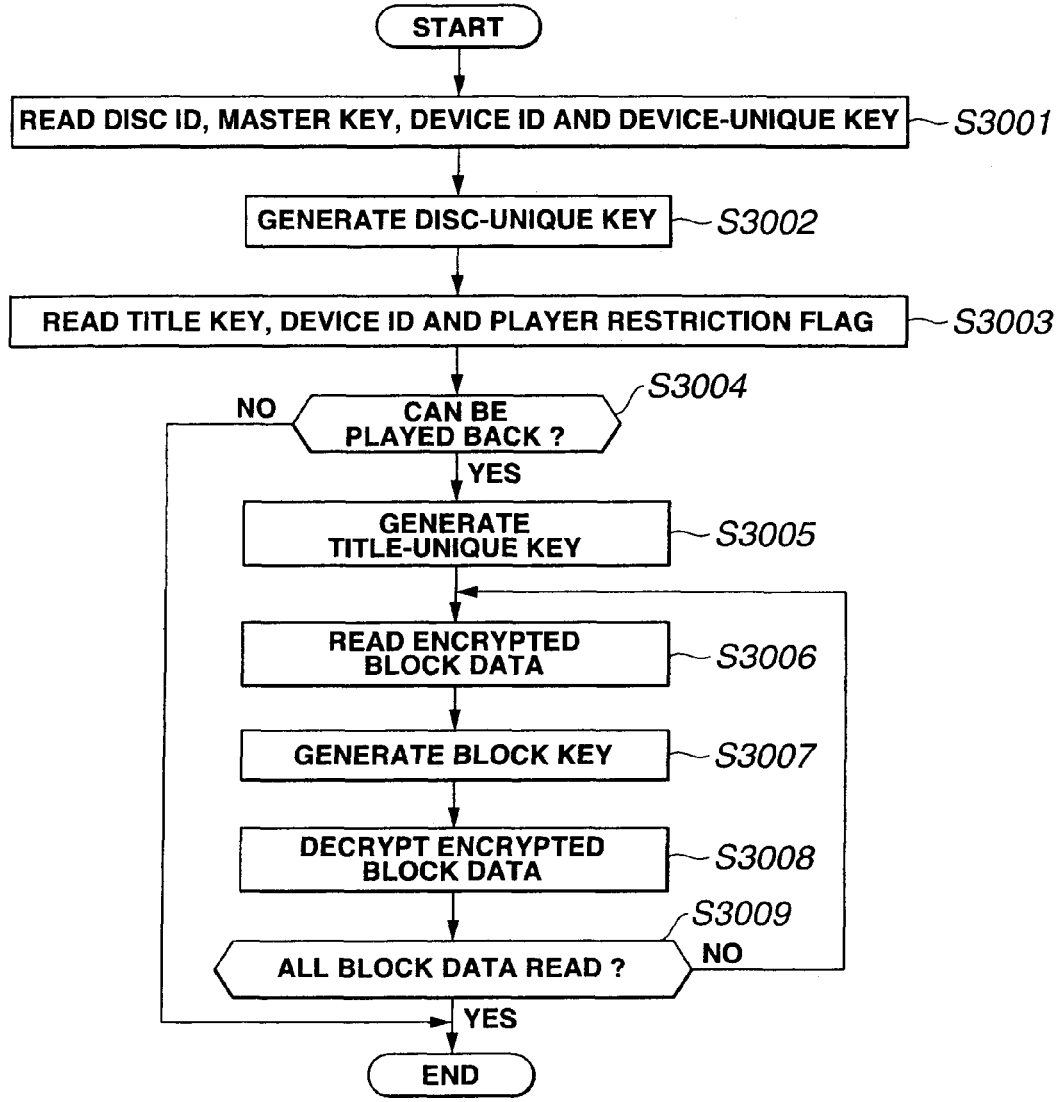
FIG. 30 shows a flow of operations effected in the data playback in the information recorder/player according to the present invention in a system in which the player restriction can be set.

Next, there will be described with reference to the block diagram in FIG. 29 and flow chart in FIG. 30 the operations effected for decryption, for playback, of encrypted content recorded in a recording medium as having been described in the foregoing.

First, description will be made with reference to the block diagram in FIG. 29. A recorder/player 2900 reads a disc ID 2902 from a disc 2920, and a master key 2901, device ID 2931 and device-unique key 2932 from its own memory. As apparent from the previous description of the recording procedure, the disc ID is an identifier unique to a disc, recorded in the disc. If not recorded in the disc, it is generated by the recorder/player and recorded in the disc. The master key 2901 is a private key stored in the licensed recorder/player 2900, the device ID is an identifier unique to the recorder/player 2900 and the device-unique key is a private key unique to the recorder/player.

Next, the recorder/player 2900 generates a disc-unique key from the disc ID and master key (as indicated at a reference 2903). The disc-unique key is generated by placing data generated by bit-by-bit combination of the master key and disc ID in a hash function SHA-1 defined in FIPS 180-1 for example and using only necessary data length of a 160-bit output resulted from the placement, or the disc-unique key is generated using a result from placement of the master key and disc ID in a hash function based on a block encryption function.

Next, the recorder/player reads a title key 2905 recorded correspondingly to data to be read from the disc, and further a device ID 2935 for a recorder/player having recorded the data, and a player restriction flag 2933 having been set correspondingly to the data. If player restriction information indicated by the player restriction flag 2933 thus read is "Player restriction is set" and "Device ID 2934 read from the recording medium coincides with a device ID 2931 of the player itself" or "Player restriction is not set", the data can be played back. If the player restriction information indicated by the player restriction flag 2933 is "Player restriction is set" and "Device ID 2934 read from the recording medium does not coincide with a device ID 2931 of the player itself", the data cannot be played back.

The reason why the data cannot be played back is that a block key for decryption of the data cannot be generated since the data has been encrypted with a block key generated from a device-unique key for a recorder/player having recorded the data and the recorder/players other than the recorder/player having recorded the data have not the same device-unique key.

In case the data can be played back, a title-unique key is generated from a combination of the disc-unique key, title key and device ID or a combination of the disc-unique key, title key and device-unique key.

That is, when the player restriction is not set, the title-unique key is generated from the disc-unique key, title key, device ID and title-unique key. When the player restriction is set, the title-unique key is generated from the disc-unique key, title key and a device-unique key of the player itself. For generation of the title-unique key, the hash function SHA-1 or hash function based on a block encryption function can be used.

In the above, the disc-unique key is generated from the master key and disc ID and the title-unique key is generated from a combination of the disc-unique key, title key and device ID or a combination of the title key and device-unique key. However, the title-unique key may be generated directly from the master key, disc ID, title key and device ID or device-unique key without using any disc-unique key or a key equivalent to the title-unique key may be generated from the master key, disc ID and device ID (when the player restriction is not set) or device-unique key (the player restriction is set) without using any title key.

Next, the recorder/player will read block data one after another from encrypted data 2912 stored in the disc, separate a block seed forming four bytes in the leading portion of the block data in a selector 2910 and generate a block key from the title-unique key and block seed.

The block key may be generated as having previously been described in the foregoing with reference to FIG. 14. That is, a 64-bit block key can be generated from a 32-bit block seed and 64-bit title-unique key.

In the above, examples of generation of the disc-unique key, title-unique key and block key have been described. Note however that a block key may be generated, for each block, from a master key, disc ID, title key, block seed and a device ID (when the player restriction is not set) or a device-unique key (when the player restriction is set) without having to generate any disc-unique key and title-unique key.

The encrypted block data is decrypted with the block key thus generated, (as indicated at a reference 2909) and outputted as decrypted data via a selector 2908. Note that the decrypted data includes ATS appended to each of transport packets included in the transport stream and the stream is processed based on the ATS in the aforementioned TS processor 300. Thereafter, the data can be used to display an image or play a music, for example.

Thus, the content encrypted in units of a block and stored in the recording medium can be decrypted, for playback, with the block key generated from the block seed including ATS in units of a block.

Next, a flow of operations effected in data decryption and playback will be described with reference to the flow chart shown in FIG. 30. In step S3001 in FIG. 30, the recorder/player reads a disc ID from the disc and a master key, device ID and device-unique key from its own memory. In step S3002, the recorder/player generates a disc-unique key from the disc ID and master key.

Next in step S3003, the recorder/player reads a title key for data to be read from the disc, a device ID for the recorder/player having recorded the data, and a player restriction flag set correspondingly to the data.

Figure 31:
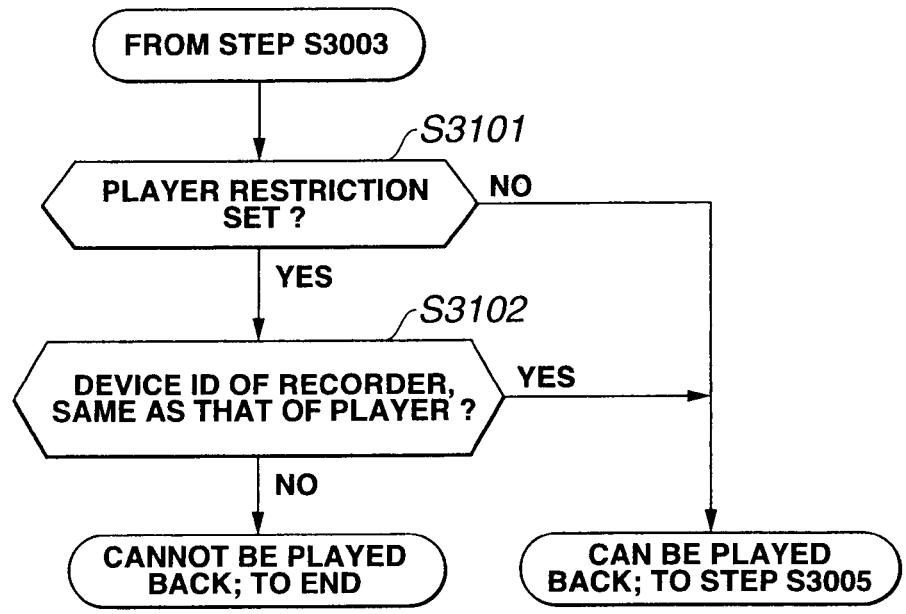
FIG. 31 is a flow chart showing in detail a judgment, in data playback, of whether or not data can be played back in the information recorder/player according to the present invention in a system in which the player restriction can be set.

Next in step S3004, the recorder/player judges whether the data to be read can be played back. The judging procedure is as shown in FIG. 31. In step S3101 in FIG. 31, it is judged whether player restriction information indicated by the read player restriction flag is "Player restriction is set". If so, the recorder/player judges in step S3102 whether "Device ID read from the recording medium coincides with a device-unique ID of the player itself". If so, the recorder/player provides a judgment that the data can be played back. Also, when the result of judgment in step S3101 is that "Player restriction is not set", the recorder/player will judge that the data can be played back. If the player restriction information indicated by the read player restriction flag is "Player restriction is set" and "Device ID read from the recording medium does not coincide with a device ID of the player itself", the recorder/player will judge that the data cannot be played back.

Figure 32:
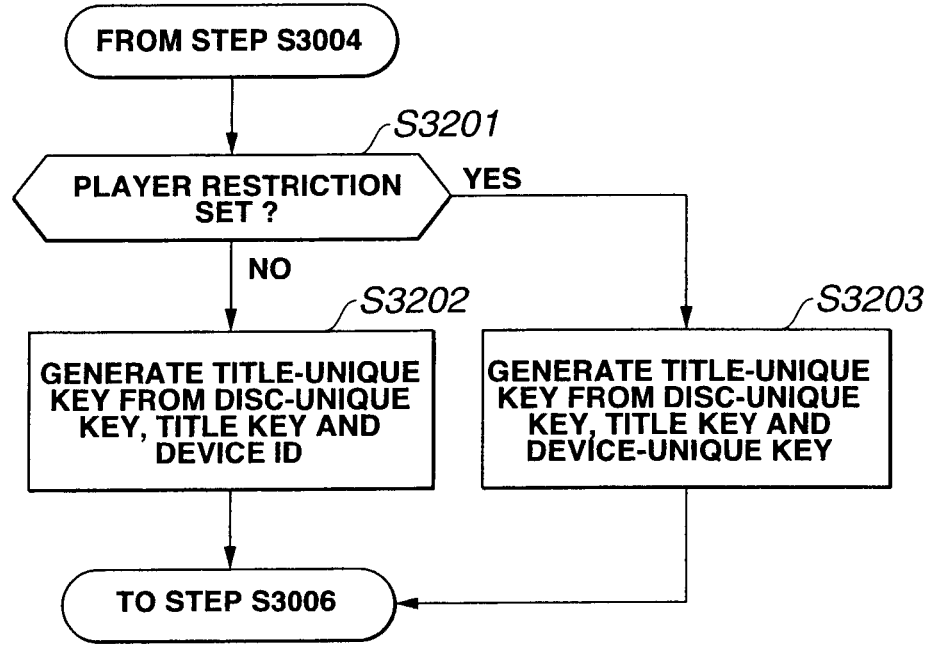
FIG. 32 shows a flow of operations effected in generation of title-unique key for data playback in the information recorder/player according to the present invention in a system in which the player restriction can be set.

Next in step S3005, the recorder/player will generate a title-unique key. The flow of operations effected in generation of the title-unique key will be described in detail with reference to FIG. 32. In step S3201, the cryptography unit 150 judges whether the player restriction should be set or not, based on the player restriction flag read from the disc.

If the result of judgement made in step S3201 is "NO", that is, if the result of judgment is that the player restriction should not be set, the recorder/player goes to step S3202 where it will generate a title-unique key from a disc-unique key, title key and device ID.

If the judgment made in step S3201 is "YES", that is, if is judged that the player restriction should be set, the recorder/player goes to step S3203 where it will generate a title-unique key from a disc-unique key, title key and a device-unique key of the player itself. The title-unique key is generated by the use of the hash function SHA-1 or the hash function based on a block encryption function.

Next in step S3006, the recorder/player reads a block seed encrypted and stored in the disc. In step S3007, the recorder/player generates a block key from a block seed including four bytes in the leading portion of the block data and the tile-unique key generated in step S3005.

Next in step S3008, the recorder/player decrypts the block data encrypted with a block key, and judges in step S3009 whether all the data have been read. If all the data have been read, the recorder/player exits the procedure. If not, the recorder/player goes back to step S3006 where it will read the remaining data.

As in the above, when the player restriction is not set, the recorder/player can generate a block key from a device ID. In case the player restriction is set, the recorder/player can generate a block key from a device-unique key. In any of these cases, the recorder/player can encrypt a content in units of a block and record the encrypted data to the recording medium. For playback of data from the recording medium, data having been encrypted with the device-unique key can be played back only by a device having recorded the data. In case the player restriction is not set, any recorder/player other than the device having recorded the data can generate a block key from a device ID recorded in the disc, and thus decrypt and play back the data.

[Copy Control in Data Recording]

Now, to protect the profit of the copyrighter of a content, a licensed device has to control copying of the content.

That is to say, for recording a content to a recording medium, it is necessary to check whether the content may be copied or not and record only a data which may be copied. Also, for playing back a content from a recording medium and outputting the data, the content has to be prevented from illegally being copied subsequently.

The operations of the recorder/player shown in FIGS. 1 and 2 for recording or playing back such a content while controlling copying of the content will be described with reference to the flow charts shown in FIGS. 33 and 34.

Figure 33B:
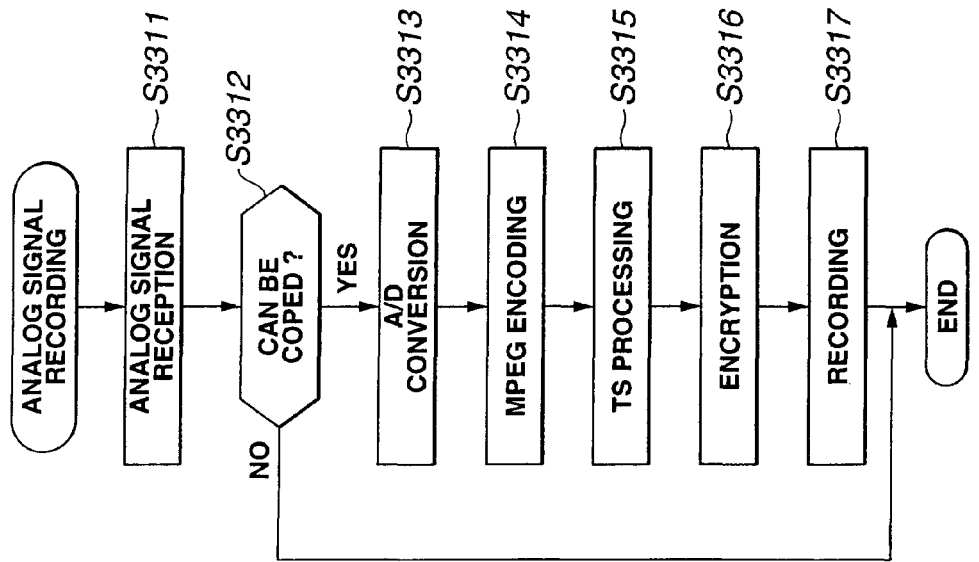
FIGS. 33A and 33B show flows of operations effected for copy control in the data recording in the information recorder/player according to the present invention.
Figure 33A:
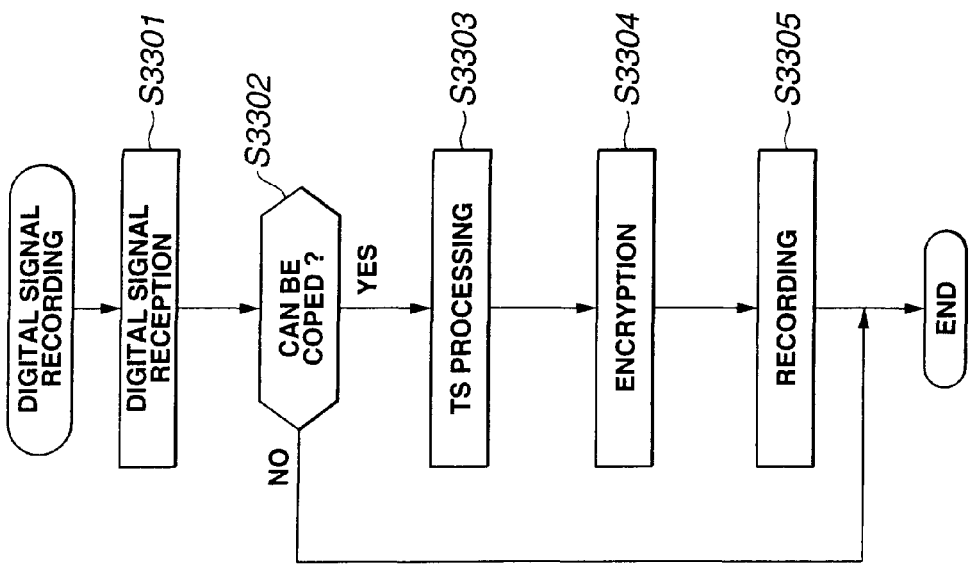

First, for recording an external content of digital signals to a recording medium, recording operations are effected as in the flow chart shown in FIG. 33A. The operations in FIG. 33A will be described herebelow concerning the recorder/player 100 shown in FIG. 1 as an example. The input/output I/F 120 receives a content of digital signals (digital content) via the IEEE 1394 serial bus or the like in step S3301 and the recorder/player goes to step S3302.

In step S3302, the input/output I/F 120 judges whether the supplied digital content can be copied. That is, in case the content received by the input/output I/F 120 has not been encrypted (for example, plain or unencrypted content is supplied to the input/output I/F 120 without applying the aforementioned DTCP standard), there will be made a judgment that the content can be copied.

Assume here that the recorder/player 100 is a device conforming to the DTCP standard and records data according to the DTCP standard. The DTCP standard defines 2-bit EMI (encryption mode indicator) as copy control information. When EMI is "00B" (B indicates that a preceding value is a binary number), it means that the content can be freely copied (copy-freely). When EMI is "01B", it means that the content cannot be copied more than a predetermined limit (no-more-copies). Further, when EMI is "10B", it means that the content can be copied once (copy-one-generation). When EMI is "11B", it means that the content is prohibited from being copied (copy-never).

Signals supplied to the input/output I/F 120 of the recorder/player 100 include EMI. When the EMI means "copy-free" or "copy-one-generation", it will be judged that the content can be copied. On the other hand, when EMI means "no-more-copies" or "copy-never", it will be judged that the content cannot be copied.

If the result of judgment in step S3302 is that the content cannot be copied, the recorder/player 100 skips over steps S3303 to S3305 and exits the recording procedure. Therefore, in this case, the content will not be copied to the recording medium 195.

If the result of judgment in step S3302 is that the content can be copied, the recorder/player 100 goes to step S3303. Subsequently, in steps S3303 to S3305, the recorder/player 100 will make similar operations to those in steps S302, S303 and S304 in FIG. 3A. That is, the TS processor 300 will append ATS to each TS packet included in a transport stream, the cryptography unit 150 will encrypt data, and the encrypted data from the cryptography unit 150 is recorded to the recording medium 195. Here, the recorder/player exits the recording procedure.

Note that EMI is included in the digital signals supplied to the input/output I/F 120. In case a digital content is recorded to the recording medium 195, EMI or information indicative of a copy control status similar to EMI (embedded CCI defined in the DTCP or the like for example) is recorded along with the digital content.

Generally, the information indicating "copy-one-generation" is converted to "no-more-copies" and recorded to prohibit more copies than a predetermined limit.

The recorder/player according to the present invention records copy control information such as EMI, embedded CCI, etc. as appended to TS packets. That is, as in Examples 2 and 3 in FIG. 10, 32 bits including 24 to 30 bits of ATS and copy control information are appended to each TS packet as shown in FIG. 5.

For recording an external content of analog signals to a recording medium, a recording procedure is effected as in the flow chart in FIG. 33B. The recording procedure shown in FIG. 33B will be described herebelow. A content of analog signals (analog content) is supplied to the input/output I/F 140 in step S3311. Then the recorder/player goes to step S3312 where it will judge whether the received analog content can be copied.

In step S3312, the judgment is done based on whether or not the signals received by the input/output I/F 140 include a Macrovision signal and CGMS-A (copy generation management system-analog) signal. When recorded in a VHS video cassette tape, the Macrovision signal will be a noise. When this Macrovision signal is included in signals received by the input/output I/F 140, the judgment will be such that the analog content cannot be copied.

The CGMS-A signal is a CGMS signal used in copy control of digital signals and applied to copy control of analog signals. It indicates that a content can be copied freely or once or cannot be copied (copy-freely, copy-one-generation or copy-never).

Therefore, if the CGMS-A signal is included in signal received by the input/output I/F 140 and means "copy-freely" or "copy-one-generation", it will be judged that the analog content can be copied. When the CGMS-A means "copy-never", the judgment will be such that the analog content cannot be copied.

Further, in case neither the Macrovision signal nor the CGMS-A signal is included in signals received by the input/output I/F 140, it will be judged that the analog content cannot be copied.

If the result of judgment in step S3312 is that the analog content cannot be copied, the recorder/player 100 will skip over steps S3313 to S3317 and exit the recording procedure. Therefore, in this case, the content will not be recorded to the recording medium 195.

Also, if the result of judgment in step S3312 is that the analog content can be copied, the recorder/player goes to step S3313. Subsequently, in steps S3313 to S3317, similar operations to those in steps S322 to S326 in FIG. 3B are effected, whereby the content is converted to a digital content, and then subjected to MPEG encoding, TS processing and encryption for recording to the recording medium. Here, the recorder/player exits the recording procedure.

Note that when the analog signals received by the input/output I/F 140 includes the CGMS-A signal, the CGMS-A signal will also be recorded to the recording medium when recording the analog content to the recording medium. Namely, the CGMS-A signal is recorded in the place of the CCI or other information shown in FIG. 10. Generally, information meaning "copy-one-generation" is converted to "no-more-copies" for recording to prohibit more copies than a predetermined limit. However, such information conversion will not be effected provided that there has been established for the system a rule that the copy control information "copy-one-generation" shall not be converted to "no-more-copies" for recording but shall be taken as "no-more-copies".

[Copy Control in Data Playback]

Next, the content is read from the recording medium, and outputted as a digital content to outside as shown in the flow chart in FIG. 34A. The operations shown in FIG. 34A will be described. First in steps S3401, 3402 and S3403, there will be effected similar operations to those in steps S401, S402 and S403 in FIG. 4A, whereby the encrypted content read from the recording medium is decrypted by the cryptography unit 150 and subjected to TS processing. After subjected to these processes, the digital content is supplied to the input/output I/F 120 via the bus 110.

In step S3404, the input/output I/F 120 judges whether the digital content supplied thereto can be copied later. Namely, in case the digital content supplied to the input/output I/F 120 includes no EMI or information indicative of a copy control status (copy control information) like the EMI, it will be judged that the content can be copied later.

Also, in case the digital content supplied to the input/output I/F 120 includes EMI for example, namely, in case an EMI has been recorded in conformity to the DTCP standard during data recording, and if the EMI (recorded EMI) means "copy-freely", it will be judged that the digital content can be copied later. Also, when the EMI means "no-more-copies", it will be judged that the content cannot be copied later.

It should be reminded that generally, the recorded EMI does not means "copy-one-generation" and "copy-never" because an EMI meaning "copy-one-generation" is converted to "no-more-copies" during data recording and a digital content having an EMI meaning "copy-never" will not be recorded to the recording medium. However, the EMI conversion will not be effected provided that there has been defined for the system a rule that the copy control information "copy-one-generation" shall not be converted to "no-more-copies" for recording but shall be taken as "no-more-copies".

If the result of judgment in step S3404 is that the content can be copied later, the input/output I/F 120 goes to step S3405 where it will output the digital content to outside and exit the playback procedure.

Also, if the result of judgment in step S3404 is that the content cannot be copied later, the input/output I/F 120 goes to step S3406 where it will output, according to the DTCP or the like, the digital content in such a form that cannot be copied and exit the playback procedure.

That is to say, in case the recorded EMI means "no-more-copies" as in the above (or if there has been defined for the system a rule that copy control information "copy-one-generation" for example shall not be converted to "no-more-copies" for recording but shall be taken as "no-more-copies" and the EMI recorded under this condition means "copy-one-generation"), the content will be prohibited from being further copied.

Thus, the input/output I/F 120 makes mutual authentication with a counterpart device according to the DTCP standard. If the counterpart device is a legal one (a device conforming to the DTCP standard herein), the input/output I/F 120 encrypts the digital content and outputs the data to outside.

Next, for playing back the content from the recording medium and outputting the data as an analog content, the playback is effected as in the flow chart in FIG. 34B. The operations for the playback will be described with reference to FIG. 34B. In steps S3411 to S3415, similar operations to those in steps S421 to S425 in FIG. 4B are effected. That is, an encrypted content is read, and subjected to decryption, TS processing, MPEG decoding and D/A conversion. An analog content thus provided is received by the input/output I/F 140.

In step S3416, the input/output I/F 140 judges whether a content supplied thereto can be copied later. Namely, in case no copy control information is found recorded along with the recorded content, it will be judged that the content can be copied later.

In case EMI or copy control information has been recorded during content recording in conformity to the DTCP standard for example, and if the EMI or copy control information means "copy-freely", it will be judged that the content can be copied later.

Also, in case the EMI or copy control information means "no-more-copies", or in case there has been defined for the system a rule that the copy control information "copy-one-generation" for example shall not be converted to "no-more-copies" for recording but shall be taken as "no-more-copies" and if the EMI or copy control information recorded under this condition means "copy-one-generation", it will be judged that the content cannot be copied later.

Further, in case an analog content supplied to the input/output I/F 140 includes a CGMS-A signal, namely, in case the CGMS-A signal has been recorded along the content during data recording, and if the CGMS-A signal means "copy-freely", it will be judged that the analog content can be copied later. Also, when the CGMS-A signal means "copy-never", it will be judged that the analog content cannot be copied later.

If the result of judgment in step S3416 is that the analog content can be copied later, the input/output I/F 140 goes to step S3417 where it will output the analog signals supplied thereto as they are and exit the playback procedure.

Also, if the result of judgment in step S3416 is that the analog content cannot be copied later, the input/output I/F 140 goes to step S3418 where it will output the analog content in such a form that the content cannot be copied, and exit the playback procedure.

Namely, in case copy control information such as recorded EMI means "no-more-copies" as in the above (alternatively, in case there has been defined for the system a rule that copy control information "copy-one-generation" for example shall not be converted to "no-more-copies" for recording but shall be taken as "no-more-copies" and if copy control information like an EMI recorded under this condition means "copy-one-generation"), the content will be prohibited from be copied any more.

Thus, the input/output I/F 140 appends a Macrovision signal and a CGMS-A meaning "copy-never" to the analog content, and outputs the analog signal to outside. Also in case recorded CGMS-A signal means "copy-never" for example, the content will be prohibited from being copied any more. Thus, the input/output I/F 140 modifies the CGMS-A signal to "copy-never" and outputs it along with the analog content to outside.

As in the above, by controlling copying of a content while recording or playing back the content, it is possible to prevent the content from being copied beyond a permitted range for the content (illegal copy).

[Construction of the Data Processor]

Figure 35:
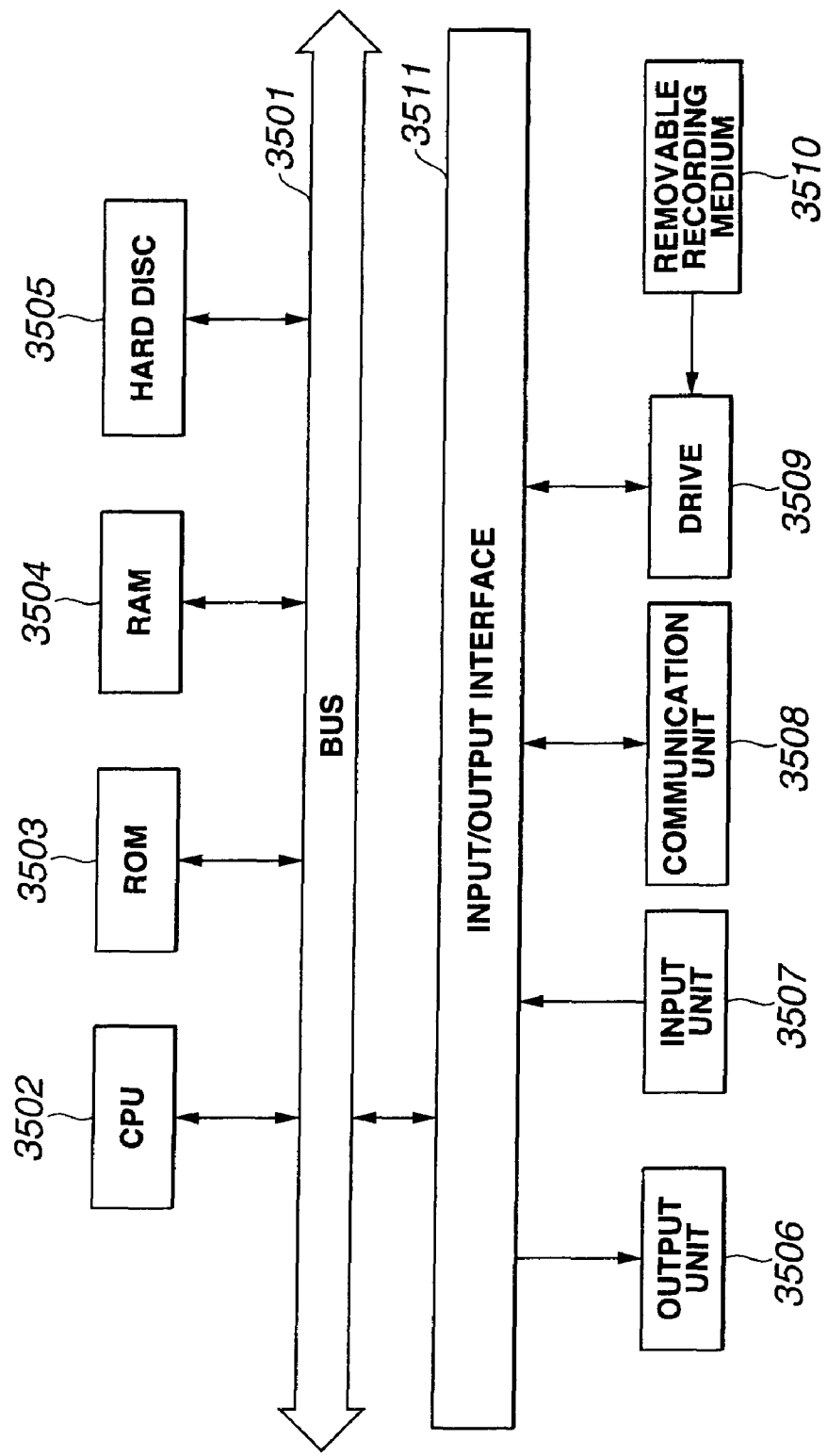
FIG. 35 is a block diagram of a data processing system to process data by software in the information recorder/player.

Note that the aforementioned series of operations can be done by a hardware or by a software. Namely, the cryptography unit 150 can be formed from an encryption/decryption LSI and also the cryptography, namely, the encryption/decryption, by the cryptography unit 150 can be done by having a general-purpose computer or a one-chip microcomputer execute a corresponding program. Similarly, the operations of the TS processor 300 can be done by a software. For effecting the series of operations for TS processing by a software, a program including the software is installed in a general-purpose computer, one-chip microcomputer or the like. FIG. 35 shows an example construction of one embodiment of a computer in which the program for the series of operations is installed.

The program can be prerecorded in a hard disc 3505 and ROM 3503 as recording media incorporated in the computer. Alternatively, the program may be stored (recorded) provisionally or permanently in a removable recording medium 3510 such as a floppy disc, CD-ROM (compact disc read-only memory), MO (magneto-optical) disc, DVD (digital versatile disc), magnetic disc, semiconductor memory or the like. Such a removable recording medium 3510 can be provided as a so-called package software.

It should be reminded that the program can be installed from the aforementioned removable recording medium 3510 to a computer, otherwise, transferred from a download site to the computer by a radio communication network over a digital broadcasting satellite or transferred to the computer over a cable via a network such as LAN (local area network), Internet or the like, the computer receives the program thus transferred by a communication unit 3508 thereof and install it into the built-in hard disc 3505.

The computer incorporates a CPU (central processing unit) 3502 as shown. The CPU 3502 is connected to an input/output interface 3511 via a bus 3501. When the CPU 3502 is supplied with an instruction from an input unit 3507 operated by the user, such as a keyboard, mouse or the like via the input/output interface 3511, it executes the program stored in a ROM (read-only memory) 3503.

Alternatively, the CPU 3502 loads, into a RAM (random-access memory) 3504 for execution, a program stored in the hard disc 3505, a program transferred from a satellite or network, received by the communication unit 3508 and installed into the hard disc 3505 or a program read from the removable recording medium 3510 set in a drive 3509 and installed into the hard disc 3505.

Thus, the CPU 3502 makes operations as in the aforementioned flow charts or operations as in the aforementioned block diagrams. The CPU 3502 outputs results of these operations from an output unit 3506 such as an LCD (liquid crystal display) or speaker, or transmits them from the communication unit 3508, or records them to the hard disc 3505, via the input/output interface 3511, as necessary.

Note that the operations or processes to describe a program which allows the computer to do a variety of operations may not always be done in the time sequence as in the flow charts but may include ones which are executed in parallel or individually (parallel processes or processes by objects, for example).

The program may be a one which can be executed by a single computer or in a decentralized manner by a plurality of computers. Further, the program may be a one which can be transferred to a remote computer for execution.

In the above, the present invention has been described concerning the example that a cryptography block formed from one-chip encryption/decryption LSI encrypts and decrypts a content. Note however that the content encryption/decryption block may also be a single software module which is to be executed by the CPU 170 shown in FIGS. 1 and 2, for example. Similarly, the operations of the TS processor 300 may be done by a single software module which is to be executed by the CPU 170.

In the foregoing, the present invention has been described in detail concerning the specific embodiments thereof. However, it will be apparent that the embodiments can be modified or changed by those skilled in the art without departing from the scope and spirit of the present invention. Namely, since the present has been disclosed by way of example, so the embodiments should not limitatively be interpreted. The present invention is essentially defined in the claims given later.

INDUSTRIAL APPLICABILITY

The information recording/playback apparatus and method according to the present invention generate a block key for encrypting block data based on an ATS which is random data corresponding to a time when each packet arrives. So it is possible to generate a unique key which varies from one block to another, use a different encryption key for each block and thus enhance the protection against data cryptanalysis. Also, by generating a block key based on the ATS, no area has to be secured in the recording medium for storage of an encryption key for each block and thus the main data area can be used more effectively. Furthermore, data other than the main data has not to be accessed during data recording or playback, and thus the data recording or playback can be done with a higher efficiency.

The invention claimed is:

1. An information player for playing back information from a recording medium, the information player comprising:
   a cryptography means for decrypting encrypted data recorded in the recording medium by generating a block key for decrypting encrypted data of a block data having an arrival time stamp (ATS) appended to each of a plurality of transport packets from a block seed which is additional information unique to the block data and including the arrival time stamp (ATS), and decrypting each block data with the block key thus generated; and
   a transport stream processing means for controlling data output on the basis of the arrival time stamp (ATS) appended to each of the plurality of transport packets included in the block data having been decrypted by the cryptography means.

2. The information player according to claim 1, wherein the cryptography means generates the block key for decrypting the block data from a block seed which is additional information unique to the block data and including the arrival time stamp (ATS) appended to a leading one of the plurality of transport packets included in the block data.

3. The information player according to claim 1, wherein the block seed includes copy control information in addition to the arrival time stamp (ATS).

4. The information player according to claim 1, wherein the cryptography means decrypts, with the block key, only data included in the block data and excluding data in a leading area including a block seed of the block data.

5. The information player according to claim 1, wherein the cryptography means generates a title-unique key from a master key stored in the information player, disc ID being a recording medium identifier unique to a recording medium and a title key unique to data to be recorded to the recording medium, takes the thus-generated title-unique key as a key for an encryption function, places the block seed into the encryption function, and outputs a result of the placement as a block key.

6. The information player according to claim 1, wherein the cryptography means generates a title-unique key from a master key stored in the information player, disc ID being a recording medium identifier unique to a recording medium and a title key unique to data to be recorded to the recording medium, places the title-unique key thus generated and block seed into a one-way function, and outputs a result of the placement as a block key.

7. The information player according to claim 1, wherein the cryptography means generates a device-unique key from any of an LSI key stored in an LSI included in the cryptography means, device key stored in the information player, medium key stored in the recording medium and a drive key stored in a drive unit for the recording medium or a combination of these keys, and generates a block key for decrypting the block data from the device-unique key thus generated and block seed.

8. The information player according to claim 1, wherein the cryptography means decrypts block data with the block key according to a DES algorithm.

9. The information player according to claim 1, further comprising an interface means for receiving information to be recorded to a recording medium, and identifying copy control information appended to each of packets included in the transport stream to judge, based on the copy control information, whether or not playback from the recording medium is allowed.

10. The information player according to claim 1, further comprising an interface means for receiving information to be played back from a recording medium, and identifying 2-bit EMI (encryption mode indicator) as copy control information to judge, based on the EMI, whether or not playback the recording medium is allowed.

11. A method for playing back information from a recording medium, the method comprising the steps of:
   generating a block key for decrypting encrypted data in a block data having an arrival time stamp (ATS) appended to each of a plurality of transport packets from a block seed which is additional information unique to the block data and including the arrival time stamp (ATS), and decrypting each block data with the block key thus generated; and
   processing a transport stream processing means to control data output on the basis of the arrival time stamp (ATS) appended to each of the plurality of transport packets included in the block data having been decrypted in the decrypting step.

12. The method according to claim 11, wherein in the decrypting step, the block key for decrypting the block data is generated from a block seed which is additional information unique to the block data and including the arrival time stamp (ATS) appended to a leading one of the plurality of transport packets included in the block data.

13. The method according to claim 11, wherein in the decrypting step, only data included in the block data and excluding data in a leading area including a block seed of the block data is decrypted with the block key in the encryption of the block data.

14. The method according to claim 11, wherein in the decrypting step, a title-unique key is generated from a master key stored in the information player, disc ID being a recording medium identifier unique to a recording medium and a title key unique to data to be recorded to the recording medium, the title-unique key thus generated is taken as a key for an encryption function, the block seed is placed into the encryption function, and a result of the placement is outputted as a block key.

15. The method according to claim 11, wherein in the decrypting step, a title-unique key is generated from a master key stored in the information player, disc ID being a recording medium identifier unique to a recording medium and a title key unique to data to be recorded to the recording medium, the title-unique key thus generated and block seed are placed into a one-way function, and a result of the placement is outputted as a block key.

16. The method according to claim 11, wherein in the decrypting step, a device-unique key is generated from any of an LSI key stored in an LSI included in the cryptography means, device key stored in the information player, medium key stored in the recording medium and a drive key stored in a drive unit for the recording medium or a combination of these keys, and a block key for decrypting the block data is generated from the device-unique key thus generated and block seed.

17. The method according to claim 11, wherein in the decrypting step, the block data decryption with the block key is made according to a DES algorithm.

18. The method according to claim 11, further comprising the step of identifying copy control information appended to each of packets included in the transport stream to judge, based on the copy control information, whether or not playback from the recording medium is allowed.

19. The method according to claim 11, further comprising the step of identifying 2-bit EMI (encryption mode indicator)

as copy control information to judge, based on the EMI, whether or not playback from the recording medium is allowed.

20. A non-transitory computer readable storage medium that stores a program, which when executed by a computer, causes the computer to perform a method of playback of information from a recording medium comprising the steps of:

generating a block key for decrypting encrypted data in a block data having an arrival time stamp (ATS) appended to each of a plurality of transport packets from a block seed which is additional information unique to the block data and including the arrival time stamp (ATS), and decrypting each block data with the block key thus generated; and processing a transport stream to control data output on the basis of the arrival time stamp (ATS) appended to each of the plurality of transport packets included in the block data having been decrypted in the decrypting step.

* * * * *